United States Patent
Liu et al.

(10) Patent No.: US 11,544,546 B2
(45) Date of Patent: Jan. 3, 2023

(54) INTEGRATED CIRCUIT CHIP DEVICE

(71) Applicant: CAMBRICON TECHNOLOGIES CORPORATION LIMITED, Beijing (CN)

(72) Inventors: Shaoli Liu, Beijing (CN); Xinkai Song, Beijing (CN); Bingrui Wang, Beijing (CN); Yao Zhang, Beijing (CN); Shuai Hu, Beijing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 277 days.

(21) Appl. No.: 16/903,304

(22) Filed: Jun. 16, 2020

(65) Prior Publication Data

US 2020/0311531 A1    Oct. 1, 2020

Related U.S. Application Data

(63) Continuation of application No. PCT/CN2018/123929, filed on Dec. 26, 2018.

(30) Foreign Application Priority Data

| Dec. 27, 2017 | (CN) | 201711455388.4 |
| Dec. 27, 2017 | (CN) | 201711455397.3 |
| Dec. 28, 2017 | (CN) | 201711466943.3 |
| Dec. 28, 2017 | (CN) | 201711468629.9 |
| Dec. 28, 2017 | (CN) | 201711469408.3 |
| Dec. 28, 2017 | (CN) | 201711469614.4 |
| Dec. 28, 2017 | (CN) | 201711469615.9 |

(51) Int. Cl.
*G06N 3/063*   (2006.01)
*G06N 3/04*    (2006.01)

(52) U.S. Cl.
CPC ............... *G06N 3/063* (2013.01); *G06N 3/04* (2013.01)

(58) Field of Classification Search
CPC ..................................................... G06N 3/063
See application file for complete search history.

(56) References Cited

U.S. PATENT DOCUMENTS 9,779,786 B1    10/2017  Wu et al.
2018/0211620 A1*  7/2018  Kurokawa .......... H01L 27/1251
(Continued)

FOREIGN PATENT DOCUMENTS

| CN | 104572011 A | 4/2015 |
| CN | 105426344 A | 3/2016 |
| CN | 106126481 A | 11/2016 |

(Continued)

OTHER PUBLICATIONS

First Office action issued in related Chinese Application No. 201711455388.4, dated Nov. 22, 2019, 10 pages.
(Continued)

*Primary Examiner* — Simon P Kanaan
(74) *Attorney, Agent, or Firm* — Bayes PLLC

(57) ABSTRACT

Provided are an integrated circuit chip device and related products. The integrated circuit chip device is used for performing a multiplication operation, a convolution operation or a training operation of a neural network. The device has the advantages of small calculation amount and low power consumption.

26 Claims, 39 Drawing Sheets

(56) References Cited

U.S. PATENT DOCUMENTS

2019/0042870 A1* 2/2019 Chen .................... G06K 9/6228
2020/0090029 A1* 3/2020 Suzuki .................. G06N 3/084

FOREIGN PATENT DOCUMENTS

| CN | 107229967 A | 10/2017 |
| --- | --- | --- |
| CN | 107330515 A | 11/2017 |
| CN | 109961136 A | 7/2019 |
| CN | 109961138 A | 7/2019 |

OTHER PUBLICATIONS

First Office action issued in related Chinese Application No. 201711455397.3, dated Nov. 14, 2019, 8 pages.
Second Office action issued in related Chinese Application No. 201711455397.3, dated Mar. 3, 2020, 7 pages.
First Office action issued in related Chinese Application No. 201711469615.9, dated Nov. 20, 2019, 10 pages.
First Office action issued in related Chinese Application No. 201711468629.9, dated Dec. 3, 2019, 8 pages.
Extended European Search Report in related European Application No. 20203232.2, dated Feb. 4, 2021 (7 pages).
Office Action in related Chinese Application No. 201711466943.3, dated Nov. 29, 2019 (10 pages).
Farabet et al., "Hardware Accelerated Convolutional Neural Networks for Synthetic Vision Systems", IEEE Internationa Symposium on Circuits and Systems, May 30, 2010 (4 pages).

* cited by examiner

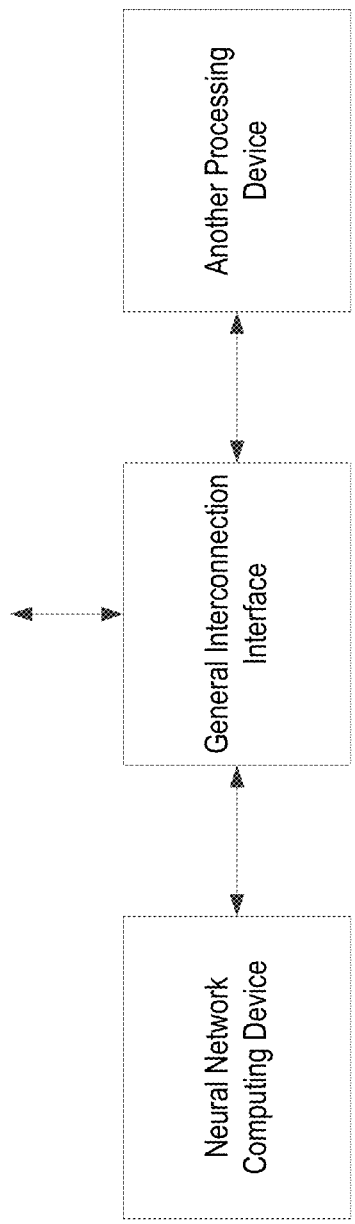

INTEGRATED CIRCUIT CHIP DEVICE

CROSS-REFERENCE TO RELATED APPLICATIONS

This application is a continuation of International Application No. PCT/CN2018/123929, filed Dec. 26, 2018, which claims the benefits of priority to Chinese Application Nos. 201711455388.4, filed Dec. 27, 2017; 201711455397.3, filed Dec. 27, 2017; 201711466943.3, filed Dec. 28, 2017; 201711468629.9, filed Dec. 28, 2017; 201711469408.3, filed Dec. 28, 2017; 201711469614.4, filed Dec. 28, 2017; and 201711469615.9, filed Dec. 28, 2017. The entire contents of each of the above-identified applications are expressly incorporated herein by reference.

TECHNICAL FIELD

The present disclosure relates to the field of neural network, and particularly relates to an integrated circuit chip device.

BACKGROUND

ANN (Artificial Neural Network) is a research focus emerged in 1980s in the field of artificial intelligence. ANN abstracts the human brain neuron network in terms of information processing to establish a simple model, and then builds different networks with different connection methods. ANN is often referred to as neural network in engineering and academia. Neural networks are a type of computational model. They are formed by a large number of interconnecting nodes (or may be referred to as neurons). Existing neural networks rely on CPU (Central Processing Unit) or GPU (Graphics Processing Unit) to realize neural network operations which often require a large amount of computations and cause high power consumption.

SUMMARY

The present disclosure provides an integrated circuit chip device and a product thereof. Compared with the existing integrated circuit chip device, the disclosed integrated circuit chip device and the product thereof can reduce computations and power consumption.

An aspect provides an integrated circuit chip device including: a main processing circuit and a plurality of basic processing circuits. The main processing circuit includes a data type conversion circuit. The data type conversion circuit is configured to convert data between a floating point data type and a fixed point data type.

The plurality of basic processing circuits are arranged as an array. Each basic processing circuit is connected to an adjacent basic processing circuit. The main processing circuit is n basic processing circuits in a first row, n basic processing circuits in an $m^{th}$ row, and m basic processing circuits in a first column.

The main processing circuit is configured to obtain an input data block, a weight data block, and a multiplication instruction, convert the input data block and the weight data block to an input data block of the fixed point type and a weight data block of the fixed point type through the data type conversion circuit, classify the input data block of the fixed point type into a distribution data block and the weight data block of the fixed point type into a broadcasting data block according to the multiplication instruction, partition the weight data block of the fixed point type to obtain a plurality of basic data blocks, distribute the plurality of basic data blocks to at least one of basic processing circuits connected to the main processing circuit, and broadcast the broadcasting data block to the basic processing circuits connected to the main processing circuit.

The plurality of basic processing circuits are configured to perform computations of a neural network in parallel according to the broadcasting data block of the fixed point type and the basic data blocks of the fixed point type to obtain computation results, and transfer the computation results to the main processing circuit through the basic processing circuits connected to the main processing circuit.

The main processing circuit is configured to process the computation result to obtain an instruction result of the multiplication instruction.

Alternatively or additionally, the plurality of basic processing circuits are configured to multiply the broadcasting data block and the basic data blocks of the fixed point type to obtain products of the fixed point type, and transfer the products as computation results to the main processing circuit through the basic processing circuits connected to the main processing circuit.

The main processing circuit is configured to convert the products of the fixed point type to products of the floating point type through the data type conversion circuit, accumulate the products of the floating point type to obtain accumulation results, and sort the accumulation results to obtain the instruction result.

Alternatively or additionally, the plurality of basic processing circuits are configured to perform inner product computations on the broadcasting data block and the basic data blocks of the fixed point type to obtain inner products of the fixed point type, and transfer the inner products as computation results to the main processing circuit through the basic processing circuits connected to the main processing circuit.

The main processing circuit is configured to convert the inner products to inner products of the floating point type through the data type conversion circuit, and sort the inner products to obtain the instruction result.

Alternatively or additionally, the main processing circuit is configured to broadcast the broadcasting data block as a whole to the basic processing circuits connected to the main processing circuit.

Alternatively or additionally, the main processing circuit is configured to partition the broadcasting data block into a plurality of partial broadcasting data blocks, and sequentially broadcast the plurality of partial broadcasting data blocks to the basic processing circuits connected to the main processing circuit.

Alternatively or additionally, the basic processing circuits are configured to perform inner product processing on the partial broadcasting data blocks and the basic data blocks of the fixed point type to obtain results of inner product processing, and transfer the results of inner product processing to the main processing circuit.

Alternatively or additionally, the basic processing circuits are configured to reuse the partial broadcasting data blocks for p times, perform p times of inner product computations on the partial broadcasting data blocks and the p basic data blocks to obtain p partial processing results, and transfer the p partial processing results to the main processing circuit, where p is an integer greater than or equal to 2.

Alternatively or additionally, the main processing circuit includes a main register or a main on-chip caching circuit.

The basic processing circuits include basic registers or basic on-chip caching circuits.

Alternatively or additionally, the main processing circuit includes one or more of a vector computing unit circuit, an ALU (arithmetic and logic unit) circuit, an accumulator circuit, a matrix transposition circuit, a direct memory access circuit, or a data rearrangement circuit.

Alternatively or additionally, the input data is a vector or a matrix.

The weight data is a vector or a matrix.

A second aspect provides an integrated circuit chip device including: a main processing circuit and a plurality of basic processing circuits. The main processing circuit includes a data type conversion circuit configured to convert data between a floating point data type and a fixed point data type.

The main processing circuit is configured to obtain an input data block, a weight data block, and a multiplication instruction, convert the input data block and the weight data block to an input data block of the fixed point type and a weight data block of the fixed point type through the data type conversion circuit, classify the input data block of the fixed point type into a distribution data block and the weight data block of the fixed point type into a broadcasting data block according to the multiplication instruction, partition the distribution data block of the fixed point type to obtain a plurality of basic data blocks, distribute the plurality of basic data blocks to at least one basic processing circuit of the plurality of basic processing circuits, and broadcast the broadcasting data block to the plurality of basic processing circuits.

The plurality of basic processing circuits are configured to perform computations on the broadcasting data block and the basic data blocks of the fixed point type to obtain computation results, and transfer the computation results to the main processing circuit.

The main processing circuit is configured to process the computation results to obtain an instruction result of the multiplication instruction.

Alternatively or additionally, the plurality of basic processing circuits are configured to multiply the broadcasting data block and the basic data blocks of the fixed point type to obtain products of the fixed point type, and transfer the products as computation results to the main processing circuit.

The main processing circuit is configured to convert the products of the fixed point type to products of the floating point type through the data type conversion circuit, accumulate the products of the floating point type to obtain accumulation results, and sort the accumulation results to obtain the instruction result.

Alternatively or additionally, the plurality of basic processing circuits are configured to perform inner product computations on the broadcasting data block and the basic data blocks of the fixed point type to obtain inner products of the fixed point type, and transfer the inner products as computation results to the main processing circuit.

The main processing circuit is configured to convert the inner products to inner products of the floating point type through the data type conversion circuit, and sort the inner products to obtain the instruction result.

Alternatively or additionally, the integrated circuit chip device further includes a branch processing circuit. The branch processing circuit is located between the main processing circuit and at least one basic processing circuit.

The branch processing circuit is configured to forward data between the main processing circuit and at least one basic processing circuit.

Alternatively or additionally, the main processing circuit is configured to broadcast the broadcasting data block as a whole to the plurality of basic processing circuits.

Alternatively or additionally, the main processing circuit is configured to partition the broadcasting data block into a plurality of partial broadcasting data blocks, and sequentially broadcast the plurality of partial broadcasting data blocks to the plurality of basic processing circuits.

Alternatively or additionally, the basic processing circuits are configured to perform inner product computations on the partial broadcasting data blocks and the basic data blocks of the fixed point type to obtain inner product results, and transfer the inner product results to the main processing circuit.

Alternatively or additionally, the basic processing circuits are configured to reuse the partial broadcasting data blocks for n times, perform n times of inner product computations on the partial broadcasting data blocks and the n basic data blocks to obtain n partial processing results, and transfer the n partial processing results to the main processing circuit, where n is an integer greater than or equal to 2.

A third aspect provides an integrated circuit chip device including a main processing circuit and a plurality of basic processing circuits. The main processing circuit includes a data type conversion circuit configured to convert data between a floating point data type and a fixed point data type.

The plurality of basic processing circuits are arranged as an array. Each basic processing circuit is connected to an adjacent basic processing circuit. The main processing circuit is connected to n basic processing circuits in a first row, n basic processing circuits in an $m^{th}$ row, and m basic processing circuits in a first column.

The main processing circuit is configured to obtain an input data block, a convolution kernel data block, and a convolution instruction, convert the input data block and the convolution kernel data block to an input data block of the fixed point type and a convolution kernel data block of the fixed point type through the data type conversion circuit, classify the input data block of the fixed point type into a broadcasting data block and the convolution kernel data block of the fixed point type into a distribution data block according to the convolution instruction, partition the distribution data block of the fixed point type to obtain a plurality of basic data blocks, distribute the plurality of basic data blocks to at least one of basic processing circuits connected to the main processing circuit, and broadcast the broadcasting data block to the basic processing circuits connected to the main processing circuit.

The plurality of basic processing circuits are configured to perform computations of a neural network in parallel according to the broadcasting data block of the fixed point type and the basic data blocks of the fixed point type to obtain computation results, and transfer the computation results to the main processing circuit through the basic processing circuits connected to the main processing circuit.

The main processing circuit is configured to process the computation results to obtain an instruction result of the convolution instruction.

Alternatively or additionally, the plurality of basic processing circuits are configured to perform inner product computations on the broadcasting data block and the basic data blocks of the fixed point type to obtain inner products of the fixed point type, accumulate the inner products to obtain accumulation results, and transfer the accumulation results as computation results to the main processing circuit through the basic processing circuits connected to the main processing circuit.

The main processing circuit is configured to convert the computation results of the fixed point type to computation results of the floating point type through the data type conversion circuit, and sort the computation results to obtain the instruction result.

Alternatively or additionally, the plurality of basic processing circuits are configured to perform inner product computations on the broadcasting data block and the basic data blocks of the fixed point type to obtain inner products of the fixed point type, and transfer the inner products as computation results to the main processing circuit through the basic processing circuits connected to the main processing circuit.

The main processing circuit is configured to convert the inner products to inner products of the floating point type through the data type conversion circuit, accumulate the inner products to obtain accumulation results, and sort the accumulation results to obtain the instruction result.

Alternatively or additionally, the main processing circuit is configured to broadcast the broadcasting data block as a whole to the basic processing circuits connected to the main processing circuit.

Alternatively or additionally, the main processing circuit is configured to partition the broadcasting data block into a plurality of partial broadcasting data blocks, and sequentially broadcast the plurality of partial broadcasting data blocks to the basic processing circuits connected to the main processing circuit.

Alternatively or additionally, the basic processing circuits are configured to perform inner product processing on the partial broadcasting data blocks and the basic data blocks of the fixed point type to obtain results of inner product processing, accumulate the results of inner product processing to obtain partial computation results, and send the partial computation results to the main processing circuit.

Alternatively or additionally, the basic processing circuits are configured to reuse the partial broadcasting data blocks for p times, perform p times of inner product computations on the partial broadcasting data blocks and the p basic data blocks to obtain p partial processing results. The p groups of inner computation results correspond to the p basic data blocks. The basic processing circuits are further configured to accumulate inner products computation results in each of the p groups of inner computation results to obtain p partial computation results, and transfer the p partial computation results to the main processing circuit, where p is an integer greater than or equal to 2.

Alternatively or additionally, the input data block may be one or more of a matrix, a three-dimensional data block, a four-dimensional data block, and an n-dimensional data block.

Alternatively or additionally, the convolution kernel data block may be one or more of a matrix, a three-dimensional data block, a four-dimensional data block, and an n-dimensional data block.

A fourth aspect provides an integrated circuit chip device configured to perform neural network training. The neural network has n layers, where n is an integer greater than or equal to 2. The integrated circuit chip device includes a main processing circuit and a plurality of basic processing circuits. The main processing circuit includes a data type conversion circuit configured to convert data between a floating point data type and a fixed point data type.

The integrated circuit chip device is configured to receive a training instruction, determine input data and weight group data of a first layer according to the training instruction, and perform forward computations of the n layers of the neural network on the input data and the weight group data of the first layer to obtain an $n^{th}$ output result of the forward computations.

The main processing circuit is configured to obtain an $n^{th}$ output result gradient according to the $n^{th}$ output result, obtain an $n^{th}$ backward computation of backward computations of an $n^{th}$ layer according to the training instruction, obtain an $n^{th}$ backward computation complexity according to the $n^{th}$ output result gradient, input data of the $n^{th}$ layer, weight group data of the $n^{th}$ layer, and the $n^{th}$ backward computation, and determine an $n^{th}$ back data type corresponding to the $n^{th}$ output result gradient, the input data of the $n^{th}$ layer, and the weight group data of the $n^{th}$ layer according to the $n^{th}$ backward computation complexity.

The main processing circuit is configured to determine the $n^{th}$ output result gradient, the input data of the $n^{th}$ layer, and the weight group data of the $n^{th}$ layer as a broadcasting data block and a distribution data block according to a type of the $n^{th}$ backward computation, partition the distribution data block of the $n^{th}$ back data type to obtain a plurality of basic data blocks, distribute the plurality of basic data blocks to at least one of the plurality of basic processing circuits, and broadcast the broadcasting data block of the $n^{th}$ back data type to the plurality of basic processing circuits.

The plurality of basic processing circuits are configured to perform computations on the broadcasting data block and the basic data blocks in the $n^{th}$ back data type to obtain computation results, and transfer the computation results to the main processing circuit.

The main processing circuit is configured to process the computation results to obtain a weight group gradient of the $n^{th}$ layer and an input data gradient of the $n^{th}$ layer, and update the weight group data of the $n^{th}$ layer according to the weight group gradient of the $n^{th}$ layer. The $n^{th}$ back data type includes a fixed point type or a floating point type.

The integrated circuit device is configured to perform backward computations of an $n-1^{th}$ layer by using the input data gradient of the $n^{th}$ layer as an $n-1^{th}$ output result gradient of the $n-1^{th}$ layer to obtain a weight group gradient of the $n-1^{th}$ layer, and update weight group data of a corresponding layer according to the weight group gradient of the $n-1^{th}$ layer, where the weight group data includes at least two weights.

Alternatively or additionally, the main processing circuit is configured to compare the $n^{th}$ backward computation complexity with a preset threshold. If the $n^{th}$ backward computation complexity is greater than the preset threshold, the main processing circuit determines the $n^{th}$ back data type as the fixed point type. If the $n^{th}$ backward computation complexity is less than or equal to the preset threshold, the main processing circuit determines the $n^{th}$ back data type as the floating point type.

Alternatively or additionally, the main processing circuit is configured to determine whether the $n^{th}$ output result gradient, the input data of the $n^{th}$ layer, and the weight group data of the $n^{th}$ layer belong to an $n+1^{th}$ back data type. If the $n+1^{th}$ back data type differs from the $n^{th}$ back data type, the main processing circuit converts the $n^{th}$ output result gradient, the input data of the $n^{th}$ layer, and the weight group data of $n^{th}$ layer belonging to the $n+1^{th}$ back data type to the $n^{th}$ output result gradient, the input data of the $n^{th}$ layer, and the weight group data of $n^{th}$ layer belonging to the $n^{th}$ back data type through the data type conversion circuit.

Alternatively or additionally, if the backward computations of the $n^{th}$ layer are convolution computations, the main processing circuit determines convolution input data as the input data of the $n^{th}$ layer, and a convolution kernel as the $n^{th}$ output result gradient.

The $n^{th}$ backward computation complexity is computed as: $n^{th}$ backward computation complexity=$\alpha*C*kH*kW*M*N*W*C*H$.

$\alpha$ is a convolution coefficient greater than 1. C, kH, kW, M are values of four dimensions of the convolution kernel. N, W, C, H are values of four dimensions of the convolution input data.

If the complexity is greater than the preset threshold, the main processing circuit determines the $n^{th}$ back data type as the floating point type, and determines whether the convolution input data and the convolution kernel are floating point data. If the convolution input data and the convolution kernel are not floating point data, the main processing circuit converts the convolution input data and the convolution kernel into floating point data, and perform convolution computations on the convolution input data and the convolution kernel of the floating point type.

Alternatively or additionally, if the $n^{th}$ backward computation is a matrix-multiply-matrix computation, the main processing circuit is further configured to determine the input data as the input data of the $n^{th}$ layer, and determine the weight as the $n^{th}$ output result gradient.

The complexity is computed as: complexity=$\beta*F*G*E*F$. $\beta$ is a matrix coefficient greater than or equal to 1. F and G are row and column values of the input data of the $n^{th}$ layer. E and F are row and column values of the weight.

If the complexity is greater than the preset threshold, the main processing circuit determines the $n^{th}$ back data type as the floating point type, and determines whether the input data and the weight of the $n^{th}$ layer are floating point data. If the input data and the weight of the $n^{th}$ layer are not floating point data, the main processing circuit converts the input data and the weight of the $n^{th}$ layer into floating point data, and performs matrix-multiply-matrix computations on the input data and the weight of the $n^{th}$ layer of the floating point type.

Alternatively or additionally, if the $n^{th}$ backward computation is a matrix-multiply-vector computation, the integrated circuit chip device is further configured to determine the input data as the input data of the $n^{th}$ layer, and determine the weight as the $n^{th}$ output result gradient.

The complexity=$\beta*F*G*F$. $\beta$ is a matrix coefficient greater than or equal to 1, F and G are row and column values of the input data of the $n^{th}$ layer. F is a column value of the $n^{th}$ output result gradient.

If the complexity is greater than the preset threshold, the integrated circuit chip device determines the $n^{th}$ back data type as the floating point type, and determines whether the input data and the weight of the $n^{th}$ layer are floating point data. If the input data and the weight of the $n^{th}$ layer are not floating point data, the integrated circuit chip device converts the input data and the weight of the $n^{th}$ layer into floating point data, and performs matrix-multiply-vector computations on the input data and the weight of the $n^{th}$ layer of the floating point type.

Alternatively or additionally, if the type of the $n^{th}$ backward computation is a multiplication computation, the main processing circuit is configured to classify both the input data of the $n^{th}$ layer and the weight group data of the $n^{th}$ layer into distribution data blocks, and classify the $n^{th}$ output result gradient into a broadcasting data block. If the type of the $n^{th}$ backward computation is a convolution computation, the main processing circuit is configured to classify both the input data of the $n^{th}$ layer and the weight group data of the $n^{th}$ layer into broadcasting data blocks, and classify the $n^{th}$ output result gradient into a distribution data block.

Alternatively or additionally, the backward computations of the $n^{th}$ layer further includes one or more of a bias computation, a fully connected computation, a GEMM computation, a GEMV computation, and an activation computation.

Alternatively or additionally, the main processing circuit includes a main register or a main on-chip caching circuit.

The basic processing circuits include basic registers or basic on-chip caching circuits.

Alternatively or additionally, the main processing circuit includes one or more of a vector computing unit circuit, an ALU (arithmetic and logic unit) circuit, an accumulator circuit, a matrix transposition circuit, a direct memory access circuit, or a data rearrangement circuit.

Alternatively or additionally, the $n^{th}$ output result gradient is one or more of a vector, a matrix, a three-dimensional data block, a four-dimensional data block, and an n-dimensional data block.

The $n^{th}$ input data is one or more of a vector, a matrix, a three-dimensional data block, a four-dimensional data block, and an n-dimensional data block.

The weight data of $n^{th}$ layer is one or more of a vector, a matrix, a three-dimensional data block, a four-dimensional data block, and an n-dimensional data block.

A fifth aspect provides an integrated circuit chip device configured to perform neural network training. The neural network has n layers, where n is an integer greater than or equal to 2. The integrated circuit chip device includes a main processing circuit and a plurality of basic processing circuits. The main processing circuit includes a data type conversion circuit configured to convert data between a floating point data type and a fixed point data type.

The plurality of basic processing circuits are arranged as an array. Each basic processing circuit is connected to an adjacent basic processing circuit. The main processing circuit is connected to n basic processing circuits in a first row, n basic processing circuits in an $m^{th}$ row, and m basic processing circuits in a first column.

The integrated circuit chip device is configured to receive a training instruction, determine input data and weight group data of a first layer according to the training instruction, and perform forward computations of the n layers of the neural network on the input data and the weight group data of the first layer to obtain an $n^{th}$ output result of the forward computations.

The main processing circuit is further configured to obtain an $n^{th}$ output result gradient according to the $n^{th}$ output result, obtain an $n^{th}$ backward computation of backward computations of an $n^{th}$ layer according to the training instruction, obtain an $n^{th}$ backward computation complexity according to the $n^{th}$ output result gradient, input data of the $n^{th}$ layer, weight group data of the $n^{th}$ layer, and the $n^{th}$ backward computation, and determine an $n^{th}$ back data type corresponding to the $n^{th}$ output result gradient, the input data of the $n^{th}$ layer, and the weight group data of the $n^{th}$ layer according to the $n^{th}$ backward computation complexity.

The main processing circuit is configured to classify the $n^{th}$ output result gradient, the input data of the $n^{th}$ layer, and the weight group data of the $n^{th}$ layer into a broadcasting data block and a distribution data block according to a type of the $n^{th}$ backward computation, partition the distribution data block of the $n^{th}$ back data type to obtain a plurality of basic data blocks, distribute the plurality of basic data blocks to at least one of the plurality of basic processing circuits, and broadcast the broadcasting data block of the $n^{th}$ back data type to the basic processing circuits connected to the main processing circuit.

The basic processing circuits are configured to perform computations of the neural network in parallel according to the broadcasting data block of the $n^{th}$ back data type and the basic data blocks of the $n^{th}$ back data type to obtain computation results, and transfer the computation results to the main processing circuit through the basic processing circuits connected to the main processing circuit.

The main processing circuit is configured to process the computation results to obtain a weight group gradient of the $n^{th}$ layer and an input data gradient of the $n^{th}$ layer, and update the weight group data of the $n^{th}$ layer according to the weight group gradient of the $n^{th}$ layer. The $n^{th}$ back data type includes a fixed point type or a floating point type.

The integrated circuit device is configured to perform backward computations of an $n-1^{th}$ layer by using the input data gradient of the $n^{th}$ layer as an $n-1^{th}$ output result gradient of the $n-1^{th}$ layer to obtain a weight group gradient of the $n-1^{th}$ layer, and update weight group data of a corresponding layer according to the weight group gradient of the $n-1^{th}$ layer, where the weight group data includes at least two weights.

Alternatively or additionally, the main processing circuit is configured to compare the $n^{th}$ backward computation complexity with a preset threshold. If the $n^{th}$ backward computation complexity is greater than the preset threshold, the main processing circuit determines the $n^{th}$ back data type as the fixed point type. If the $n^{th}$ backward computation complexity is less than or equal to the preset threshold, the main processing circuit determines the $n^{th}$ back data type as the floating point type.

Alternatively or additionally, the main processing circuit is configured to determine whether the $n^{th}$ output result gradient, the input data of the $n^{th}$ layer, and the weight group data of the $n^{th}$ layer belong to an $n+1^{th}$ back data type. If the $n+1^{th}$ back data type differs from the $n^{th}$ back data type, the main processing circuit converts the $n^{th}$ output result gradient, the input data of the $n^{th}$ layer, and the weight group data of $n^{th}$ layer belonging to the $n+1^{th}$ back data type to the $n^{th}$ output result gradient, the input data of the $n^{th}$ layer, and the weight group data of $n^{th}$ layer belonging to the $n^{th}$ back data type through the data type conversion circuit.

Alternatively or additionally, if the backward computations of the $n^{th}$ layer are convolution computations, the main processing circuit determines convolution input data as the input data of the $n^{th}$ layer, and a convolution kernel as the $n^{th}$ output result gradient.

The $n^{th}$ backward computation complexity is computed as: $n^{th}$ backward computation complexity=$\alpha*C*kH*kW*M*N*W*C*H$.

$\alpha$ is a convolution coefficient greater than 1. C, kH, kW, M are values of four dimensions of the convolution kernel. N, W, C, H are values of four dimensions of the convolution input data.

If the complexity is greater than the preset threshold, the main processing circuit determines the $n^{th}$ back data type as the floating point type, and determines whether the convolution input data and the convolution kernel are floating point data. If the convolution input data and the convolution kernel are not floating point data, the main processing circuit converts the convolution input data and the convolution kernel into floating point data, and performs convolution computations on the convolution input data and the convolution kernel of the floating point type.

Alternatively or additionally, if the $n^{th}$ backward computation is a matrix-multiply-matrix computation, the main processing circuit is configured to determine the input data as the input data of the $n^{th}$ layer, and determine the weight as the $n^{th}$ output result gradient.

The complexity is computed as complexity=$\beta*F*G*E*F$. $\beta$ is a matrix coefficient greater than or equal to 1, F and G are row and column values of the input data of the $n^{th}$ layer. E and F are row and column values of the weight.

If the complexity is greater than the preset threshold, the main processing circuit determines the $n^{th}$ back data type as the floating point type, and determines whether the input data and the weight of the $n^{th}$ layer are floating point data. If the input data and the weight of the $n^{th}$ layer are not floating point data, the main processing circuit converts the input data and the weight of the $n^{th}$ layer into floating point data, and performs matrix-multiply-matrix computations on the input data and the weight of the $n^{th}$ layer of the floating point type.

Alternatively or additionally, if the $n^{th}$ backward computation is a matrix-multiply-vector computation, the integrated circuit chip device is further configured to determine the input data as the input data of the $n^{th}$ layer, and determine the weight as the $n^{th}$ output result gradient.

The complexity is computed as complexity=$\beta*F*G*F$. $\beta$ is a matrix coefficient greater than or equal to 1. F and G are row and column values of the input data of the $n^{th}$ layer. F is a column value of the $n^{th}$ output result gradient.

If the complexity is greater than the preset threshold, the integrated circuit chip device determines the $n^{th}$ back data type as the floating point type, and determines whether the input data and the weight of the $n^{th}$ layer are floating point data. If the input data and the weight of the $n^{th}$ layer are not floating point data, the integrated circuit chip device notifies the k branch processing units to convert the input data and the weight of the $n^{th}$ layer into floating point data, and performs matrix-multiply-vector computations on the input data and the weight of the $n^{th}$ layer of the floating point type.

Alternatively or additionally, if the type of the $n^{th}$ backward computation is a multiplication computation, the main processing circuit is configured to classify both the input data of the $n^{th}$ layer and the weight group data of the $n^{th}$ layer into distribution data blocks, and classify the $n^{th}$ output result gradient as a broadcasting data block. If the type of the $n^{th}$ backward computation is a convolution computation, the main processing circuit is configured to classify both the input data of the $n^{th}$ layer and the weight group data of the $n^{th}$ layer into broadcasting data blocks, and classify the $n^{th}$ output result gradient into a distribution data block.

A sixth aspect provides an integrated circuit chip device configured to perform neural network forward computations. The neural network has n layers. The integrated circuit chip device includes a main processing circuit and a plurality of basic processing circuits. The main processing circuit includes a data type conversion circuit configured to convert data between a floating point data type and a fixed point data type.

The main processing circuit is configured to receive a first operation instruction, parse the first operation instruction to obtain a first computation instruction included in an $i^{th}$ layer of the forward computations of the first operation instruction and corresponding input data and weight data of the first operation instruction. i is an integer greater than or equal to 1 and less than or equal to n. For instance, if i is greater than or equal to 2, the input data is output data of an $i-1^{st}$ layer.

The main processing circuit is configured to determine a first complexity of the first computation instruction according to the input data, the weight data, and the first computation instruction, determine a first data type corresponding to the first computation instruction according to the first complexity, and determine whether to start the data type conversion circuit according to the first complexity. The first data type is the floating point type or the fixed point type.

The main processing circuit is configured to classify the input data of the first data type and the weight data of the first data type into a broadcasting data block and a distribution data block according to a type of the first computation instruction, partition the distribution data block to obtain a plurality of basic data blocks, distribute the plurality of basic data blocks to at least one of the plurality of basic processing circuits, and broadcast the broadcasting data block to the plurality of basic processing circuits.

The plurality of basic processing circuits are configured to perform computations on the broadcasting data block and the basic data blocks in the first data type to obtain computation results, and transfer the computation results to the main processing circuit.

The main processing circuit is configured to process the computation results to obtain an instruction result of the first computation instruction so that computations of the first computation instruction of the $i^{th}$ layer are completed.

Alternatively or additionally, the main processing circuit is configured to compare the first complexity with a preset threshold. If the first complexity is greater than the preset threshold, the main processing circuit determines the first data type as a fixed point type. If the first complexity is less than or equal to the preset threshold, the main processing circuit determines the first data type as a floating point type.

Alternatively or additionally, the main processing circuit is configured to determine whether the input data and the weight data belong to a second data type. If the second data type differs from the first data type, the main processing circuit converts the input data belonging to the second data type and the weight data belonging to the second data type into the input data belonging to the first data type and the weight data belonging to the first data type through the data type conversion circuit.

Alternatively or additionally, if the first computation instruction is a convolution computation instruction, the main processing circuit is configured to determine the input data as convolution input data, and determine the weight data as a convolution kernel.

The first complexity is computed as: the first complexity=$\alpha*C*kH*kW*M*N*W*C*H$.

$\alpha$ is a convolution coefficient greater than 1. C, kH, kW, M are values of four dimensions of the convolution kernel. N, W, C, H are values of four dimensions of the convolution input data.

If the first complexity is greater than the preset threshold, the main processing circuit determines whether the convolution input data and the convolution kernel are floating point data. If the convolution input data and the convolution kernel are not floating point data, the main processing circuit converts the convolution input data and the convolution kernel into floating point data, and performs convolution computations on the convolution input data and the convolution kernel of the floating point type.

Alternatively or additionally, if the first computation instruction is a matrix-multiply-matrix computation instruction, the main processing circuit is configured to determine the input data as a first matrix in the matrix-multiply-matrix computation, and determine the weight data as a second matrix in the matrix-multiply-matrix computation.

The first complexity is computed as: the first complexity=$\beta*F*G*E*F$. $\beta$ is a matrix coefficient greater than or equal to 1. F and G are row and column values of the first matrix. E and F are row and column values of the second matrix.

If the first complexity is greater than the preset threshold, the main processing circuit determines whether the first matrix and the second matrix are floating point data. If the first matrix and the second matrix are not floating point data, the main processing circuit converts the first matrix and the second matrix into floating point data, and performs matrix-multiply-matrix computations on the first matrix and the second matrix of the floating point type.

Alternatively or additionally, if the first computation instruction is a matrix-multiply-vector computation instruction, the main processing circuit is configured to determine the input data as a first matrix in the matrix-multiply-vector computation, and determine the weight as a vector in the matrix-multiply-vector computation.

The first complexity is computed as: the first complexity=$\beta*F*G*F$. $\beta$ is a matrix coefficient greater than or equal to 1. F and G are row and column values of the first matrix. F is a column value of the vector.

If the first complexity is greater than the preset threshold, the main processing circuit determines whether the first matrix and the vector are floating point data. If the first matrix and the vector are not floating point data, the main processing circuit converts the first matrix and the vector into floating point data, and performs matrix-multiply-vector computations on the first matrix and the vector of the floating point data type.

Alternatively or additionally, if the type of the first computation instruction is a multiplication instruction, the main processing circuit is configured to classify the input data into a distribution data block, and classify the weight data into a broadcasting data block. If the type of the first computation instruction is a convolution instruction, the main processing circuit classifies the input data into a broadcasting data block, and classifies the weight data into a distribution data block.

A seventh aspect provides an integrated circuit chip device configured to perform neural network forward computations. The neural network has n layers. The integrated circuit chip device includes a main processing circuit and a plurality of basic processing circuits. The main processing circuit includes a data type conversion circuit configured to convert data between a floating point data type and a fixed point data type.

The plurality of basic processing circuits are arranged as an array. Each basic processing circuit is connected to an adjacent basic processing circuit. The main processing circuit is connected to n basic processing circuits in a first row, n basic processing circuits in an $m^{th}$ row, and m basic processing circuits in a first column.

The main processing circuit is configured to receive a first operation instruction, parse the first operation instruction to obtain a first computation instruction included in an $i^{th}$ layer of the forward computations of the first operation instruction and corresponding input data and weight data of the first operation instruction. i is an integer greater than or equal to 1 and less than or equal to n. For instance, if i is greater than or equal to 2, the input data is output data of an $i-1^{th}$ layer.

The main processing circuit is configured to determine a first complexity of the first computation instruction according to the input data, the weight data, and the first computation instruction, determine a first data type corresponding to the first computation instruction according to the first complexity, and determine whether to start the data type conversion circuit according to the first complexity. The first data type is the floating point type or the fixed point type.

The main processing circuit is configured to classify the input data of the first data type and the weight data of the first data type into a broadcasting data block and a distribution data block according to a type of the first computation instruction, partition the distribution data block to obtain a plurality of basic data blocks, distribute the plurality of basic data blocks to the basic processing circuits connected to the main processing circuit, and broadcast the broadcasting data block to the basic processing circuits connected to the main processing circuit.

The basic processing circuits are configured to perform computations of the neural network in parallel according to the broadcasting data block of the first data type and the basic data blocks of the first data type to obtain computation results, and transfer the computation results to the main processing circuit through the basic processing circuits connected to the main processing circuit.

The main processing circuit is configured to process the computation results to obtain an instruction result of the first computation instruction so that computations of the first computation instruction of the $i^{th}$ layer are completed.

Alternatively or additionally, the main processing circuit is configured to compare the first complexity with a preset threshold. If the first complexity is greater than the preset threshold, the main processing circuit determines the first data type as a fixed point type. If the first complexity is less than or equal to the preset threshold, the main processing circuit determines the first data type as a floating point type.

Alternatively or additionally, the main processing circuit is configured to determine whether the input data and the weight data belong to a second data type. If the second data type differs from the first data type, the main processing circuit converts the input data belonging to the second data type and the weight data belonging to the second data type into the input data belonging to the first data type and the weight data belonging to the first data type through the data type conversion circuit.

Alternatively or additionally, if the first computation instruction is a convolution computation instruction, the main processing circuit is configured to determine the input data as convolution input data, and determine the weight data as a convolution kernel.

The first complexity is computed as: the first complexity=$\alpha*C*kH*kW*M*N*W*C*H$.

$\alpha$ is a convolution coefficient greater than 1. C, kH, kW, M are values of four dimensions of the convolution kernel. N, W, C, H are values of four dimensions of the convolution input data.

If the first complexity is greater than the preset threshold, the main processing circuit determines whether the convolution input data and the convolution kernel are floating point data. If the convolution input data and the convolution kernel are not floating point data, the main processing circuit converts the convolution input data and the convolution kernel into floating point data, and performs convolution computations on the convolution input data and the convolution kernel of the floating point type.

Alternatively or additionally, if the first computation instruction is a matrix-multiply-matrix computation instruction, the main processing circuit is configured to determine the input data as a first matrix in the matrix-multiply-matrix computation, and determine the weight data as a second matrix in the matrix-multiply-matrix computation.

The first complexity is computed as: the first complexity=$\beta*F*G*E*F$. $\beta$ is a matrix coefficient greater than or equal to 1. F and G are row and column values of the first matrix. E and F are row and column values of the second matrix.

If the first complexity is greater than the preset threshold, the main processing circuit determines whether the first matrix and the second matrix are floating point data. If the first matrix and the second matrix are not floating point data, the main processing circuit converts the first matrix and the second matrix into floating point data, and performs matrix-multiply-matrix computations on the first matrix and the second matrix of the floating point type.

Alternatively or additionally, if the first computation instruction is a matrix-multiply-vector computation instruction, the main processing circuit is configured to determine the input data as a first matrix in the matrix-multiply-vector computation, and determine the weight as a vector in the matrix-multiply-vector computation.

The first complexity is computed as: the first complexity=$\beta*F*G*F$. $\beta$ is a matrix coefficient greater than or equal to 1. F and G are row and column values of the first matrix. F is a column value of the vector.

If the first complexity is greater than the preset threshold, the main processing circuit determines whether the first matrix and the vector are floating point data. If the first matrix and the vector are not floating point data, the main processing circuit converts the first matrix and the vector into floating point data, and performs matrix-multiply-vector computations on the first matrix and the vector of the floating point data type.

Alternatively or additionally, if the type of the first computation instruction is a multiplication instruction, the main processing circuit is configured to classify the input data into a distribution data block, and classify the weight data into a broadcasting data block. If the type of the first computation instruction is a convolution instruction, the main processing circuit classifies the input data into a broadcasting data block, and classifies the weight data into a distribution data block.

BRIEF DESCRIPTION OF THE DRAWINGS

In order to illustrate the technical solutions in the examples of the present disclosure more clearly, the drawings to be used in the description of the examples are briefly explained below. Obviously, the drawings in the description below are some examples of the present disclosure. Other drawings can be obtained according to the disclosed drawings without any creative effort by those skilled in the art.

FIG. 3 is a structural diagram of a processing device according to the disclosure.

DETAILED DESCRIPTION

Technical solutions in examples of the present disclosure will be described clearly and completely hereinafter with reference to the accompanied drawings in the examples of the present disclosure. Obviously, the examples to be described are merely some rather than all examples of the present disclosure. All other examples obtained by those of ordinary skill in the art based on the examples of the present disclosure without creative efforts shall fall within the protection scope of the present disclosure.

Terms such as "first", "second", "third", and "fourth" in the specification, the claims, and the drawings are used for distinguishing different objects rather than describing a specific order. In addition, terms such as "include", "have", and any variant thereof are used for indicating non-exclusive inclusion. For instance, a process, a method, a system, a product, or an equipment including a series of steps or units is not limited to the listed steps or units, but optionally includes steps or units that are not listed, or optionally includes other steps or units inherent to the process, the method, the product, or the equipment.

Reference to "example" means that a particular feature, a structure, or a characteristic described in conjunction with the example may be included in at least one example of the present disclosure. The use of the term in various places in the specification does not necessarily refer to the same example, nor is it referring independent or alternative examples that are mutually exclusive with other examples. It is explicitly and implicitly understood by those skilled in the art that the examples described in the specification may be combined with other examples.

Figure 1A:
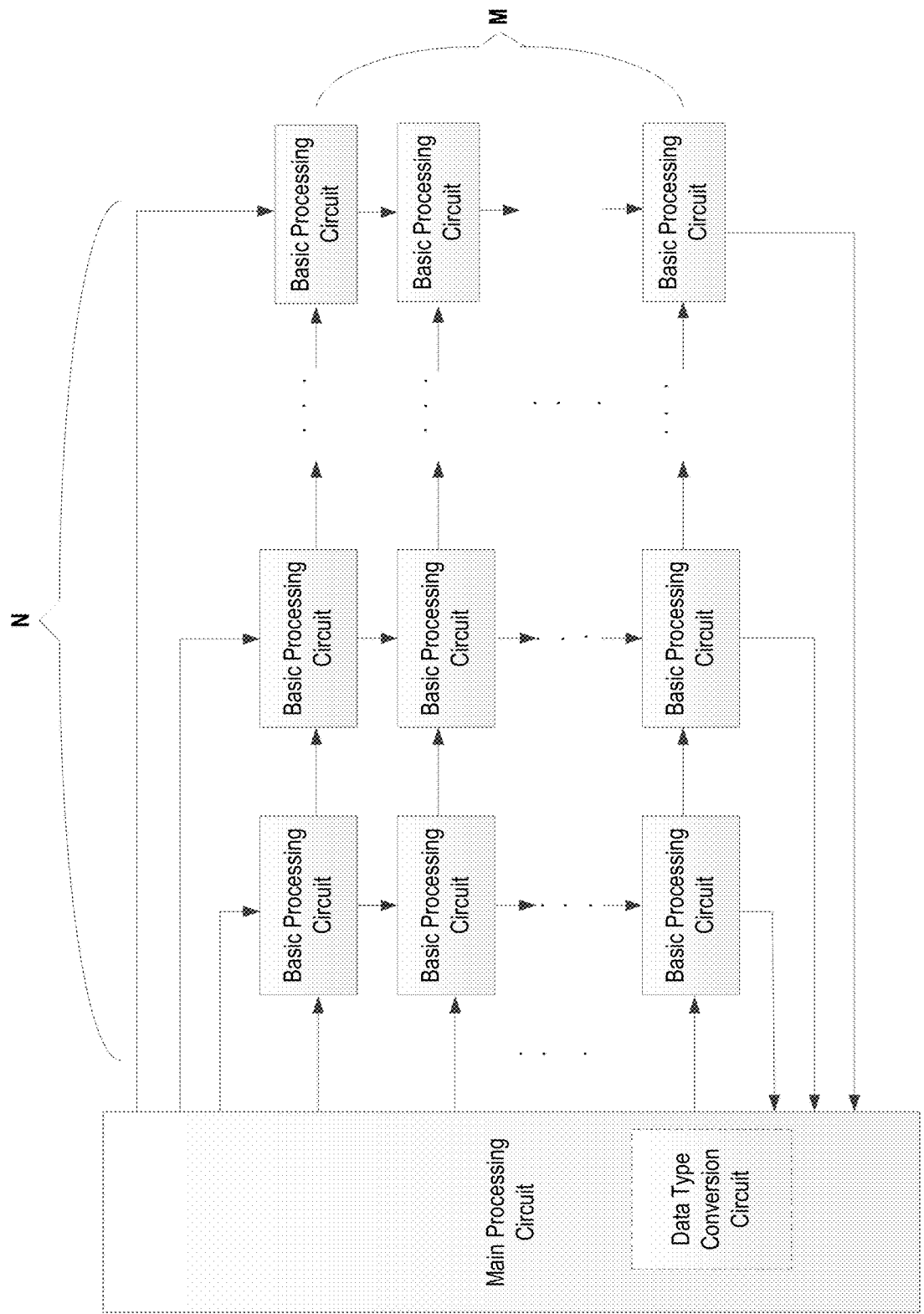
FIG. 1a is a structural diagram of an integrated circuit chip device.

FIG. 1a shows an integrated circuit chip device provided by the present disclosure. The integrated circuit chip device includes: a main processing circuit and a plurality of basic processing circuits. The plurality of basic processing circuits are arranged in a form of array (an m*n array), where m and n are integers greater than or equal to 1, and at least one of m and n is greater than or equal to 2. For the plurality of basic processing circuits which are arranged in the form of the m*n array, each basic processing circuit is connected to an adjacent basic processing circuit, and the main processing circuit is connected to k basic processing circuits of the plurality of basic processing circuits. The k basic processing circuits may be: n basic processing circuits in a first row, n basic processing circuits in an $m^{th}$ row, and m basic processing circuits in a first column. In the integrated circuit chip device shown in FIG. 1a, the main processing circuit and/or the plurality of basic processing circuits may include a data type conversion circuit. Specifically, some basic processing circuits of the plurality of basic processing circuits may include data type conversion circuits. For instance, in an alternative example, k basic processing circuits may include data type conversion circuits. In this way, n basic processing circuits may convert the data type of data of m basic processing circuits of a current column. This configuration may improve computational efficiency and reduce power consumption. This is because that the n basic processing circuits in the first row are the first to receive data sent from the main processing circuit, and by converting the received data into fixed point data, subsequent computations performed by basic processing circuits and data transferred by the basic processing circuits during the subsequent computations may be reduced. Similarly, setting data type conversion circuits in the m basic processing circuits of the first column may also have technical effects of fewer computations and less power consumption. In addition, according to the above-mentioned structure, the main processing circuit may use a dynamic data transfer strategy. For instance, the main processing circuit may broadcast data for broadcasting to the m basic processing circuits of the first column, and distribute data for distribution to the n basic processing circuits of the first row. Technical effects of the example include that by transferring different data to the basic processing circuits via different data input ports, the basic processing circuit may know the type of data merely according to a receiving port of the data without the need of distinguishing the type of the received data.

The main processing circuit may be configured to perform neural network computations in series, and transfer data to the basic processing circuits that are connected to the main processing circuit. The neural network computations in series may include but are not limited to: accumulation computations, ALU computations, activation computations, and the like.

The plurality of basic processing circuits are configured to perform computations in the neural network in parallel according to data being transferred, and transfer computation results to the main processing circuit through the basic processing circuits that are connected to the main processing circuit. The computations in the neural network that are performed in parallel may include but are not limited to: inner product computations, matrix or vector multiplication computations, and the like.

The main processing circuit may include: a data transfer circuit, a data receiving circuit or interface. A data distribution circuit and a data broadcasting circuit may be integrated in the data transfer circuit. In a certain application, the data distribution circuit and the data broadcasting circuit may also be set independently. Data for broadcasting refers to data that needs to be sent to each basic processing circuit. Data for distribution refers to data that needs to be sent to some basic processing circuits selectively. Specifically, taking a convolution computation as an instance, since convolution input data of the convolution computation needs to be sent to all basic processing circuits, the convolution input data is data for broadcasting, and since a convolution kernel needs to be sent to some basic processing circuit selectively, the convolution kernel is data for distribution. A method for selecting a basic processing circuit to receive the distribute data may be determined by the main processing circuit according to the loads and other allocation methods. A method for broadcasting data refers to transferring data for broadcasting to each basic processing circuit by broadcasting (in a certain application, the data for broadcasting may be transferred to each basic processing circuit by broadcasting for once or a plurality of times, and the times of broadcasting are not restricted in the example of the present disclosure). A method for distributing data refers to selectively transferring data for distribution to some basic processing circuits.

Figure 1B:
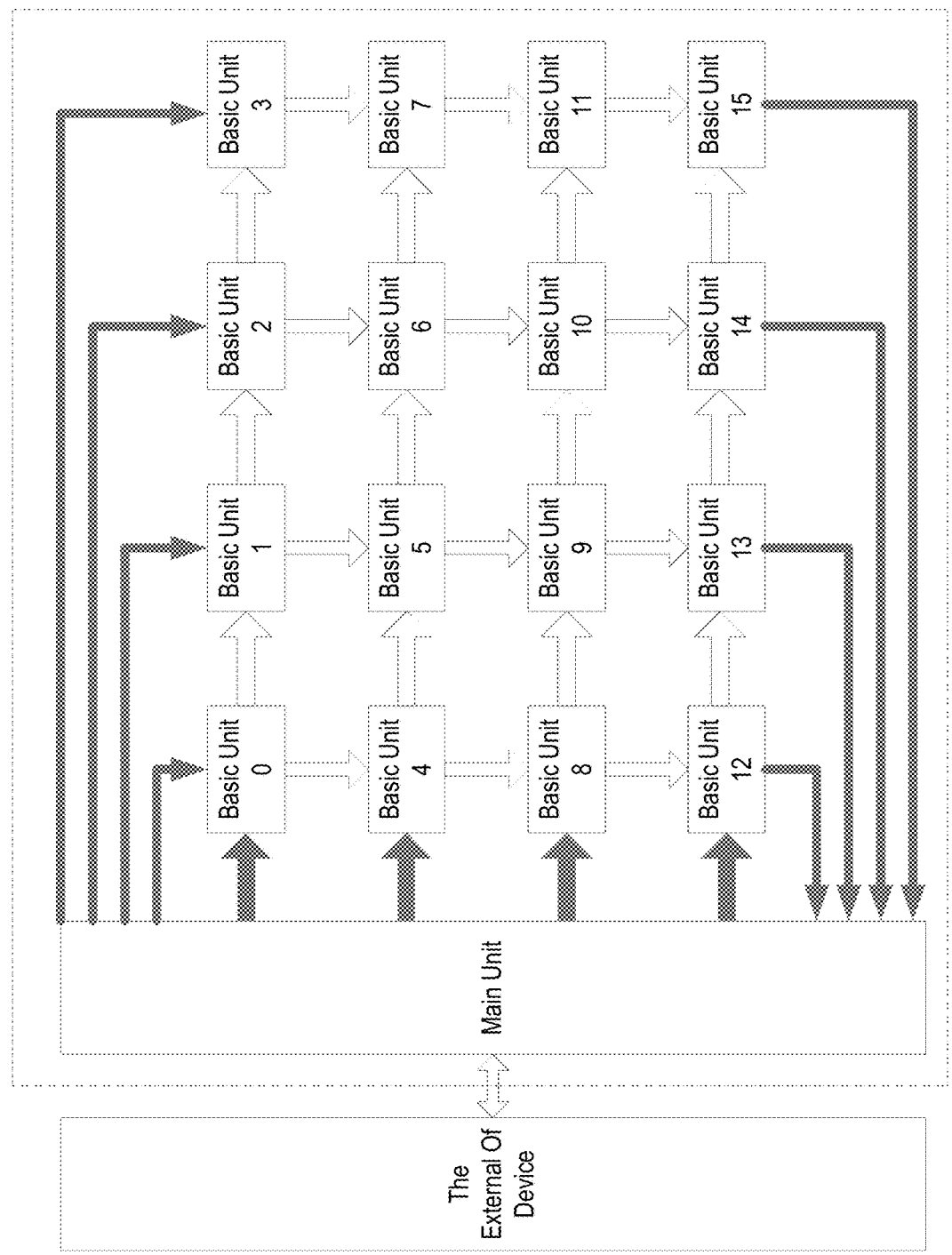
FIG. 1b is a structural diagram of other integrated circuit chip device.
Figure 1C:
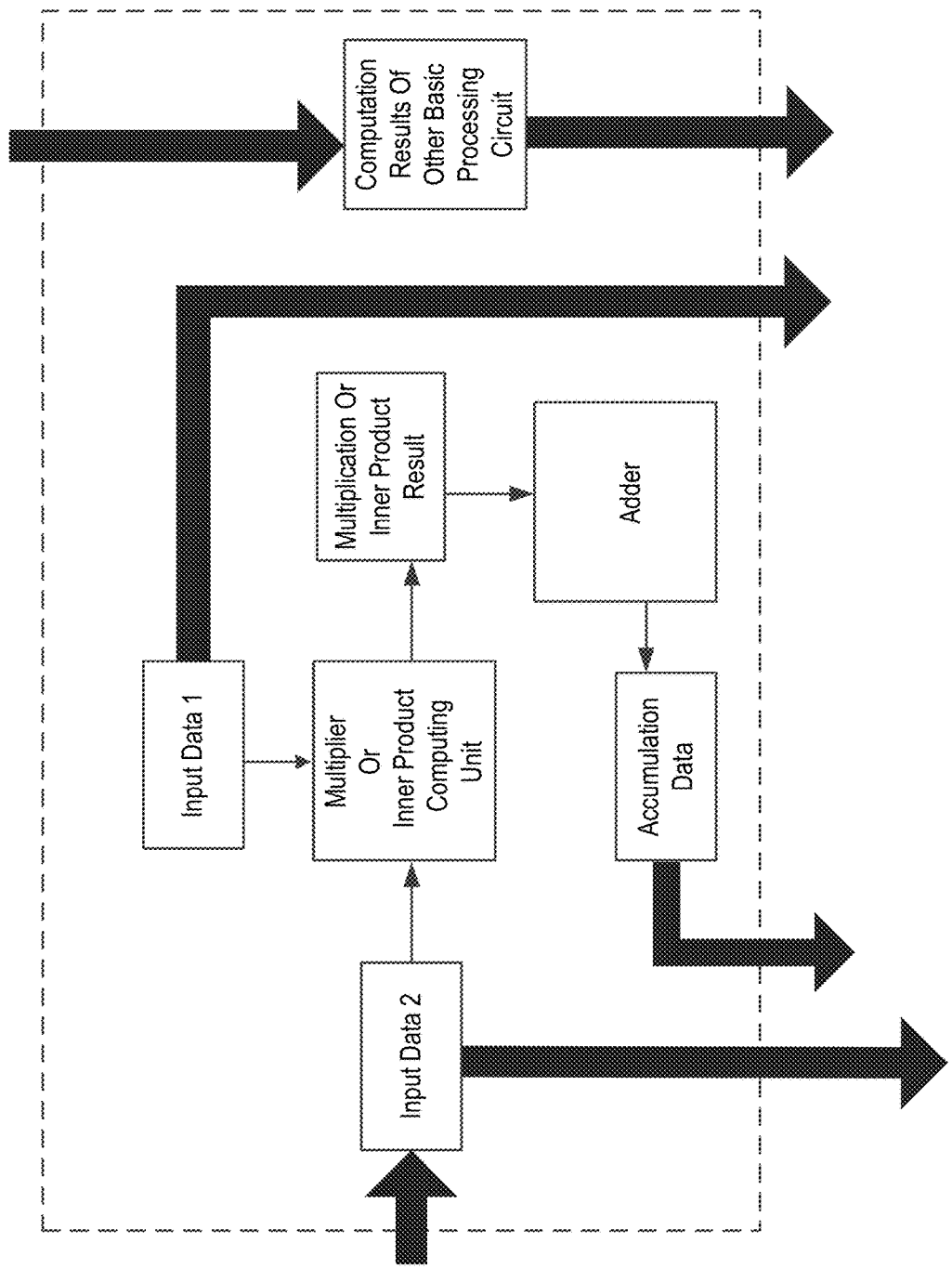
FIG. 1c is a structural diagram of a basic processing circuit.
Figure 1D:
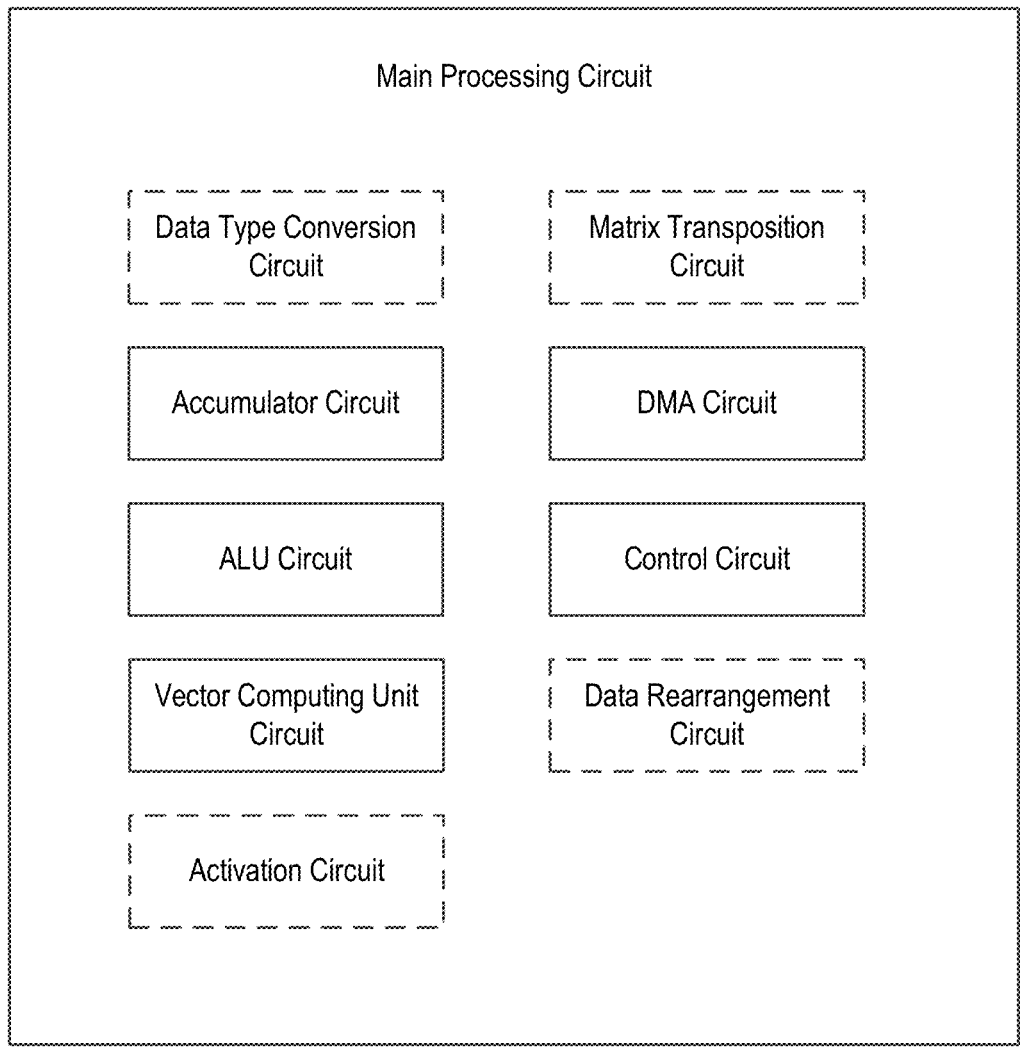
FIG. 1d is a structural diagram of a main processing circuit.

The main processing circuit (as shown in FIG. 1d) may include a register and/or an on-chip caching circuit. The main processing circuit may further include: a control circuit, a vector computing unit circuit, an ALU (Arithmetic and Logic Unit) circuit, an accumulator circuit, a DMA (Direct Memory Access) circuit, and the like. Of course, in a certain application, the main processing circuit may further include a conversion circuit (e.g., a matrix transposition circuit), a data rearrangement circuit, an activation circuit, or the like.

Each basic processing circuit may include a basic register and/or a basic on-chip caching circuit. Each basic processing circuit may further include one or more of an inner product computing unit circuit, a vector computing unit circuit, an accumulator circuit, and the like. The inner product computing unit circuit, the vector computing unit circuit, and the accumulator circuit may all be integrated circuits, or may be circuits that are set independently.

Alternatively or additionally, the accumulator circuits of the n basic processing circuits of the $m^{th}$ row may perform accumulation computations of inner product computations. This is because that the basic processing circuits of the $m^{th}$ row can receive multiplication results of all basic processing circuits of a current column, and the n basic processing circuits of the $m^{th}$ row can perform accumulation computations of inner product computations. In this way, computing resources may be effectively allocated, and the power consumption may be reduced. This technical scheme may be particularly suitable for a case where m is relatively large.

The main processing circuit may configure a circuit to perform data type conversion. Specifically, a circuit may be configured in an explicit manner or an implicit manner. For the explicit manner, the main processing circuit can configure a special indication or instruction. When a basic processing circuit receives the special indication or instruction, it determines to perform data type conversion. If a basic processing circuit does not receive the special indication or instruction, it determines not to perform data type conversion. For the implicit manner, when a basic processing circuit receives floating point data and determines to perform an inner product computation, the basic processing circuit may convert the data into fixed point data. For the manner of configuring explicitly, the special indication or instruction may configure a descending sequence. Every time after passing a basic processing circuit, the value of the descending sequence may reduce by 1. Then a basic processing circuit reads the value of the descending sequence. If the value is greater than zero, the basic processing circuit performs data type conversion. If the value is equal to or less than zero, the basic processing circuit does not perform data type conversion. This configuration is set according to the basic processing circuits arranged as an array. For instance, for the m basic processing circuits of the $i^{th}$ column, the main processing circuit requires the 5 basic processing circuits at the front to perform data type conversion. In this case, the main processing circuit sends a special instruction that includes a descending sequence. An initial value of the descending sequence may be 5. Every time after passing a basic processing circuit, the value of the descending sequence reduces by 1. At a sixth basic processing circuit, the value of the descending sequence is 0. At this point, the sixth basic processing circuit does not perform the data type conversion. By using this method, the main processing circuit may dynamically configure an execution subject and a count of execution times of data type conversion.

The main processing circuit is configured to obtain an input data block, a weight data block, and a multiplication instruction, convert the input data block and the weight data block to an input data block of the fixed point type and a weight data block of the fixed point type through the data type conversion circuit, classify the input data block of the fixed point type into a distribution data block and the weight data block of the fixed point type into a broadcasting data block according to the multiplication instruction, partition the weight data block of the fixed point type to obtain a plurality of basic data blocks, distribute the plurality of basic data blocks to at least one of basic processing circuits connected to the main processing circuit, and broadcast the broadcasting data block to the basic processing circuits connected to the main processing circuit.

The plurality of basic processing circuits are configured to perform computations of a neural network in parallel according to the broadcasting data block of the fixed point type and the basic data blocks of the fixed point type to obtain computation results, and transfer the computation results to the main processing circuit through the basic processing circuits connected to the main processing circuit.

An example of the present disclosure provides an integrated circuit chip device. The integrated circuit chip device includes a main processing circuit (may also be referred to as a main unit) and a plurality of basic processing circuits (may also be referred to as basic units). A structure of the example is shown in FIG. 1b. What is inside a dashed box is an internal structure of the neural network computing device. Gray arrows indicate data transfer paths between the main processing circuit and a basic processing circuit array. Outlined arrows indicate data transfer paths between the respective basic processing circuits (adjacent basic processing circuits) in the basic processing circuit array. The length and width of the basic processing circuit array may be different. In other words, the values of m and n may be different or the same. The present disclosure does not restrict the specific values.

FIG. 1c shows a circuit structure of a basic processing circuit. A dashed box in the figure indicates the border of the basic processing circuit. A thick arrow that intersects the dashed box indicates a data input pathway and a data output pathway (the arrow pointing to the internal of the dashed box is the input pathway, and the arrow pointing to the external of the dashed box is the output pathway). A rectangular box inside the dashed box indicates a storage unit circuit (a register and/or an on-chip cache) including input data 1, input data 2, and a result of multiplication or inner product, and accumulation data. A diamond-shaped box indicates a computing unit circuit including a multiplier or inner product computing unit, and an adder.

In the present disclosure, the neural network computing device includes a main processing circuit and 16 basic processing circuits (the 16 basic processing circuit are given by way of illustration, other number may be used in a certain application).

In the present example, a basic processing circuit has two data input interfaces and two data output interfaces. In the following description of the present example, a horizontal input interface (a horizontal arrow pointing to a present unit as shown in FIG. 1b) is referred to as input 0, and a vertical input interface (a vertical arrow pointing to a present unit as shown in FIG. 1b) is referred to as input 1, a horizontal data output interface (a horizontal arrow pointing away from a present unit as shown in FIG. 1b) is referred to as output 0, a vertical data output interface (a vertical arrow pointing away from a present unit as shown in FIG. 1b) is referred to as an output 1.

The data input interface and the data output interface of each basic processing circuit may be connected to different units respectively including the main processing circuit and other basic processing circuits.

In the present example, inputs 0 of the four basic processing circuits 0, 4, 8, 12 (see FIG. 1b for the serial numbers) are connected to the data output interfaces of the main processing circuit.

Inputs 1 of the four basic processing circuits 0, 1, 2, 3 are connected to the data output interfaces of the main processing circuit.

Outputs 1 of basic processing circuits 12,13,14,15 are connected to the data input interfaces of the main processing circuit.

Connections of the output interfaces of the basic processing circuits and the input interfaces of other basic processing circuits of the present example can be seen in FIG. 1b, thus are not explained in detail here.

Specifically, an output interface S1 of a S unit is connected to an input interface P1 of a P unit, which indicates that data sent by the S unit to the S1 interface can be received by the P unit via the P1 interface.

The present example includes a main processing circuit. The main processing circuit is connected to an external device (in other words, the main processing circuit has both input interfaces and output interfaces). Some data output interfaces of the main processing circuit are connected to the data input interfaces of some basic processing circuits. Some data input interfaces of the main processing circuit are connected to the data output interfaces of some basic processing circuits.

An example of the present disclosure provides a method of using the integrated circuit chip device.

Data involved in the method provided by the present disclosure may be data of any data type. For instance, the data may be data represented by a floating point number of any bit width or data represented by a fixed point number of any bit width.

Figure 1E:
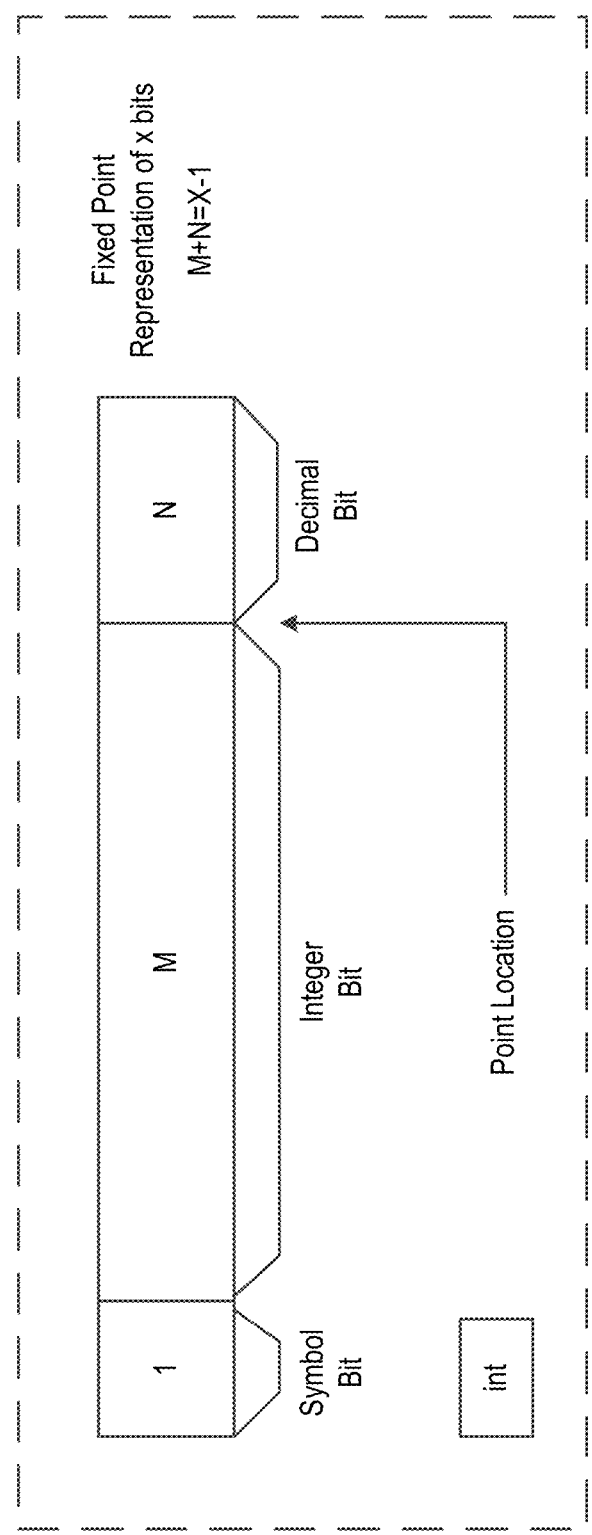
FIG. 1e is a schematic diagram of a fixed point data type.

FIG. 1e is a structural diagram of the fixed point data. FIG. 1e shows a method of representing fixed point data. For a computing system, the storage bit of one set of floating point data is 32 bits. For fixed point data, particularly a data representation using the floating point data shown in FIG. 1e, the storage bit of one set of fixed point data can be reduced to less than 16 bits, which may greatly reduce transferring overhead between computing units during conversion. In addition, for a computing unit, the storage space of data having fewer bits may be smaller, which in other words, means that the storage overhead may be less, computations may also be reduced, and the computational overhead may be reduced. In this case, the fixed point data shown in FIG. 1e may reduce the computational overhead and storage overhead. However, data type conversion requires some computational overhead, which will be referred to as conversion overhead below. For data that requires a large amount of computations and storage, the conversion overhead is almost negligible compared with subsequent computational overhead, storage overhead, and transferring overhead. In this case, the present disclosure adopts a technical solution of converting data into fixed point data for data that require a large amount of computations and a large amount of storage. On the contrary, for data that requires a small amount of computations and storage, the data require less computational overhead, storage overhead, and transferring overhead. Since the precision of fixed point data is lower than the precision of floating point data, if fixed point data is used, under the premise that the amount of computations is relatively small, the fixed point data may be converted to floating point data so that the precision of computations can be guaranteed. In other words, the precision of computations may be improved by increasing a small amount of overhead.

Computations that need to be completed in the basic processing circuits may be performed according to the following method:

converting, by the main processing circuit, the type of data, then transferring the data to the basic processing circuits for computations (for instance, the main processing circuit may convert a floating point number to a fixed point number that has less bit width, and may transfer the fixed point number to the basic processing circuits. Technical effects of the method include that the bit width of data being transferred may be reduced, the total count of bits being transferred may be reduced, the basic processing circuits may achieve better efficiency with less power consumption when performing fixed point computations of such bit width).

After the basic processing circuits receive the data, the basic processing circuits may first perform data type conversion before performing computations (for instance, the basic processing circuits receive a floating point number transferred from the main processing circuit, then the basic processing circuits convert the floating point number to a fixed point number for performing computations. In this way, the computational efficiency may be improved, and the power consumption may be reduced).

After the basic processing circuits obtain results by computing, the results may first be subject to data type conversion and then be transferred to the main processing circuit (for instance, a computation result of a floating point number that is obtained by a basic processing circuit may first be converted into a fixed point number with less bit width, then the fixed point number is transferred to the main processing circuit. Technical effects of this method include that the bit width during the transferring process may be reduced, and better efficiency with less power consumption may be realized).

Figure 2A:
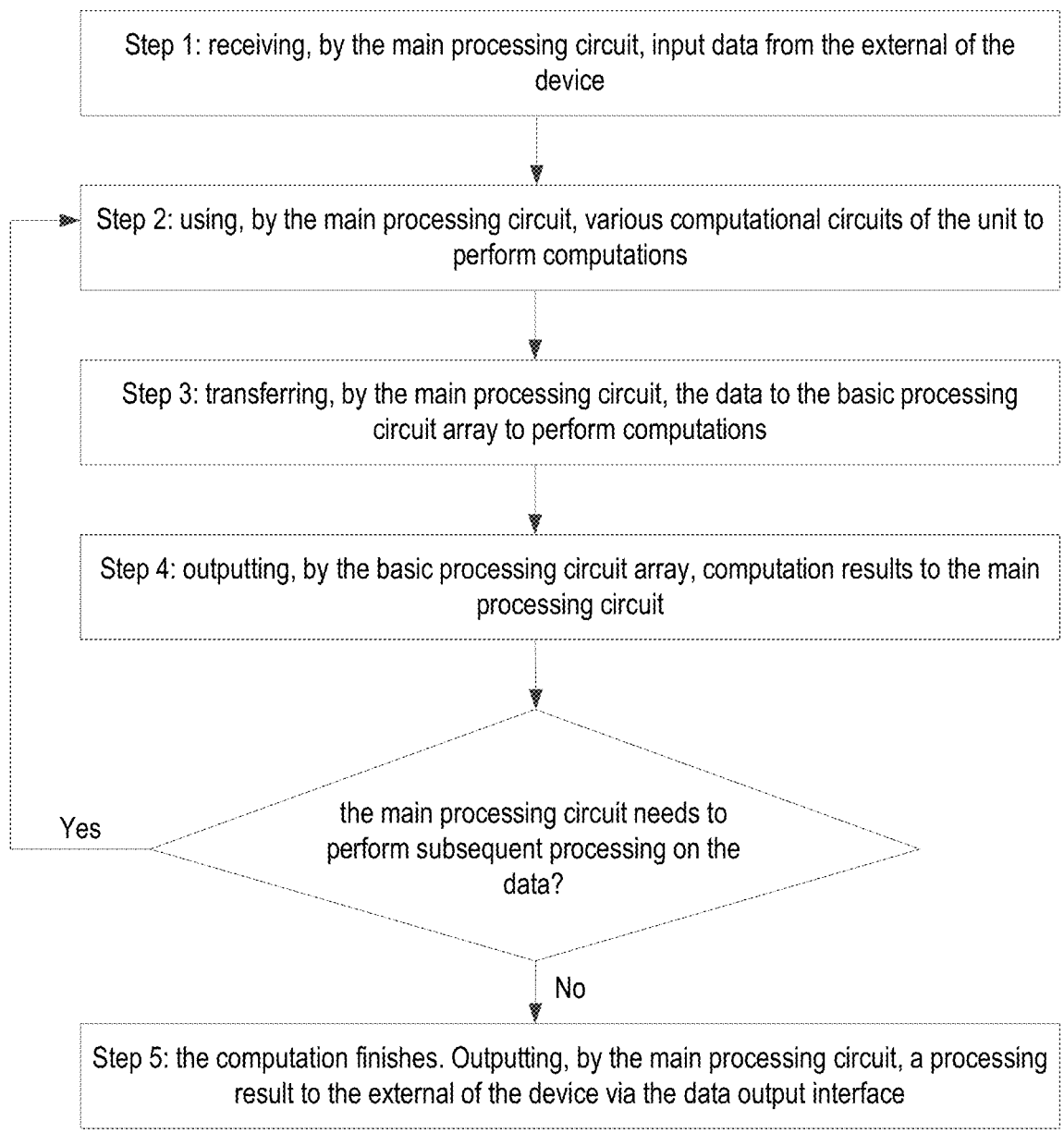
FIG. 2a is a schematic diagram showing a method of using a basic processing circuit.
Figure 2B:
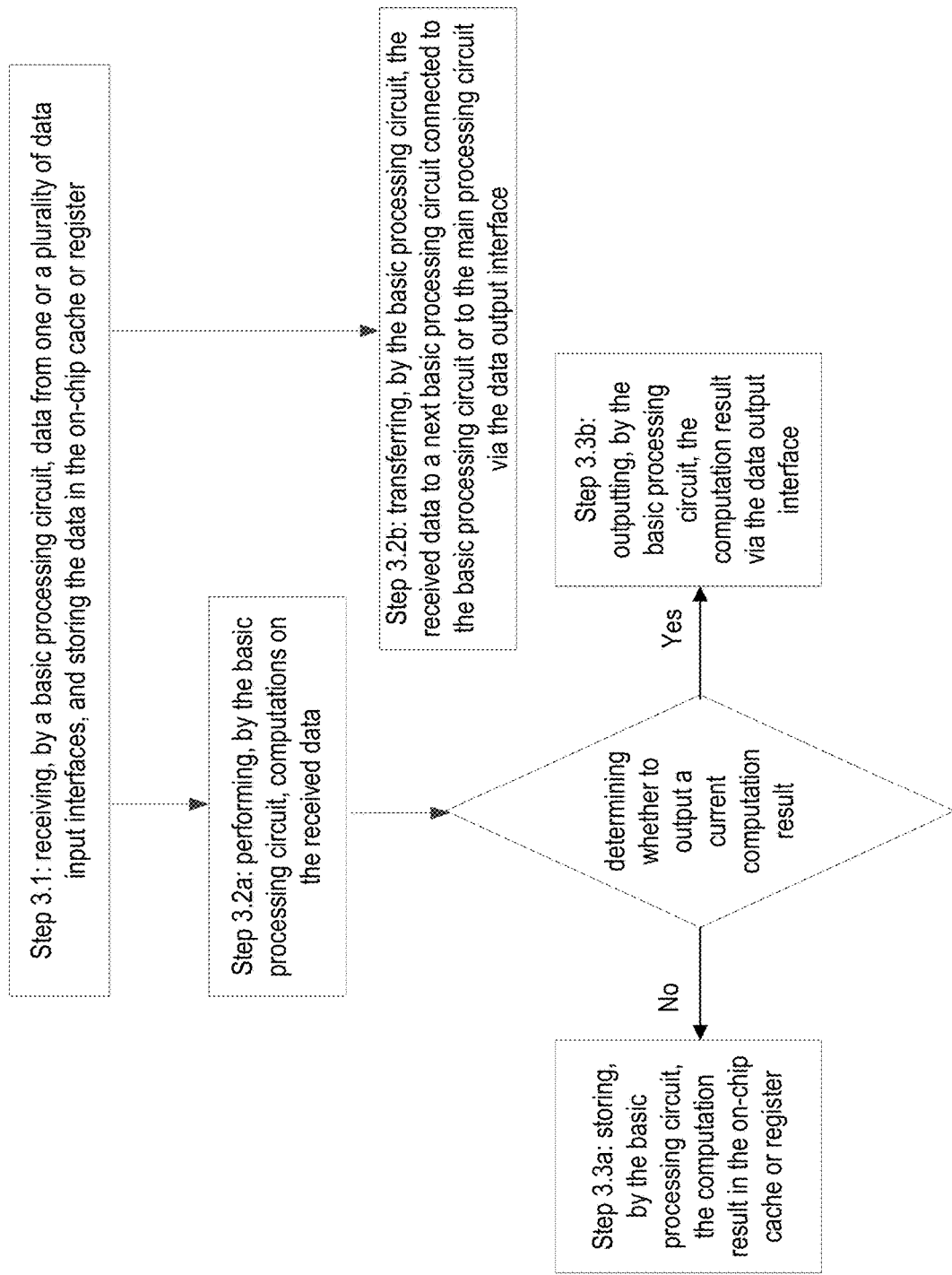
FIG. 2b is a schematic diagram showing data transfer by a main processing circuit.

A method of using the basic processing circuits (as shown in FIG. 2a) may include:

receiving, by the main processing circuit, input data to be computed from the external of the device;

Alternatively or additionally, using, by the main processing circuit, various computational circuits of the present unit such as the vector computational circuit, the inner product computing unit circuit, and the accumulator circuit to perform computations on the data; and transferring (as shown in FIG. 2b), by the main processing circuit via the data output interface, the data to the basic processing circuit array (the set of all the basic processing circuits is referred to as a basic processing circuit array).

A method of transferring data here may be transferring data to some basic processing circuits directly, which in other words, refers to a method of broadcasting for a plurality of times.

A method of transferring data here may also be transferring different data to different basic processing circuits, which in other words, refers to a method of distributing.

The method of using the basic processing circuits further includes: performing, by the basic processing circuit array, computations on the data; and performing, by the basic processing circuits, computations after receiving the data.

Alternatively or additionally, after a basic processing circuits receives data, the method includes: outputting, by a basic processing circuit, the data via the data output interface of the unit (the basic processing circuit transfers data to another basic processing circuit that does not receive data from the main processing circuit directly).

Alternatively or additionally, the method includes: transferring, by a basic processing circuit, a computation result (an intermediate result or a final computation result) via the data output interface;

receiving, by the main processing circuit, output data returned by the basic processing circuit array;

Alternatively or additionally, processing (such as accumulating or activation operating), by the main processing circuit, the data received from the basic processing circuit array; and transferring, by the main processing circuit, a processing result to the external of the device via the data output interface after finishing the processing.

The present disclosure may use the circuit device to perform a matrix-multiply-vector computation (the matrix-multiply-vector computation refers to a computation of obtaining a vector by: performing inner product computations between each row of a matrix and a vector, and placing the results according to a corresponding order).

Figure 2C:
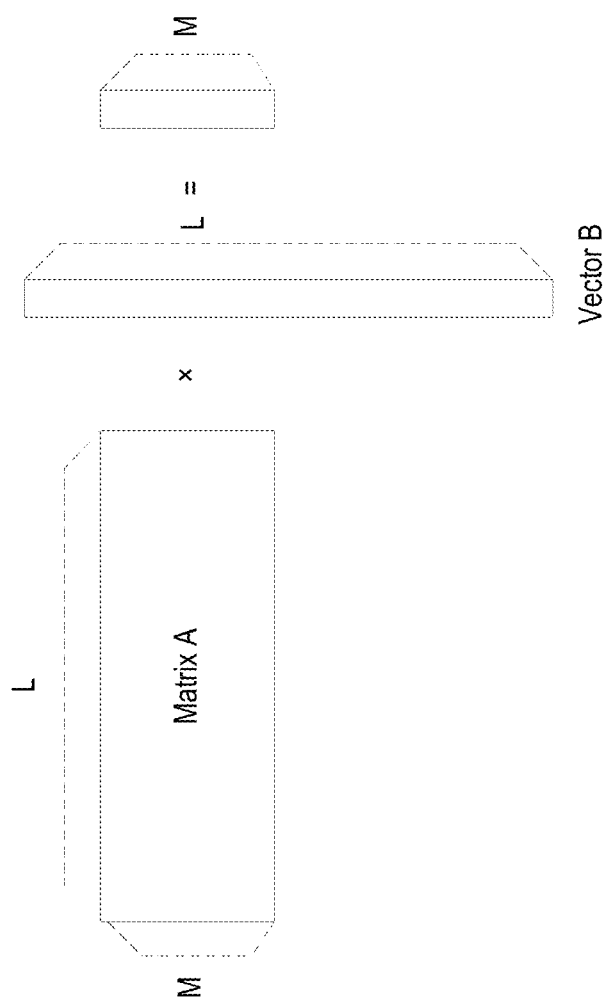
FIG. 2c is a schematic diagram showing a matrix-multiply-vector computation.

Below is a description of performing multiplication of a matrix S with a size of M rows and L columns and a vector P with a length of L, which is shown in FIG. 2c.

The present method may use all or some of the basic processing circuits of the neural network computing device. It is assumed that K basic processing circuits are used.

The main processing circuit transfers data in all or some rows of the matrix S to each of the K basic processing circuits.

In an alternative example, each time, the control circuit of the main processing circuit transfers a number or some numbers of data in a row of the matrix S to a basic processing circuit. For instance, when a number is transferred at a time, for a basic processing circuit, a $1^{st}$ number in a $3^{rd}$ row is transferred at a $1^{st}$ time, a $2^{nd}$ number in the $3^{rd}$ row is transferred at a $2^{nd}$ time, a $3^{rd}$ number in the $3^{rd}$ row is transferred at a $3^{rd}$ time, . . . ; or when some numbers are transferred at a time, first two numbers (a first number and a second number) in a $3^{rd}$ row are transferred at a $1^{st}$ time, a $3^{rd}$ number and a $4^{th}$ number in the $3^{rd}$ row are transferred at a $2^{nd}$ time, a $5^{th}$ number and a $6^{th}$ number in the $3^{rd}$ row are transferred at a $3^{rd}$ time . . . .

In an alternative example, each time, the control circuit of the main processing circuit transfers a number or some numbers of some rows of data of the matrix S to a basic processing circuit. For instance, for a basic processing circuit, $1^{st}$ numbers in a $3^{rd}$, $4^{th}$, and $5^{th}$ rows are transferred at a $1^{st}$ time, $2^{nd}$ numbers in the $3^{rd}$, $4^{th}$, and $5^{th}$ rows are transferred at a $2^{nd}$ time, $3^{rd}$ numbers in the $3^{rd}$, $4^{th}$, and $5^{th}$ rows are transferred at a $3^{rd}$ time, . . . ; or first two numbers in the $3^{rd}$, $4^{th}$, and $5^{th}$ rows are transferred at a $1^{st}$ time, $3^{rd}$ numbers and $4^{th}$ numbers in the $3^{rd}$, $4^{th}$, and $5^{th}$ rows are transferred at a $2^{nd}$ time, $5^{th}$ numbers and $6^{th}$ numbers in the $3^{rd}$, $4^{th}$, and $5^{th}$ rows are transferred at a $3^{rd}$ time . . . .

The control circuit of the main processing circuit successively transfers data in the vector P to the zeroth basic processing circuit.

After receiving the data of the vector P, the zeroth basic processing circuit transfers the data to a next basic processing circuit that is connected to the zeroth basic processing circuit, which is the basic processing circuit 1.

Specifically, some basic processing circuits cannot obtain data required for computations directly from the main processing circuit. For instance, the basic processing circuit 1 in FIG. 2d only has one data input interface that is connected to the main processing circuit. In this case, the basic processing circuit 1 can only obtain data of the matrix S directly from the main processing circuit, and has to obtain data of the vector P from the basic processing circuit 0. Similarly, after receiving the data of the vector P, the basic processing circuit 1 continues to output the data to the basic processing circuit 2.

Each basic processing circuit performs computations on the received data, where the computations may include, but is not limited to: an inner product computation, a multiplication computation, an addition computation, and the like.

In an alternative example, each time, the basic processing circuit performs multiplication on one group or a plurality of groups of two sets of data, then accumulates results in the register and/or on-chip cache.

In an alternative example, each time, the basic processing circuit computes an inner product of one group or a plurality of groups of two vectors, then accumulates results in the register and/or on-chip cache.

After a basic processing circuit obtains results by computing, the basic processing circuit outputs the result via the data output interface (in other words, transfers the result to another basic processing circuit that is connected to the basic processing circuit).

In an alternative example, the computation result may be a final result or an intermediate result of an inner product computation.

After receiving a computation result from another basic processing circuit, a basic processing circuit transfers the data to yet another basic processing circuit that is connected to the basic processing circuit or to the main processing circuit.

The main processing circuit receives inner product computation results transferred by each of the basic processing circuits, and processes (which may be an accumulation computation, an activation computation, or the like) the results to obtain a final result.

The following describes an example of using the computing device to realize a matrix-multiply-vector computation.

Figure 2D:
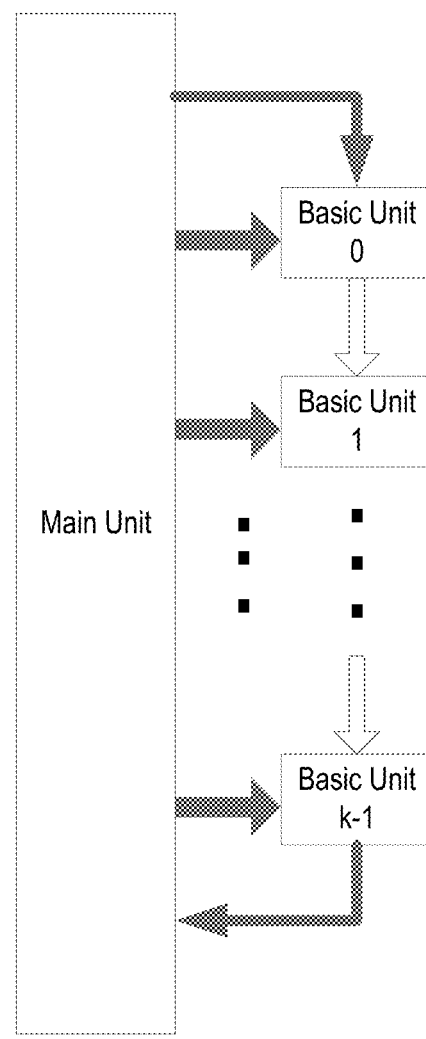
FIG. 2d is a structural diagram of an integrated circuit chip device.
Figure 2E:
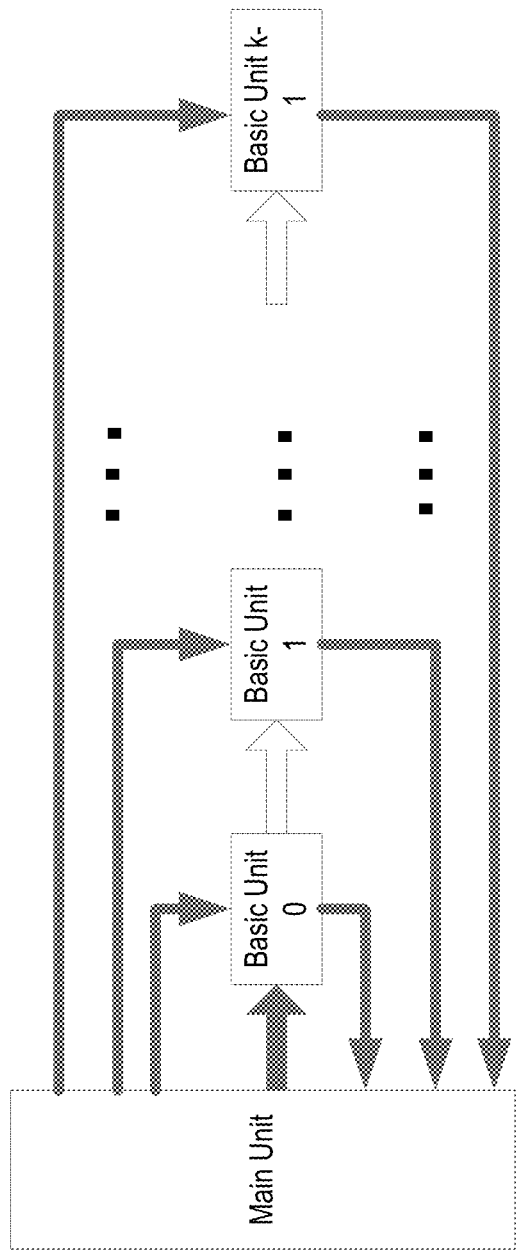
FIG. 2e is a structural diagram of another integrated circuit chip device.

In an alternative example, a plurality of basic processing circuits used in the method may be arranged according to a manner shown in FIG. 2d or FIG. 2e.

As shown in FIG. 2c, the data type conversion circuit of the main processing circuit converts the matrix S and the matrix P into fixed point data. The control circuit of the main processing circuit divides M rows of data of the matrix S into K groups. An $i^{th}$ basic processing circuit is configured to perform the computation of an $i^{th}$ group (a set of rows in the group of data is referred to as Ai).

A method of grouping the M rows of data is any grouping method as long as there is no repeated allocation.

In an alternative example, the following grouping method may be used: allocating a $j^{th}$ row to a j % $K^{th}$ (% is a computation for taking a remainder) basic processing circuit.

As an alternative example, in a case where rows cannot be grouped evenly, some rows may be grouped evenly first, and the remaining rows may be allocated in any manner.

Each time, the control circuit of the main processing circuit successively transfers data of some or all rows in the matrix S to corresponding basic processing circuits.

In an alternative example, each time, the control circuit of the main processing circuit transfers one or a plurality of data in a row of data of an $i^{th}$ group of data Mi that the $i^{th}$ basic processing circuit is responsible for to the $i^{th}$ basic processing circuit.

In an alternative example, each time, the control circuit of the main processing circuit transfers one or a plurality of data in each row of some or all rows of the $i^{th}$ group of data Mi that the $i^{th}$ basic processing circuit is responsible for to the $i^{th}$ basic processing circuit.

The control circuit of the main processing circuit successively transfers data in the vector P to the first basic processing circuit.

In an alternative example, each time, the control circuit of the main processing circuit transfers one or a plurality of data in the vector P.

After the $i^{th}$ basic processing circuit receives the data of the vector P, the $i^{th}$ basic processing circuit transfers the data of the vector P to an $i+1^{th}$ basic processing circuit that is connected to the $i^{th}$ basic processing circuit.

After each basic processing circuit receives one or a plurality of data from one or a plurality of rows of the matrix S and one or a plurality of data from the vector P, the basic processing circuit performs computations (the computations include but are not limited to multiplication or addition).

In an alternative example, each time, a basic processing circuit performs multiplication on one group or a plurality of groups of two sets of data, then accumulates results in the register and/or on-chip cache.

In an alternative example, each time, a basic processing circuit computes an inner product of one group or a plurality of groups of two vectors, then accumulates results in the register and/or the on-chip cache.

In an alternative example, data received by a basic processing circuit may be an intermediate result that is stored in the register and/or the on-chip cache.

The basic processing circuit transfers a local computation result to another basic processing circuit that is connected to the basic processing circuit or the main processing circuit.

In an alternative example, corresponding to a structure shown in FIG. 2d, only the output interface of a last basic processing circuit in each column is connected to the main processing circuit. In this case, only the last basic processing circuit can directly transfer a local computation result to the main processing circuit. Computation results of other basic processing circuits all need to be transferred to subsequent basic processing circuits, and then be transferred by the subsequent basic processing circuits to basic processing circuits after the subsequent basic processing circuits, until the computation results are transferred to the last basic processing circuit. The last basic processing circuit accumulates a local computation result with results received from other basic processing circuits of the column to obtain an intermediate result and transfers the intermediate result to the main processing circuit. The last basic processing circuit may also transfer the local computation result and the results received from other basic processing circuits of the column to the main processing circuit directly.

In an alternative example, corresponding to a structure of FIG. 2e, each basic processing circuit has an output interface that is connected to the main processing circuit. In this case, each basic processing circuit can transfer a local computation result to the main processing circuit directly.

After a basic processing circuit receives a computation result from another basic processing circuit, the basic processing circuit transfers the data to yet another basic processing circuit that is connected to the basic processing circuit or to the main processing circuit.

The main processing circuit receives results of M inner product computations. The results serve as a computation result of the matrix-multiply-vector computation.

The present disclosure uses the circuit device to perform a matrix-multiply-matrix computation.

Figure 2F:
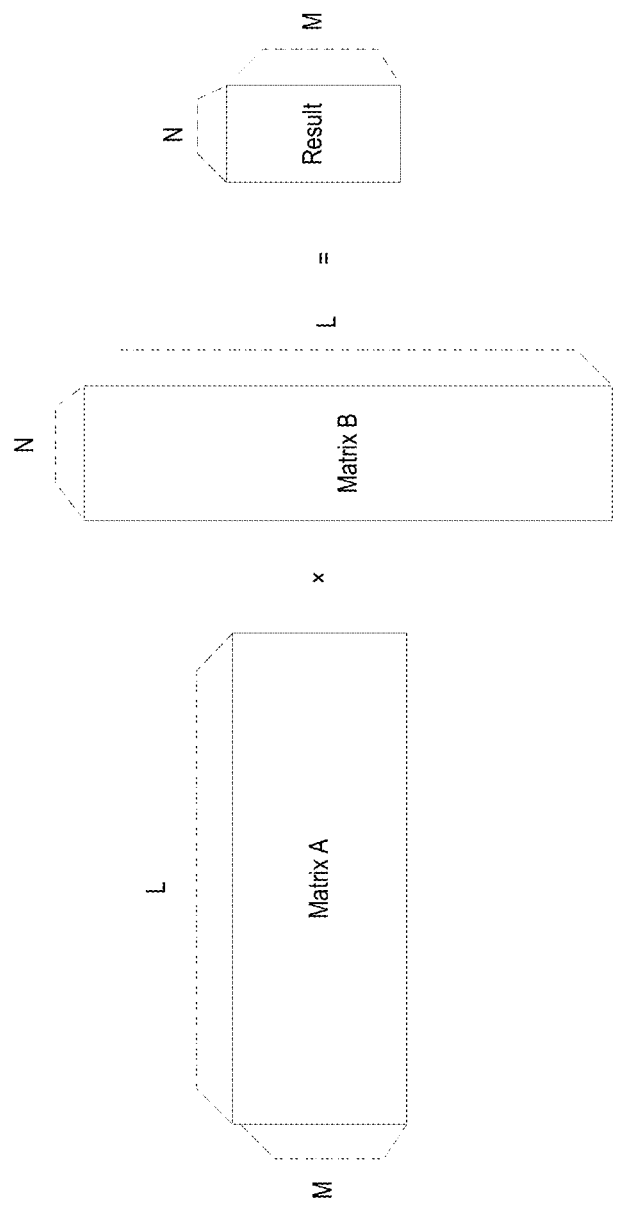
FIG. 2f is a schematic diagram showing a matrix-multiply-vector computation.

Below is a description of performing multiplication of a matrix S with a size of M rows and L columns and a matrix P with a size of L rows and N columns (each row of the matrix S is as long as each column of the matrix P, which is as shown in FIG. 2f).

The method is explained by using the device of FIG. 1b.

The method includes: converting, by the data type conversion circuit of the main processing circuit, the matrix S and the matrix P into fixed point data.

The control circuit of the main processing circuit transfers data of some or all rows of the matrix S to basic processing circuits that are directly connected to the main processing circuit via horizontal data input interfaces (for instance, gray vertical data pathways at the top of FIG. 1b).

In an alternative example, each time, the control circuit of the main processing circuit transfers a number or some numbers of data in a row of the matrix S to a basic processing circuit (for instance, for a basic processing circuit, a $1^{st}$ number in a $3^{rd}$ row is transferred at a $1^{st}$ time, a $2^{nd}$ number in the $3^{rd}$ row is transferred at a $2^{nd}$ time, a $3^{rd}$ number in the $3^{rd}$ row is transferred at a $3^{rd}$ time, . . . ; or first two numbers in the $3^{rd}$ row are transferred at a $1^{st}$ time, a $3^{rd}$ number and a $4^{th}$ number in the $3^{rd}$ row are transferred at a $2^{nd}$ time, a $5^{th}$ number and a $6^{th}$ number in the $3^{rd}$ row are transferred at a $3^{rd}$ time, . . . ).

In an alternative example, each time, the control circuit of the main processing circuit transfers a number or some numbers of some rows of data of the matrix S to a basic processing circuit (for instance, for a basic processing circuit, $1^{st}$ numbers in a $3^{rd}$, $4^{th}$, and $5^{th}$ rows are transferred at a $1^{st}$ time, $2^{nd}$ numbers in the $3^{rd}$, $4^{th}$, and $5^{th}$ rows are transferred at a $2^{nd}$ time, $3^{rd}$ numbers in the $3^{rd}$, $4^{th}$, and $5^{th}$ rows are transferred at a $3^{rd}$ time, . . . ; or first two numbers in the $3^{rd}$, $4^{th}$, and $5^{th}$ rows are transferred at a $1^{st}$ time, $3^{rd}$ numbers and $4^{th}$ numbers in the $3^{rd}$, $4^{th}$, and $5^{th}$ rows are transferred at a $2^{nd}$ time, $5^{th}$ numbers and $6^{th}$ numbers in the $3^{rd}$, $4^{th}$, and $5^{th}$ rows are transferred at a $3^{rd}$ time, . . . ).

The control circuit of the main processing circuit transfers data of some or all columns of the matrix P to basic processing circuits that are directly connected to the main processing circuit via vertical data input interfaces (for instance, gray horizontal data pathways on the left of the basic processing circuit array shown in FIG. 1b).

In an alternative example, each time, the control circuit of the main processing circuit transfers a number or some numbers of a column of the matrix P to a basic processing circuit (for instance, for a basic processing circuit, a $1^{st}$ number in a $3^{rd}$ column is transferred at a $1^{st}$ time, a $2^{nd}$ number in the $3^{rd}$ column is transferred at a $2^{nd}$ time, a $3^{rd}$ number in the $3^{rd}$ column is transferred at a $3^{rd}$ time, . . . ; or first two numbers in the $3^{rd}$ column are transferred at a $1^{st}$ time, a $3^{rd}$ number and a $4^{th}$ number in the $3^{rd}$ column are transferred at a $2^{nd}$ time, a $5^{th}$ number and a $6^{th}$ number in the $3^{rd}$ column are transferred at a $3^{rd}$ time, . . . ).

In an alternative example, each time, the control circuit of the main processing circuit transfers a number or some numbers of some columns of data of the matrix P to a basic processing circuit. For instance, for a basic processing circuit, $1^{st}$ numbers in a $3^{rd}$, $4^{th}$, and $5^{th}$ columns are transferred at a $1^{st}$ time, $2^{nd}$ numbers in the $3^{rd}$, $4^{th}$, and $5^{th}$ columns are transferred at a $2^{nd}$ time, $3^{rd}$ numbers in the $3^{rd}$, $4^{th}$, and $5^{th}$ columns are transferred at a $3^{rd}$ time, . . . ; or first two numbers in the $3^{rd}$, $4^{th}$, and $5^{th}$ columns are transferred at a $1^{st}$ time, $3^{rd}$ numbers and $4^{th}$ numbers in the $3^{rd}$, $4^{th}$, and $5^{th}$ columns are transferred at a $2^{nd}$ time, $5^{th}$ numbers and $6^{th}$ numbers in the $3^{rd}$, $4^{th}$, and $5^{th}$ columns are transferred at a $3^{rd}$ time . . . .

After a basic processing circuit receives the data of the matrix S, the basic processing circuit transfers the data to a subsequent basic processing circuit that is connected to the basic processing circuit via a horizontal data output interface of the basic processing circuit (for instance, white horizontal data pathways at the center of the basic processing circuit array shown in FIG. 1b). After a basic processing circuit receives the data of matrix P, the basic processing circuit transfers the data to a subsequent basic processing circuit that is connected to the basic processing circuit via a vertical data output interface of the basic processing circuit (for instance, white vertical data pathways at the center of the basic processing circuit array shown in FIG. 1b).

Each basic processing circuit performs computations on received data.

In an alternative example, each time, a basic processing circuit performs multiplication on one group or a plurality of groups of two sets of data, then accumulates results in the register and/or the on-chip cache.

In an alternative example, each time, a basic processing circuit computes an inner product of one group or a plurality of groups of two vectors, then accumulates results in the register and/or on-chip cache.

After the basic processing circuit obtains a result by computing, the basic processing circuit outputs the result through the data output interface.

In an alternative example, the computation result may be a final result or an intermediate result of an inner product computation.

Specifically, if the basic processing circuit has an output interface that is directly connected to the main processing circuit, the basic processing circuit outputs the result via the interface. If the basic processing circuit does not have such output interface, the basic processing circuit outputs the result towards a basic processing circuit that can output to the main processing circuit directly (for instance, in FIG. 1b, basic processing circuits at a bottom row can transfer results to the main processing circuit directly, in this case, other basic processing circuits may transfer results downwards via vertical output interfaces).

After the basic processing circuit receives a computation result from another basic processing circuit, the basic processing circuit transfers the data to yet another basic processing circuit that is connected to the basic processing circuit or to the main processing circuit.

The basic processing circuit outputs the result towards the main processing circuit (for instance, in FIG. 1b, the basic processing circuits at the bottom row can transfer results to the main processing circuit, in this case, other basic processing circuits transfer results downwards via vertical output interfaces).

The main processing circuit receives inner product computation results transferred by each basic processing circuit, so that an output result can be obtained.

The present disclosure further provides an example of a method of a matrix-multiply-matrix computation.

The method uses a basic processing circuit array arranged according to the manner shown in FIG. 1b. It is assumed that there are h rows and w columns.

The method includes: converting, by the data type conversion circuit of the main processing circuit, a matrix S and a matrix P into fixed point data; and dividing, by the control circuit of the main processing circuit, the h rows of data of the matrix S into h groups, where an $i^{th}$ basic processing circuit performs the computations of an $i^{th}$ group (a set of rows in the group of data is referred to as Hi), and a method of grouping the h rows of data is any grouping method as long as there is no repeated allocation.

In an alternative example, the following allocation method may be used: allocating, by the control circuit of the main processing circuit, a $j^{th}$ row to a j % $h^{th}$ basic processing circuit.

As an alternative example, in a case where rows cannot be grouped evenly, some rows may be grouped evenly first, and the remaining rows may be allocated in any manner.

The method further includes: dividing, by the control circuit of the main processing circuit, the W columns of data of the matrix P into w groups, where the $i^{th}$ basic processing circuit performs the computations of an $i^{th}$ group (a set of rows in the group of data is referred to as Wi), and a method of grouping the W columns of data is any grouping method as long as there is no repeated allocation.

In an alternative example, the following allocation method may be used: allocating, by the control circuit of the main processing circuit, a $j^{th}$ row to a j % $w^{th}$ basic processing circuit.

As an alternative example, in a case where columns cannot be grouped evenly, some columns may be grouped evenly first, and the remaining columns may be allocated in any manner.

The method further includes: transferring, by the control circuit of the main processing circuit, data in all or some rows of the matrix S to each basic processing circuit in each row of the basic processing circuit array.

In an alternative example, each time, the control circuit of the main processing circuit transfers one or a plurality of data in a row of data of an $i^{th}$ group of data Hi that a $1^{st}$ basic processing circuit of an $i^{th}$ row of the basic processing circuit array is responsible for to the $1^{st}$ basic processing circuit.

In an alternative example, each time, the control circuit of the main processing circuit may transfer one or a plurality of data in each row of some or all rows of the $i^{th}$ group of data Hi that the $1^{st}$ basic processing circuit of the $i^{th}$ row of the basic processing circuit array is responsible for to the $1^{st}$ basic processing circuit; and the control circuit of the main processing circuit transfers data in some or all columns of the matrix P to a $1^{st}$ basic processing circuit in each column of the basic processing circuit array.

In an alternative example, each time, the control circuit of the main processing circuit transfers one or a plurality of data in a column of data of an $i^{th}$ group of data Wi that a $1^{st}$ basic processing circuit of an $i^{th}$ column of the basic processing circuit array is responsible for to the $1^{st}$ basic processing circuit.

In an alternative example, each time, the control circuit of the main processing circuit transfers one or a plurality of data in each column of some or all columns of an $i^{th}$ group of data Ni that the $1^{th}$ basic processing circuit of the $i^{th}$ column of the basic processing circuit array is responsible for to the $1^{th}$ basic processing circuit.

After a basic processing circuit receives the data of the matrix S, the basic processing circuit transfers the data to a subsequent basic processing circuit that is connected to the basic processing circuit via a horizontal data output interface of the basic processing circuit (for instance, white horizontal data pathways at the center of the basic processing circuit array shown in FIG. 1b). After a basic processing circuit receives the data of matrix P, the basic processing circuit transfers the data to a subsequent basic processing circuit that is connected to the basic processing circuit via a vertical data output interface of the basic processing circuit (for instance, white vertical data pathways at the center of the basic processing circuit array shown in FIG. 1b).

Each basic processing circuit performs computations on received data.

In an alternative example, each time, a basic processing circuit performs multiplication on one group or a plurality of groups of two sets of data, then accumulates results in the register and/or the on-chip cache.

In an alternative example, each time, a basic processing circuit computes an inner product of one group or a plurality of groups of two vectors, then accumulates results in the register and/or on-chip cache.

After the basic processing circuit obtains a result by computing, the basic processing circuit outputs the result through the data output interface.

In an alternative example, the computation result may be a final result or an intermediate result of an inner product computation.

Specifically, if the basic processing circuit has an output interface that is directly connected to the main processing circuit, the basic processing circuit outputs the result via the interface. If the basic processing circuit does not have such output interface, the basic processing circuit outputs the result towards a basic processing circuit that can output a result to the main processing circuit directly (for instance, basic processing circuits at a bottom row can transfer results to the main processing circuit directly, and other basic processing circuits may transfer results downwards via vertical output interfaces).

After a basic processing circuit receives a computation result from another basic processing circuit, the basic processing circuit transfers the data to yet another basic processing circuit that is connected to the basic processing circuit or to the main processing circuit.

The basic processing circuit outputs a result towards the main processing circuit (for instance, basic processing circuits at a bottom row can transfer results to the main processing circuit directly, and other basic processing circuits may transfer results downwards via vertical output interfaces).

The main processing circuit receives inner product computation results transferred by each basic processing circuit, so that an output result can be obtained.

The words "horizontal", "vertical", and the like used in the description above are only for the purpose of explaining the example shown in FIG. 1b. In a certain application, it is only required that "horizontal" and "vertical" interfaces of each unit represent two different interfaces.

The present disclosure can use the circuit device to perform a fully connected computation.

If input data of a fully connected layer is a vector (in other words, a case where input of a neural network is a single sample), a weight matrix of the fully connected layer serves as a matrix S, an input vector serves as a vector P. A matrix-multiply-vector computation can be performed according to the method of the device.

If the input data of the fully connected layer is a matrix (in other words, a case where the input of the neural network is a plurality of samples), the weight matrix of the fully connected layer serves as the matrix S, the input vector serves as a matrix P, or the weight matrix of the fully connected layer serves as the matrix P, and the input vector serves as the matrix S. A matrix-multiply-matrix computation may be performed according to the method of the device.

The present disclosure provides a method of using the circuit device to perform an activation function computation.

The method includes: using the activation circuit of the main processing circuit to input a vector, and computing to obtain an activation vector of the vector.

In an alternative example, the activation circuit of the main processing circuit performs a computation to obtain a numerical value for each value of an input vector according to an activation function (input of the activation function is a numerical value, and output is also a numerical value), and outputs the numerical value to a corresponding position of an output vector.

In an alternative example, the activation function may be: $y=\max(m, x)$. x denotes an input numerical value, y denotes an output numerical value, and m denotes a constant.

In an alternative example, the activation function may be: y=tan h(x). x denotes an input numerical value, and y denotes an output numerical value.

In an alternative example, the activation function may be: y=sigmoid(x). x denotes an input numerical value, and y denotes an output numerical value.

In an alternative example, the activation function may be a piecewise linear function.

In an alternative example, the activation function may be a function of randomly inputting a number and outputting a number.

In an alternative example, a source of the input vector may include but is not limited to: an external data source of the device.

In an alternative example, the input data may come from a computation result of a matrix-multiply-vector computation performed by the device.

In an alternative example, the input data may come from a computation result of a matrix-multiply-matrix computation performed by the device.

The main processing circuit of the device computes to obtain a result.

In an alternative example, the input data may come from a computation result obtained after the main processing circuit of the device is biased.

The present disclosure provides a method of using the device to realize BLAS (Basic Linear Algebra Subprograms).

A GEMM computation refers to a computation of matrix-matrix multiplication in a BLAS library. A common representation of the computation is C=alpha*op(S)*op(P)+beta*C. A and B denote two input matrices, C denotes an output matrix, alpha and beta denote scalars, op denotes an operation performed on the matrix S or P. In addition, other supporting integers may be used as parameters to explain the width and height of the matrices A and B.

A step of using the device to realize the GEMM computation is:

before an op operation, converting, by the main processing circuit, the data type of the input matrix S and the matrix P; and performing, by the conversion circuit of the main processing circuit, corresponding op operations on the matrix S and the matrix P respectively.

In an alternative example, the op operation may be a matrix transposition operation which can be realized by using a vector computation function or data rearrangement function of the main processing circuit (as described above, the main processing circuit has a data rearrangement circuit). In a certain application, the op operation may also be realized by the conversion circuit directly. Taking the matrix transposition operation as an instance, the op operation may be realized by the matrix transposition circuit directly.

As an alternative example, the op operation of a matrix may be null, which means the op operation may not be performed.

The computation method of matrix-multiply-matrix may be used to perform a matrix multiplication computation between op(S) and op(P).

The arithmetic and logic circuit of the main processing circuit may be used to perform an operation of multiplying each value in a result of op(S)*op(P) by alpha.

As an alternative example, in a case where alpha is 1, the operation of multiplying a value by alpha may not be performed.

The arithmetic and logic circuit of the main processing circuit may be used to realize a computation of beta*C.

As an alternative example, in a case where beta is 1, the operation of multiplying by beta may not be performed.

The arithmetic and logic circuit of the main processing circuit may be used to realize a step of adding corresponding positions of matrices alpha*op(S)*op(P) and beta*C together.

As an alternative example, in a case where beta is 0, the operation of adding may not be performed.

A GEMV computation refers to a computation of matrix-vector multiplication in a BLAS library. A common representation of the computation is C=alpha*op(S)*P+beta*C. S denotes an input matrix, P denotes an input vector, C denotes an output vector, alpha and beta denote scalars, and op denotes an operation performed on the matrix S.

A step of using the device to realize the GEMV computation is:

before an op operation, converting, by the main processing circuit, the data type of the input matrix S and the matrix P; and performing, by the conversion circuit of the main processing circuit, a corresponding op operation on the matrix S.

As an alternative example, op may be a matrix transposition operation. The matrix transposition circuit of the main processing circuit may be used to realize the matrix transposition operation.

As an alternative example, op of a matrix may be null, which means the op operation may not be performed.

The computation method of matrix-multiply-vector may be used to perform a matrix-vector multiplication between the matrix op(S) and the vector op(P).

The arithmetic and logic circuit of the main processing circuit may be used to perform an operation of multiplying each value in a result of op(S)*P by alpha.

As an alternative example, in a case where alpha is 1, the operation of multiplying a value by alpha may not be performed.

The arithmetic and logic circuit of the main processing circuit may be used to realize a computation of beta*C.

As an alternative example, in a case where beta is 1, the operation of multiplying by beta may not be performed.

The arithmetic and logic circuit of the main processing circuit may be used to realize a step of adding corresponding positions of matrices alpha*op(S)*P and beta*C together.

As an alternative example, in a case where beta is 0, the operation of adding may not be performed.

The present disclosure provides a method of converting the type of data, which includes: using the data type conversion circuit of the main processing circuit to convert the type of data.

In an alternative example, a form of data type conversion includes but is not limited to: converting a floating point number to a fixed point number, converting a fixed point number to a floating point number, and the like.

Figure 1F:
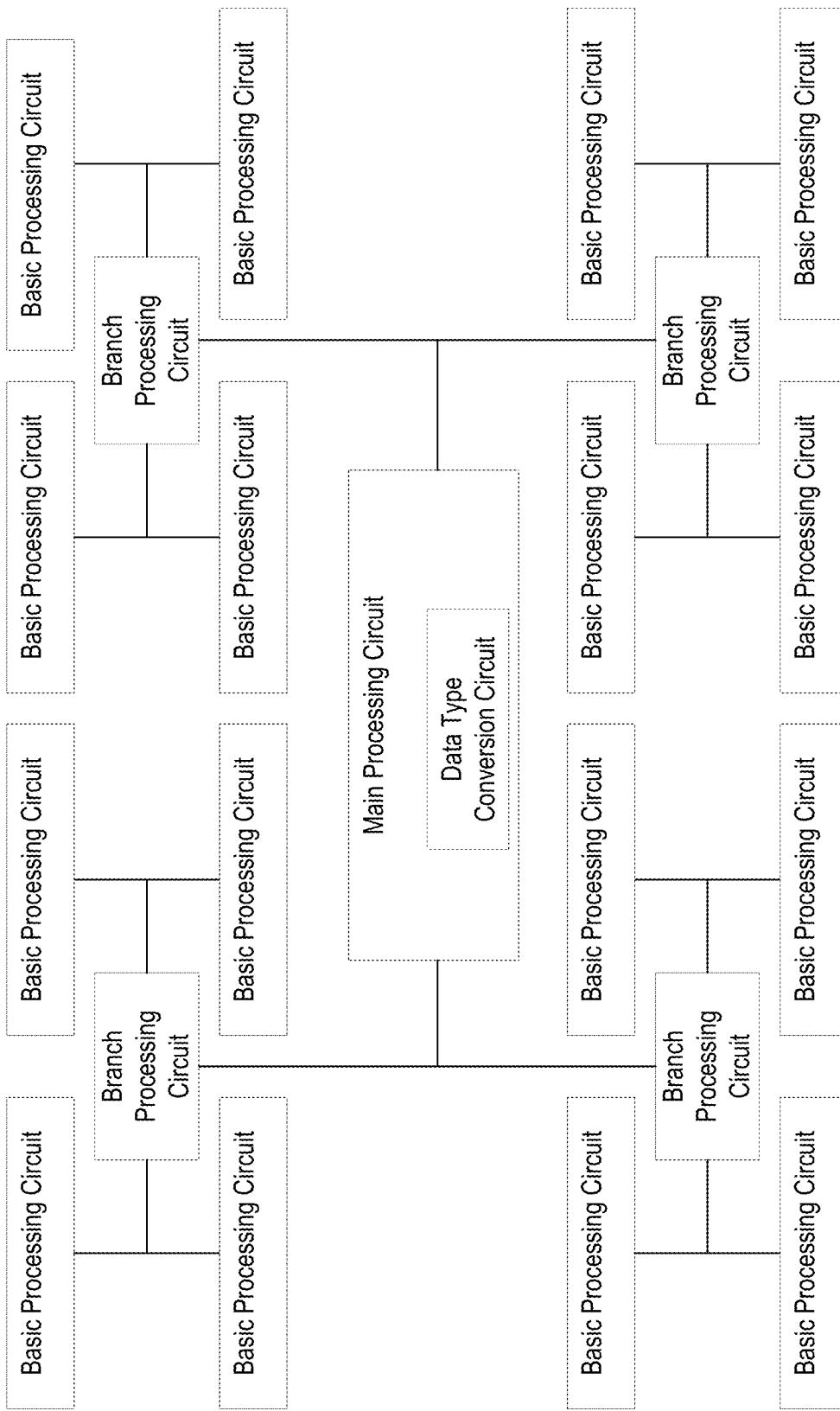
FIG. 1f is a structural diagram of an integrated circuit chip device.

FIG. 1f is a structural diagram of an integrated circuit chip device. The chip device includes a main processing circuit, basic processing circuits, and branch processing circuits (optional).

The main processing circuit may include a register and/or an on-chip caching circuit, and may further include: a control circuit, a vector computing unit circuit, an ALU (Arithmetic and Logic Unit) circuit, an accumulator circuit, a DMA (Direct Memory Access) circuit, and the like. Of course, in a certain application, the main processing circuit may further include a conversion circuit (e.g., a matrix transposition circuit), a data rearrangement circuit, an activation circuit, or the like.

Alternatively or additionally, the main processing circuit may include: a data type conversion circuit configured to convert received or transferred data from floating point data to fixed point data. Of course, in a certain application, the data type conversion circuit may also be configured to convert fixed point data into floating point data. The present disclosure does not restrict a specific form of the data type conversion circuit.

The main processing circuit may also include a data transfer circuit, a data receiving circuit or interface. A data distribution circuit and a data broadcasting circuit may be integrated in the data transfer circuit. In a certain application, the data distribution circuit and the data broadcasting circuit may be set independently or may be integrated together to form a data transceiving circuit. Data for broadcasting refers to data that is to be sent to each basic processing circuit. Data for distribution refers to data that is to be selectively sent to some basic processing circuits. A selection method may be determined by the main processing circuit according to its load and a computation method. A method for broadcasting data refers to transferring data for broadcasting to each basic processing circuit by broadcasting (in a certain application, the data for broadcasting may be transferred to each basic processing circuit by broadcasting for once or a plurality of times, and the times of broadcasting are not restricted in the example of the present disclosure). A method for distributing data refers to selectively transferring data for distribution to some basic processing circuits.

When distributing data, the control circuit of the main processing circuit transfers data to some or all of the basic processing circuits. The data may be identical or different. Specifically, if data is transferred by distributing, data received by each basic processing circuit may be different. There is also a case where some of the basic processing circuits receive the same data.

Specifically, when broadcasting data, the control circuit of the main processing circuit transfers data to some or all of the basic processing circuits. Each basic processing circuit may receive the same data.

Alternatively or additionally, the vector computing unit circuit of the main processing circuit may be configured to perform vector computations which include but are not limited to: addition, subtraction, multiplication, and division between two vectors; addition, subtraction, multiplication, and division between a vector and a constant; or any computation performed on each element in a vector. Neural network computations in series may be addition, subtraction, multiplication, division, activation computation, accumulation computation, and the like, between a vector and a constant.

Each basic processing circuit may include a basic register and/or a basic on-chip caching circuit. Each basic processing circuit may further include one or more of an inner product computing unit circuit, a vector computing unit circuit, an accumulator circuit, and the like. The inner product computing unit circuit, the vector computing unit circuit, and the accumulator circuit may all be integrated circuits, and may also be circuits that are set independently.

Alternatively or additionally, the main processing circuit is configured to obtain an input data block, a weight data block, and a multiplication instruction, convert the input data block and the weight data block to an input data block of the fixed point type and a weight data block of the fixed point type through the data type conversion circuit, classify the input data block of the fixed point type into a distribution data block and the weight data block of the fixed point type into a broadcasting data block according to the multiplication instruction, partition the distribution data block of the fixed point type to obtain a plurality of basic data blocks, distribute the plurality of basic data blocks to at least one basic processing circuit of the plurality of basic processing circuits, and broadcast the broadcasting data block to the plurality of basic processing circuits.

The plurality of basic processing circuits are configured to perform computations on the broadcasting data block and the basic data blocks according to the fixed point data type to obtain computation results, and transfer the computation results to the main processing circuit.

Alternatively or additionally, the main processing circuit is configured to process the computation results to obtain an instruction result of the multiplication instruction.

In an alternative example, the chip device may also include one or more branch processing circuits. If a branch processing circuit is included, the main processing circuit is connected to the branch processing circuit, and the branch processing circuit is connected to the basic processing circuits. The inner product computing unit of the basic processing circuit is configured to perform an inner product computation between data blocks. The control circuit of the main processing circuit controls the data receiving circuit or the data transfer circuit to receive or transfer external data, and control the data transfer circuit to distribute the external data to the branch processing circuit. The branch processing circuit is configured to receive data from and transfer data to the main processing circuit or the basic processing circuit. The structure shown in FIG. 1$f$ is suitable for complex data computations. This is due to the fact that a count of units connected to the main processing circuit is limited, and by adding a branch processing circuit between the main processing circuit and the basic processing circuits, more basic processing circuits can be included in the structure. In this way, the device may be able to perform computations of complex data blocks. A connection structure of the branch processing circuit and the basic processing circuits may be arbitrary and is not restricted to the H-shape structure shown in FIG. 1$f$. Alternatively or additionally, a data transfer manner from the main processing circuit to the basic processing circuits may be broadcasting or distribution, and a data transfer manner from the basic processing circuits to the main processing circuit may be gathering. Broadcasting, distribution, and gathering are explained below. A distribution or broadcasting manner may be adopted when a count of the basic processing circuits is greater than a count of the main processing circuit. In other words, one main processing circuit corresponds to a plurality of basic processing circuits. In this case, data is transferred from the main processing circuit to the plurality of basic processing circuits by broadcasting or distribution, and may be transferred from the plurality of basic processing circuits to the main processing circuit by gathering.

The basic processing circuits are configured to receive data distributed or broadcast by to the main processing circuit, save the data in the on-chip caches of the basic processing circuits, perform computations to obtain results, and send data to the main processing circuit.

Data involved by the basic processing circuit may be data of any data type, data represented by a floating point number of any bit width, or data represented by a fixed point number of any bit width. All computational circuits and storage circuits that are involved may be computational circuits and storage circuits that are capable of processing data of any type, computational circuits and storage circuits for a floating point number of any bit width, or computational circuits and storage circuits for a fixed point number of any bit width.

Alternatively or additionally, each basic processing circuit may include a data type conversion circuit, or some basic processing circuits may include data type conversion circuits. The data type conversion circuit may be configured to convert received or transferred data from floating point data to fixed point data, and may also be configured to convert fixed point data into floating point data. The present disclosure does not restrict a specific form of the data type conversion circuit.

Alternatively or additionally, the vector computing unit circuit of a basic processing circuit may be configured to perform a vector computation on two vectors that have been subject to data type conversion. Of course, in a certain application, the inner product computing unit circuit of the basic processing circuit may also be configured to perform an inner product computation on two vectors that have been subject to data type conversion. The accumulator circuit may also be configured to accumulate results of inner product computations.

In an alternative example, two vectors may be stored in the on-chip cache and/or the register. The basic processing circuit may fetch the two vectors to perform a computation according to computational demands. The computation may include but is not limited to: an inner product computation, a multiplication computation, an addition computation, or another computation.

In an alternative example, results of inner product computations may be accumulated in the on-chip cache and/or the register. Technical effects of this alternative example are as follows: data transferred between the basic processing circuits and the main processing circuit may be reduced, the computational efficiency may be improved, and the power consumption of data transfer may be reduced.

In an alternative example, results of inner product computations may be transferred without being accumulated. Technical effects of this alternative example include that the amount of computations in the basic processing circuits may be reduced and the computational efficiency of the basic processing circuits may be improved.

In an alternative example, each basic processing circuit may be configured to perform inner product computations of a plurality of groups of two vectors, and may also be configured to accumulate results of a plurality of groups of inner product computations respectively.

In an alternative example, data of the plurality of groups of two vectors may be stored in the on-chip cache and/or the register.

In an alternative example, the results of a plurality of groups of inner product computations may be accumulated in the on-chip cache and/or the register respectively.

In an alternative example, results of a plurality of groups of inner product computations may be transferred without being accumulated.

In an alternative example, each basic processing circuit may be configured to perform inner product computations between a same vector and a plurality of vectors respectively (one-to-many inner product, which refers to that for a plurality of groups of vectors, one vector of the two vectors of each group is shared), and accumulate inner products corresponding to each of the vectors respectively. By using the technical solution above, the same set of weights can be used for performing a plurality of computations on different input data, which may increase data reusing, reduce internal data transfer of the basic processing circuits, improve computational efficiency, and reduce power consumption.

Specifically, regarding data used for computing inner products, a data source of a shared vector and a data source of the other vector (the different vector in each group) of each group may be different.

In an alternative example, when computing inner products, the shared vector of each group may be broadcast or distributed from the main processing circuit or the branch processing circuit.

In an alternative example, when computing inner products, the shared vector of each group may be from the on-chip cache.

In an alternative example, when computing inner products, the shared vector of each group may be from the register.

In an alternative example, when computing inner products, the non-shared vector of each group may be broadcast or distributed from the main processing circuit or the branch processing circuit.

In an alternative example, when computing inner products, the non-shared vector of each group may be from the on-chip cache.

In an alternative example, when computing inner products, the non-shared vector of each group may be from the register.

In an alternative example, when computing a plurality of groups of inner products, the shared vector of each group may be saved in any count of copies in the on-chip cache and/or the register of the basic processing circuit.

In an alternative example, for each groups of inner products, one copy of the shared vector may be saved correspondingly.

In an alternative example, the shared vector may be saved as one copy only.

Specifically, results of a plurality of groups of inner product computations may be accumulated in the on-chip cache and/or the register respectively.

Specifically, results of the plurality of groups of inner product computations may be transferred without being accumulated.

Referring to the structure shown in FIG. 1f, the structure includes a main processing circuit (which is capable of performing vector operation) and a plurality of basic processing circuits (which are capable of performing inner product operation). Technical effects of the combination are as follows: the device can not only use the basic processing circuits to perform matrix and vector multiplication, but can also use the main processing circuit to perform any other vector computations, so that the device can complete more computations faster with a limited count of hardware circuits. The combination may reduce a count of times that data is transferred between the external of the device, improve computational efficiency, and reduce power consumption. Besides, in the chip, a data type conversion circuit may be arranged in the basic processing circuits and/or the main processing circuit, so that when a neural network computation is being performed, floating point data can be converted into fixed point data while fixed point data can also be converted into floating point data. In addition, the chip may also dynamically allocate a circuit to perform data type conversion according to the amount of computation (loads) of each circuit (mainly the main processing circuit and the basic processing circuits), which may simplify the complex procedures of data computation as well as reduce power consumption. By dynamically allocating a circuit to convert data type, the computational efficiency of the chip may not be affected. An allocation method may include but is not limited to: load balancing, load minimum allocation, and the like.

FIG. 1e is a structural diagram of the fixed point data, which shows a method of representing fixed point data. For a computing system, the storage bit of one set of floating point data is 32 bits. For fixed point data, particularly a data representation using the floating point data shown in FIG. 1e, the storage bit of one set of fixed point data can be reduced to below 16 bits, which may greatly reduce transferring overhead between computing units during conversion. In addition, for a computing unit, the storage space of data having fewer bits may be smaller, which in other words, means that the storage overhead may be less, computations may also be reduced, and the computational overhead may be reduced. In this case, the fixed point data shown in FIG. 1e may reduce the computational overhead and storage overhead. However, data type conversion requires some computational overhead, which will be referred to as conversion overhead below. For data that requires a large amount of computations and storage, the conversion overhead is almost negligible compared with subsequent computational overhead, storage overhead, and transferring overhead. In this case, the present disclosure adopts a technical solution of converting data into fixed point data for data that require a large amount of computations and a large amount of storage. On the contrary, for data that requires a small amount of computations and storage, the data require less computational overhead, storage overhead, and transferring overhead. Since the precision of fixed point data is lower than the precision of floating point data, if fixed point data is used, under the premise that the amount of computations is relatively small, the fixed point data may be converted to floating point data so that the precision of computations can be guaranteed. In other words, the precision of computations may be improved by increasing a small amount of overhead.

Figure 1G:
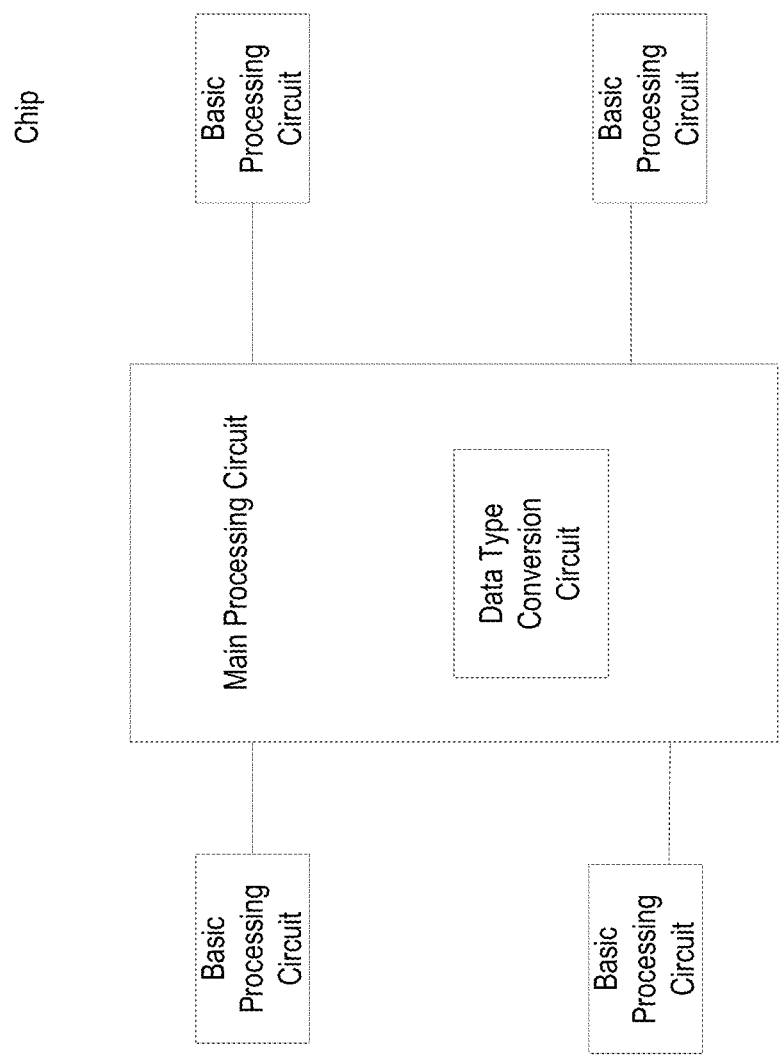
FIG. 1g is a structural diagram of another integrated circuit chip device.

Referring to the device shown in FIG. 1g, the device does not include any branch processing circuit. The device in FIG. 1g may include a main processing circuit and N basic processing circuits, where the main processing circuit (whose specific structure is shown in FIG. 1e) may be connected to the N basic processing circuits directly or indirectly. If the main processing circuit is connected to the N basic processing circuits indirectly, an alternative connection scheme is shown in FIG. 1f, where N/4 branch processing circuits may be included, and each branch processing circuit may be connected to four basic processing circuits respectively. Regarding circuits that are included in the main processing circuit and the N basic processing circuits, a description of them can be seen in the description of FIG. 1f, which is omitted here. It should be explained that the basic processing circuits may also be arranged inside the branch processing circuits. Besides, a count of basic processing circuits that are connected to each branch processing circuit may not be restricted to 4. Manufacturers can set the count according to actual needs. Each of the main processing circuit and/or the N basic processing circuits may include a data type conversion circuit. Specifically, it may be the main processing circuit that includes a data type conversion circuit, and may also be the N basic processing circuits or some of the basic processing circuits that include data type conversion circuits, and may further be the main processing circuit, and the N basic processing circuits or some of the basic processing circuits that include data type conversion circuits. The main processing circuit may dynamically allocate an entity to perform a step of data type conversion according to a neural network computation instruction. Specifically, the main processing circuit may determine whether to perform the step of data type conversion on received data according to its loads. Specifically, a value of the loads may be set as a plurality of ranges, where each range corresponds to an entity that performs the step of data type conversion. Taking three ranges as an instance, range 1 corresponds to light loads, in this case, the main processing circuit performs the step of data type conversion alone; range 2 corresponds to loads between range 1 and range 3, in this case, the main processing circuit or the N basic processing circuits perform the step of data type conversion together; and range 3 corresponds to heavy loads, in this case, the N basic processing circuits perform the step of data type conversion. Data type conversion may be performed explicitly. For instance, the main processing circuit can configure a special indication or instruction. When the basic processing circuits receive the special indication or instruction, the basic processing circuit determines to perform the step of data type conversion. When the basic processing circuit does not receive the special indication or instruction, the basic processing circuit determines not to perform the step of data type conversion. Data type conversion may also be performed implicitly. For instance, when a basic processing circuit receives floating point data and determines that an inner product computation needs to be performed, the basic processing circuit may convert the data into fixed point data.

A method for realizing computations by using the device shown in FIG. 1f is provided below. The method may be a neural network computation method of a matrix-multiply-matrix computation, a matrix-multiply-vector computation, or a vector-multiply-vector computation. The computations above may all be realized by the device of FIG. 1f.

The data type conversion circuit of the main processing circuit first converts the type of data, then the control circuit transfers the data to the basic processing circuits for computing. For instance, the data type conversion circuit of the main processing circuit converts a floating point number to a fixed point number with less bit width and transfers the fixed point number to the basic processing circuits. Technical effects of this method are as follows: the bit width of data being transferred may be reduced, the total count of bits being transferred may be reduced, and the basic processing circuits may achieve better efficiency with less power consumption when performing bit width fixed point computations.

If data received by the basic processing circuits is floating point data, after receiving the data, the data type conversion circuits first perform data type conversion. Then the basic processing circuits perform computations. For instance, the basic processing circuits receive a floating point number transferred from the main processing circuit, the data type conversion circuit converts the floating point number to a fixed point number, and then the inner product computing unit circuit, the vector computing unit circuit, or the accumulator circuit of the basic processing circuit performs computations. In this way, the computational efficiency may be improved, and the power consumption may be reduced.

After the basic processing circuits obtain results by computing, the results may first be subject to data type conversion and then be transferred to the main processing circuit. For instance, a computation result which is a floating point number that is obtained by a basic processing circuit is first converted into a fixed point number with less bit width. Then the fixed point number is transferred to the main processing circuit. Technical effects of this method include that the bit width during the transferring process may be reduced, and better efficiency with less power consumption may be realized.

The main processing circuit transfers data that is to be computed to all or some of the basic processing circuits. Taking a matrix-multiply-vector computation as an instance, the control circuit of the main processing circuit may partition matrix data, and regard each column as basic data. For instance, an m*n matrix can be partitioned into n vectors with m rows, and the control circuit of the main processing circuit may distribute the n vectors with m rows obtained by partitioning to the plurality of basic processing circuits. For a vector, the control circuit of the main processing circuit may broadcast the whole vector to each of the basic processing circuits. If the value of m is relatively large, the control circuit may first partition an m*n matrix into x*n vectors. Taking x=2 as an instance, the matrix may be partitioned into 2n vectors. Each vector includes m/2 rows. In other words, each vector of n vectors with m rows is partitioned into 2 vectors evenly. Taking a first row as an instance, if a first vector of the n vectors with m rows has 1000 rows, a way to partition the first vector into 2 vectors evenly may be regarding previous 500 rows as a first vector and subsequent 500 rows as a second vector, then the control circuit may broadcast the two vectors for twice to the plurality of basic processing circuits.

A method for the data transfer may be broadcasting or distributing, or any other possible transferring method.

After receiving data, the basic processing circuits perform computations to obtain computation results, and transfer the results to the main processing circuit.

The computation results may be intermediate computation results or final computation results.

The device of FIG. 1f can be used to perform a matrix-multiply-vector computation (a matrix-multiply-vector computation refers to a computation of obtaining a vector by performing inner product computations between each row of a matrix and a vector, then placing the results according to a corresponding order).

Below is a description of performing multiplication of a matrix S with a size of M rows and L columns and a vector P with a length of L. As shown in FIG. 2a (each row of the matrix S is as long as the length of the vector P, and data of them are in one-to-one correspondence according to positions), the neural network computing device has K basic processing circuits.

Figure 2G:
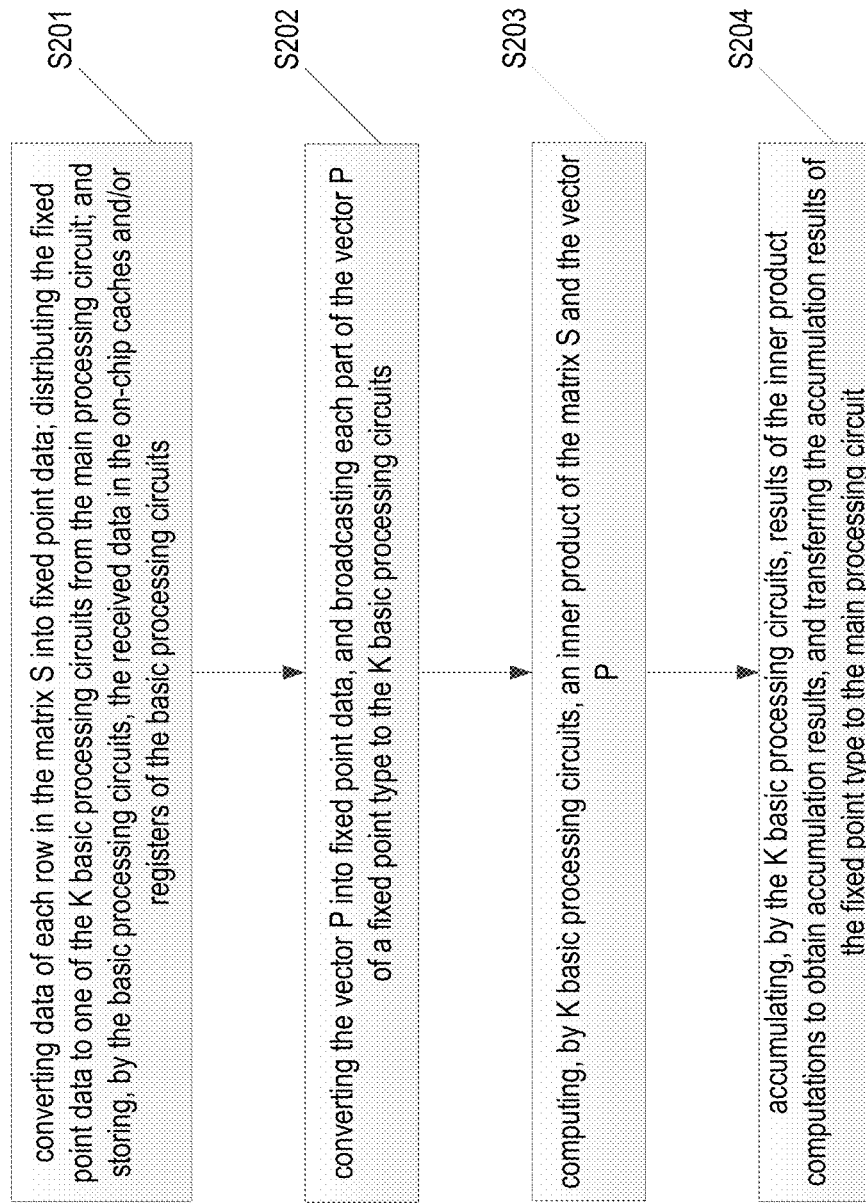
FIG. 2g is a flowchart of a matrix-multiply-vector computation.

Referring to FIG. 2g, an implementation method of a matrix-multiply-vector computation is provided, which includes:

S201, converting, by the data type conversion circuit of the main processing circuit, data of each row in the matrix S into fixed point data; distributing, by the control circuit of the main processing circuit, the fixed point data to one of the K basic processing circuits; and storing, by the basic processing circuits, the received data in the on-chip caches and/or the registers of the basic processing circuits.

In an alternative example, M is the count of rows of the matrix S. If M<=K, the control circuit of the main processing circuit distributes a row of data of the matrix S to the K basic processing circuits respectively.

In an alternative example, M is the count of rows of the matrix S, if M>K, the control circuit of the main processing circuit distributes data of one or a plurality of rows of the matrix S to each basic processing circuit respectively.

A set of rows of the matrix S that are distributed to an $i^{th}$ basic processing circuit is referred to as Ai, which has Mi rows in total. FIG. 2i shows a computation to be performed by the $i^{th}$ basic processing circuit.

As an alternative example, for each basic processing circuit, such as the $i^{th}$ basic processing circuit, the received data such as a matrix Ai transferred by distributing may be stored in the register and/or on-chip cache. Technical effects of the example include that data that is transferred later by means of distributing may be reduced, the computational efficiency may be improved, and the power consumption may be reduced.

The method includes: S202, converting, by the data type conversion circuit of the main processing circuit, the vector P into fixed point data, and broadcasting, by the control circuit of the main processing circuit, each part of the vector P of a fixed point type to the K basic processing circuits.

As an alternative example, the control circuit of the main processing circuit may broadcast each part of the vector P for only once to the register or on-chip cache of each basic processing circuit. The $i^{th}$ basic processing circuit may fully reuse data of the vector P which is obtained at the current time to complete an inner product computation corresponding to each row of the matrix Ai. Technical effects of the example include that the data of the vector P which are repeatedly transferred from the main processing circuit to the basic processing circuits may be reduced, the execution efficiency may be improved, and the power consumption for transfer may be reduced.

As an alternative example, the control circuit of the main processing circuit may sequentially broadcast each part of the vector P to the register or on-chip cache of each basic processing circuit, the $i^{th}$ basic processing circuit may not reuse data of the vector P which is obtained at each time, and may complete an inner product computation corresponding to each row of the matrix Ai at different times. Technical effects of the example include that the data of the vector P which is transferred at a single time in the basic processing circuits may be reduced, the capacity of the cache and/or the register of the basic processing circuits may be reduced, the execution efficiency may be improved, the power consumption of transferring may be reduced, and the costs may be reduced.

As an alternative example, the control circuit of the main processing circuit may sequentially broadcast each part of the vector P to the register or on-chip cache of each basic processing circuit, the $i^{th}$ basic processing circuit may partly reuse data of the vector P which is obtained at each time to complete an inner product computation corresponding to each row of the matrix Ai. Technical effects of the example include that the data transferred from the main processing circuit to the basic processing circuits may be reduced, the data that is transferred within the basic processing circuits may be reduced, the execution efficiency may be improved, and the power consumption of transferring may be reduced.

The method includes: S203, computing, by the inner product computing unit circuits of the K basic processing circuits, an inner product of the matrix S and the vector P, for instance, computing, by the $i^{th}$ basic processing circuit, an inner product of the data of matrix Ai and the data of the vector P; and S204, accumulating, by the accumulator circuits of the K basic processing circuits, results of the inner product computation to obtain accumulation results, and transferring the accumulation results of the fixed point type to the main processing circuit.

As an alternative example, a partial sum obtained from the inner product computation performed each time by a basic processing circuit may be transferred to the main processing circuit for accumulating (the partial sum refers to part of the accumulation result, for instance, if the accumulation result is F1*G1+F2*G2+F3*G3+F4*G4+F5*G5, the partial sum may be the value of F1*G1+F2*G2+F3*G3). Technical effects of the example include that computations performed in the basic processing circuit may be reduced, and the computational efficiency of the basic processing circuits may be improved.

In an alternative example, a partial sum obtained from the inner product computation performed each time by a basic processing circuits may be stored in the on-chip caching circuit and/or the register of the basic processing circuit, and transferred to the main processing circuit after the accumulation finishes. Technical effects of the example include that data which are transferred between the basic processing circuits and the main processing circuit may be reduced, the computational efficiency may be improved, and the power consumption of data transfer may be reduced.

As an alternative example, a partial sum obtained from the inner product computation performed each time by a basic processing circuits may also, in some cases, be stored in the on-chip caching circuit and/or the register of the basic processing circuit for accumulating, and in some cases, be transferred to the main processing circuit for accumulating, then be transferred to the main processing circuit after the accumulation finishes. Technical effects of the example include that data transferred between the basic processing circuits and the main processing circuits may be reduced, the computational efficiency may be improved, the power consumption of data transfer may be reduced, computations performed in the basic processing circuits may be reduced, and the computational efficiency of the basic processing circuits may be improved.

Figure 2H:
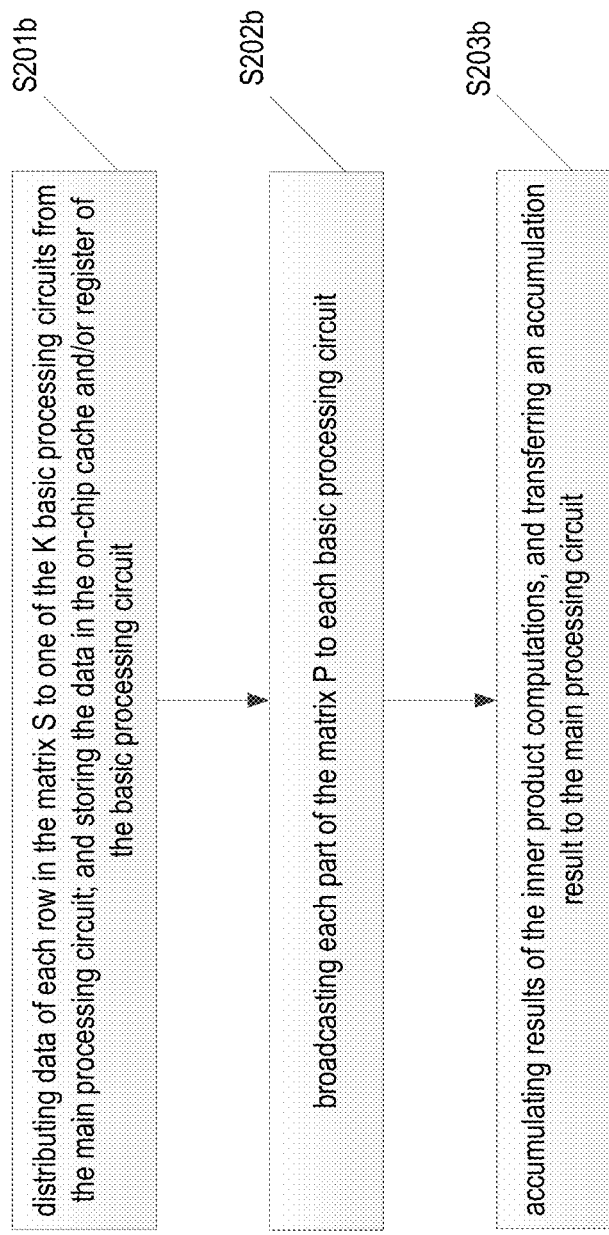
FIG. 2h is a flowchart of a matrix-multiply-matrix computation.
Figure 2I:
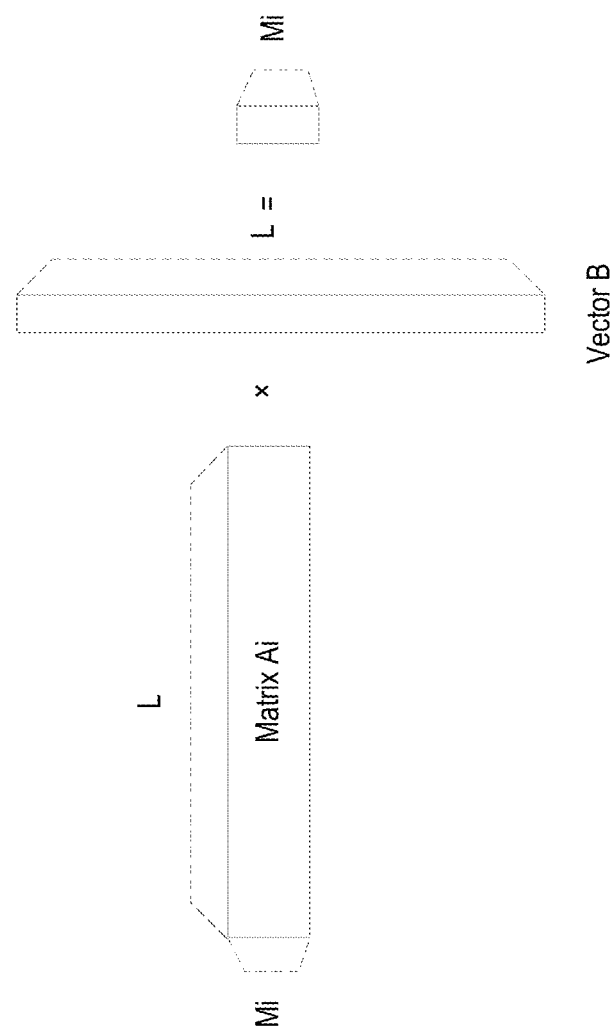
FIG. 2i is a schematic diagram showing a matrix Ai being multiplied by a vector B.

FIG. 2h is a flowchart of using the device of FIG. 1f to perform a matrix-multiply-matrix computation.

Below is a description of performing multiplication of a matrix S with a size of M rows and L columns and a matrix P with a size of L rows and N columns (each row of the matrix S is as long as each column of the matrix P, which is as shown in FIG. 2d), and the neural network computing device has K basic processing circuits.

The method includes: S201b, distributing, by the control circuit of the main processing circuit, data of each row in the matrix S to one of the K basic processing circuits; and storing, by the basic processing circuit, the received data in the on-chip cache and/or the register.

In an alternative example, M is the count of rows of the matrix S. If M<=K, the control circuit of the main processing circuit distributes a row of data of the matrix S to the K basic processing circuits respectively.

As an alternative example, M is the count of rows of the matrix S. If M>K, the control circuit of the main processing circuit may distribute data of one or a plurality of rows of the matrix S to each basic processing circuit.

In a case where Mi rows of the matrix S are distributed to an $i^{th}$ basic processing circuit, a set of the Mi rows is be referred to as Ai. FIG. 2e shows a computation to be performed by the $i^{th}$ basic processing circuit.

As an alternative example, in each of the basic processing circuits, for instance, in the $i^{th}$ basic processing circuit:

the matrix Ai distributed by the main processing circuit may be received and stored in the register and/or on-chip cache of the $i^{th}$ basic processing circuit. Technical effects of the example include that data that is transferred later may be reduced, the computational efficiency may be improved, and the power consumption may be reduced.

The method includes: S202b, broadcasting, by the control circuit of the main processing circuit, each part of the matrix P to each basic processing circuit.

As an alternative example, each part of the matrix P may be broadcast for only once to the register or on-chip cache of each basic processing circuit. The $i^{th}$ basic processing circuit may fully reuse data of the matrix P which is obtained at this time to complete an inner product computation corresponding to each row of the matrix Ai. The "reusing" mentioned in the example may be "repeatedly using data by the basic processing circuits during computation". For instance, reusing data of the matrix P may be using the data of the matrix P for a plurality of times.

As an alternative example, the control circuit of the main processing circuit may sequentially broadcast each part of the matrix P to the register or on-chip cache of each basic processing circuit. The $i^{th}$ basic processing circuit may not reuse the data of the matrix P which is obtained at each time, and may complete an inner product computation corresponding to each row of the matrix Ai at different times.

As an alternative example, the control circuit of the main processing circuit may sequentially broadcast each part of the matrix P to the register or on-chip cache of each basic processing circuit. The $i^{th}$ basic processing circuit may partially reuse the data of the matrix P which is obtained at each time to complete an inner product computation corresponding to each row of the matrix Ai.

In an alternative example, each of the basic processing circuits, for instance, the $i^{th}$ basic processing circuit, may compute to obtain an inner product of the data of the matrix Ai and the matrix P.

The method may include S203b, accumulating, by the accumulator circuit of each of the basic processing circuits, results of the inner product computations, and transferring an accumulation result to the main processing circuit.

As an alternative example, the basic processing circuits may transfer partial sums obtained from inner product computations to the main processing circuit for accumulating.

In an alternative example, partial sums obtained from the inner product computations performed by the basic processing circuits may be stored in the on-chip caching circuits and/or the registers of the basic processing circuits, then be transferred to the main processing circuit after accumulation finishes.

As an alternative example, partial sums obtained from the inner product computations performed by the basic processing circuits may also, in some cases, be stored in the on-chip caching circuits and/or the registers of the basic processing circuits for accumulating, and in some cases, be transferred to the main processing circuit for accumulating, then be transferred to the main processing circuit after accumulation finishes.

The present disclosure provides a method of using the device of FIG. 1f to realize BLAS (Basic Linear Algebra Subprograms) function.

A GEMM computation refers to a computation of matrix-matrix multiplication in a BLAS library. A common representation of the computation is C=alpha*op(S)*op(P)+beta*C, where S and P denote two input matrices, C denotes an output matrix, alpha and beta denote scalars, op denotes an operation performed on the matrix S or P. In addition, other supporting integers may be used as parameters to explain the width and height of the matrices S and P.

A step of using the device of FIG. 1f to realize the GEMM computation includes:

converting, by the data type conversion circuit of the main processing circuit, the data type of the matrix S and the matrix P; and performing, by the conversion circuit of the main processing circuit, corresponding op operation on the matrix S and the matrix P respectively.

As an alternative example, op may be a matrix transposition operation. The matrix transposition circuit of the main processing circuit may be used to realize the matrix transposition operation.

In an alternative example, after the OP operation of the matrix S and the matrix P is performed, the data type conversion circuit of the main processing circuit may perform data type conversion operation. In other words, the data type conversion circuit converts the data types of op(S) and op(P) from floating point data into fixed point data, then performs a matrix multiplication computation as shown in FIG. 2h.

In an alternative example, op of a matrix may be null, which means the op operation may not be performed.

The device of FIG. 1f and the matrix-multiply-matrix computation method of FIG. 2h can be used to perform a matrix multiplication computation between op(S) and op(P).

The arithmetic and logic unit of the main processing circuit may be used to perform an operation of multiplying each value in a result of op(S)*op(P) by alpha.

As an alternative example, in a case where alpha is 1, the operation of multiplying a value by alpha may not be performed.

The arithmetic and logic unit of the main processing circuit may be used to realize a computation of beta*C.

As an alternative example, in a case where beta is 1, the operation of multiplying by beta may not be performed.

The vector computing unit circuit of the main processing circuit may be used to realize a step of adding corresponding positions of matrices alpha*op(S)*op(P) and beta*C to obtain a result of the GEMM computation.

As an alternative example, in a case where beta is 0, the operation of adding may not be performed.

A GEMV computation refers to a computation of matrix-vector multiplication in a BLAS library. A common representation of the computation is C=alpha*op(S)*P+beta*C. S is an input matrix, P denotes an input vector, C denotes an output vector, alpha and beta denote scalars, and op denotes an operation performed on the matrix S.

A step of using the device of FIG. 1f to realize the GEMV computation is:

converting, by the data type conversion circuit of the main processing circuit, the data type of the input matrix S and the input matrix P; and performing, by the conversion circuit of the main processing circuit, a corresponding op operation on the matrix S.

As an alternative example, op may be a matrix transposition operation. The conversion circuit of the main processing circuit may be used to realize the matrix transposition operation.

In an alternative example, op of a matrix may be null, which means the op operation may not be performed.

The device of FIG. 1f and the matrix-multiply-vector computation method of FIG. 2a may be used to perform a matrix-vector multiplication computation between the matrix op(S) and the vector P.

The arithmetic and logic unit of the main processing circuit may be used to perform an operation of multiplying each value in a result of op(S)*P by alpha.

As an alternative example, in a case where alpha is 1, the operation of multiplying a value by alpha may not be performed.

The arithmetic and logic unit of the main processing circuit may be used to realize a computation of beta*C.

As an alternative example, in a case where beta is 1, the operation of multiplying by beta may not be performed.

The vector computing unit circuit of the main processing circuit may be used to realize a step of adding corresponding positions of matrices alpha*op(S)*P and beta*C to obtain a result of GEMV.

As an alternative example, in a case where beta is 0, the operation of adding may not be performed.

A method of using the device in FIG. 1f to realize an activation function is as follows:

inputting a vector by using the activation circuit of the main processing circuit, and obtaining an activation vector of the vector by computing.

In an alternative example, the activation circuit of the main processing circuit performs a computation to obtain a numerical value for each value of an input vector according to an activation function (input of the activation function is a numerical value, and output is also a numerical value), and outputs the numerical value to a corresponding position of an output vector.

In an alternative example, the activation function may be: y=max(m, x), where x denotes an input numerical value, y denotes an output numerical value, and m denotes a constant.

In an alternative example, the activation function may be: y=tan h(x), where x denotes an input numerical value, and y denotes an output numerical value.

In an alternative example, the activation function may be: y=sigmoid(x), where x denotes an input numerical value, y denotes an output numerical value.

In an alternative example, the activation function may be a piecewise linear function.

In an alternative example, the activation function may be a function of randomly inputting a number and outputting a number.

In an alternative example, a source of the input vector may include but is not limited to:

an external data source of the device.

In an alternative example, the input data may come from a computation result of a matrix-multiply-vector computation performed by the device.

In an alternative example, the input data may come from a computation result of a matrix-multiply-matrix computation performed by the device.

The main processing circuit of the device computes to obtain a result.

In an alternative example, the input data may come from a computation result obtained after the main processing circuit of the device is biased.

It should be explained that the activation operation may be realized by the arithmetic and logic unit and the accumulator circuit of the main processing circuit, and may also be realized by adding an activation circuit separately to the main processing circuit.

The device FIG. 1f can be used to realize a computation of giving a bias.

The vector computing unit circuit of the main processing circuit may be used to realize a function of adding two vectors together or adding two matrices together.

The vector computing unit circuit of the main processing circuit may also be used to realize a function of adding a vector to each row of a matrix, or to each column of a matrix.

In an alternative example, the matrix may be from a result of a matrix-multiply-matrix computation performed by the device.

In an alternative example, the matrix may be from a result of a matrix-multiply-vector computation performed by the device.

In an alternative example, the matrix may be from data received from the external by the main processing circuit of the device.

In an alternative example, the vector may be from data received from the external by the main processing circuit of the device.

Data sources of the matrix and/or the vector may include but is not limited to the above-mentioned data sources.

The device of FIG. 1f may be used to realize data type conversion.

The data type conversion circuit of the main processing circuit may be used to convert the type of data.

In an alternative example, the data type conversion circuit of the main processing circuit may be used to convert the type of a group of data.

In an alternative example, a form of data type conversion includes but is not limited to: converting a floating point number to a fixed point number, converting a fixed point number to a floating point number, and the like.

The present disclosure further provides a chip which includes a computing device. The computing device includes:

a main processing circuit. Data involved by the main processing circuit may be data of any data type. In an alternative example, it may be data represented by a floating point number of any bit width, or data represented by a fixed point number of any bit width. All computational circuits and storage circuits that are involved may be computational circuits and storage circuits that are capable of processing data of any type. In an alternative example, they may be computational circuits and storage circuits for a floating point number of any bit width, or computational circuits and storage circuits for a fixed point number of any bit width.

In an alternative example, the main processing circuit includes a data type conversion circuit.

In an alternative example, the main processing circuit includes a vector computing unit configured to perform data type conversion.

Specifically, the main processing circuit includes a data input interface for receiving input data.

In an alternative example, a source of data may be: the external of the neural network computational circuit device, or some or all of basic processing circuits of the neural network computational circuit device.

In an alternative example, the device may include a plurality of data input interfaces, which may include a data output interface for outputting data.

In an alternative example, the output data may be transferred to: the external of the neural network computational circuit device, or some or all of the basic processing circuits of the neural network computational circuit device.

In an alternative example, the device may include a plurality of data output interfaces.

In an alternative example, the main processing circuit may include an on-chip cache and/or a register.

In an alternative example, the main processing circuit may include a computing unit configured to perform data computations.

In an alternative example, the main processing circuit may include an arithmetic computing unit.

In an alternative example, the main processing circuit may include a vector computing unit configured to perform computations on a group of data simultaneously. Specifically, the arithmetic computation and/or vector computation may be computations of any type which may include but are not limited to: addition, subtraction, multiplication, and division between two numbers; addition, subtraction, multiplication, and division between a number and a constant; exponential computations, power computations, logarithm computations, and various nonlinear computations performed on a number; comparison computations and logical computations performed on two numbers; and the like. The arithmetic computation and/or vector computation may further be: addition, subtraction, multiplication, and division between two vectors; addition, subtraction, multiplication, and division between each element in a vector and a constant; exponential computations, power computations, logarithm computations, and various nonlinear computations performed on each element in a vector; comparison computations and logical computations performed on every two corresponding elements in a vector, and the like.

In an alternative example, the main processing circuit may include a data rearrangement unit configured to transfer data to the basic processing circuits by following a certain order, or rearrange data in situ by following a certain order.

In an alternative example, the order for data arrangement may include: changing the order of dimensions of a multi-dimensional data block. The order for data arrangement may further include: partitioning a data block and sending the partitioned data block to different basic processing circuits.

The computing device may further include a plurality of basic processing circuits. Each basic processing circuit may be configured to obtain an inner product of two vectors by computing. A method of computing may be: receiving, by a basic processing circuit, two groups of numbers, multiplying elements in the two groups of numbers correspondingly, and accumulating the results of multiplication, and outputting the result of the inner product. The result may be output according to the position of the basic processing circuit, may be transferred to another basic processing circuit, and may also be transferred directly to the main processing circuit.

Data involved by the basic processing circuits may be data of any data type. In an alternative example, it may be data represented by a floating point number of any bit width, or data represented by a fixed point number of any bit width. All computational circuits and storage circuits that are involved may be computational circuits and storage circuits that are capable of processing data of any type. In an alternative example, they may be computational circuits and storage circuits for a floating point number of any bit width, or computational circuits and storage circuits for a fixed point number of any bit width.

In an alternative example, the basic processing circuits may include data type conversion circuits.

In an alternative example, the basic processing circuits may include vector computing units configured to perform data type conversion.

Specifically, the basic processing circuits may include storage units composed of on-chip caches and/or registers and may include one or more data input interfaces for receiving data.

In an alternative example, a basic processing circuit may include two data input interfaces, and can obtain one or a plurality of data from the two data input interfaces respectively at each time.

In an alternative example, a basic processing circuit may receive input data from the data input interfaces, and store the input data in the register and/or on-chip cache.

A source of data received by the data input interfaces may be: other basic processing circuits and/or the main processing circuit.

The neural network computational circuit device includes a main processing circuit.

The neural network computational circuit device includes other basic processing circuits (the neural network computational circuit device includes a plurality of basic processing circuits).

Specifically, the neural network computational circuit device includes one or a plurality of data output interfaces for transferring output data.

In an alternative example, the neural network computational circuit device may transfer one or a plurality of data via the data output interface.

Specifically, data transferred via the data output interface may be one or more of: data received from the data input interface, data stored in the on-chip cache and/or the register, a computation result of the multiplier, a computation result of the accumulator, or a computation result of the inner product computing unit.

In an alternative example, the neural network computational circuit device includes three data output interfaces. Two of the three data output interfaces correspond to two data input interfaces. Each layer receives data from a previous layer via the data input interface. A third data output interface is configured to output computation results.

Specifically, regarding where the data is transferred, the above-mentioned data sources and where the data is transferred together determine connections of the basic processing circuits in the device.

The neural network computational circuit device includes a main processing circuit.

The neural network computational circuit device includes other basic processing circuits. The neural network computational circuit device includes a plurality of basic processing circuits.

Specifically, the neural network computational circuit device includes an arithmetic computational circuit which may be one or more of: one or a plurality of multiplier circuits, one or a plurality of accumulator circuits, and one or a plurality of circuits configured to perform inner product computations of two groups of numbers.

In an alternative example, the device may be configured to perform multiplication of two numbers. Results of multiplication may be stored in the on-chip cache and/or the register, and may also be accumulated in the register and/or the on-chip cache.

In an alternative example, the device may be configured to perform inner product computations of two groups of data. Result of the computations may be stored in the on-chip cache and/or the register, and may also be accumulated in the register and/or the on-chip cache.

In an alternative example, the device may be configured to accumulate data. The data may also be accumulated in the register and/or the on-chip cache.

Specifically, data accumulated in the accumulator circuit may be one or more of: data received from the data input interface, data stored in the on-chip cache and/or the register, a computation result of multiplier, a computation result of accumulator, or a computation result of inner product computing unit.

It should be explained that the "data input interface" and "data output interface" used in the description of the basic processing circuits refer to a data input interface and a data output interface of each basic processing circuit, rather than a data input interface and a data output interface of the whole device.

FIG. 1a shows an integrated circuit chip device provided by the present disclosure. The integrated circuit chip device includes: a main processing circuit and a plurality of basic processing circuits. The plurality of basic processing circuits are arranged in a form of array (an m*n array), where m and n are integers greater than or equal to 1, and at least one of m and n is greater than or equal to 2. For the plurality of basic processing circuits that are arranged in the form of an m*n array, each basic processing circuit is connected to an adjacent basic processing circuit, and the main processing circuit is connected to k basic processing circuits of the plurality of basic processing circuits. The k basic processing circuits may be: n basic processing circuits in a first row, n basic processing circuits in an $m^{th}$ row, and m basic processing circuits in a first column. In the integrated circuit chip device shown in FIG. 1a, the main processing circuit and/or the plurality of basic processing circuits may include a data type conversion circuit. Specifically, some basic processing circuits of the plurality of basic processing circuits may include data type conversion circuits. For instance, in an alternative example, k basic processing circuits may include data type conversion circuits. In this way, n basic processing circuits may convert the data type of data of m basic processing circuits of a current column. This configuration may improve computational efficiency and reduce power consumption. This is because that the n basic processing circuits in the first row are the first to receive data sent from the main processing circuit, and by converting the received data into fixed point data, subsequent computations performed by basic processing circuits and data transferred by the basic processing circuits during the subsequent computations may be reduced. Similarly, setting data type conversion circuits in the m basic processing circuits of the first column may also have technical effects of fewer computations and less power consumption. In addition, according to the above-mentioned structure, the main processing circuit may use a dynamic data transfer strategy. For instance, the main processing circuit may broadcast data for broadcasting to the m basic processing circuits of the first column, and distribute data for distribution to the n basic processing circuits of the first row. Technical effects of the example include that by transferring different data to the basic processing circuits via different data input ports, the basic processing circuit may know the type of data merely according to a receiving port of the data without the need of distinguishing the type of the received data.

The main processing circuit is configured to perform respective neural network computations in series, and transfer data to the basic processing circuits that are connected to the main processing circuit. The neural network computations in series may include but are not limited to: accumulation computations, ALU computations, activation computations, and the like.

The plurality of basic processing circuits are configured to perform computations in the neural network in parallel according to data being transferred, and transfer computation results to the main processing circuit through the basic processing circuits that are connected to the main processing circuit. The computations in the neural network that are performed in parallel may include but are not limited to: inner product computations, matrix or vector multiplication computations, and the like.

The main processing circuit may include: a data transfer circuit, a data receiving circuit or interface. A data distribution circuit and a data broadcasting circuit may be integrated in the data transfer circuit. In a certain application, the data distribution circuit and the data broadcasting circuit may be set independently. Data for broadcasting refers to the data that needs to be sent to each basic processing circuit. Data for distribution refers to data that needs to be sent to some basic processing circuit selectively. Specifically, taking a convolution computation as an instance, since convolution input data of the convolution computation needs to be sent to all basic processing circuits, the convolution input data is data for broadcasting, and since a convolution kernel needs to be sent to some basic processing circuit selectively, the convolution kernel is data for distribution. A method for selecting a basic processing circuit to distribute data may be determined by the main processing circuit according to the loads and other allocation methods. A method for broadcasting data refers to transferring data for broadcasting to each basic processing circuit by broadcasting (in a certain application, the data for broadcasting may be transferred to each basic processing circuit by broadcasting for once or a plurality of times, and the times of broadcasting are not restricted in the example of the present disclosure). A method for distributing data refers to selectively transferring data for distribution to some basic processing circuits.

The main processing circuit (as shown in FIG. 1d) may include a register and/or an on-chip caching circuit, and may further include: a control circuit, a vector computing unit circuit, an ALU (Arithmetic and Logic Unit) circuit, an accumulator circuit, a DMA (Direct Memory Access) circuit, and the like. In a certain application, the main processing circuit may further include a conversion circuit (e.g., a matrix transposition circuit), a data rearrangement circuit, an activation circuit, or the like.

Each basic processing circuit may include a basic register and/or a basic on-chip caching circuit. Each basic processing circuit may further include one or more of an inner product computing unit circuit, a vector computing unit circuit, an accumulator circuit, and the like. The inner product computing unit circuit, the vector computing unit circuit, and the accumulator circuit may all be integrated circuits, or may also be circuits that are set independently.

Alternatively or additionally, the accumulator circuits of the n basic processing circuits of the $m^{th}$ row may perform accumulation computations of inner product computations. This is because that the basic processing circuits of the $m^{th}$ row can receive multiplication results of all basic processing circuits of a current column, and the n basic processing circuits of the $m^{th}$ row can perform accumulation computations of inner product computations. In this way, computing resources may be effectively allocated, and the power consumption may be reduced. This technical scheme is particularly suitable for a case where m is relatively large.

The main processing circuit may configure a circuit to perform data type conversion. Specifically, a circuit may be configured in an explicit manner or an implicit manner. For the explicit manner, the main processing circuit can configure a special indication or instruction. When a basic processing circuit receives the special indication or instruction, it determines to perform data type conversion. If a basic processing circuit does not receive the special indication or instruction, it determines not to perform data type conversion. Data type conversion may also be performed implicitly. For instance, when the basic processing circuits receive floating point data and determine that an inner product computation needs to be performed, the basic processing circuits may convert the data into fixed point data. When a circuit is configured in an explicit manner, the special indication or instruction may configure a descending sequence. Every time after passing a basic processing circuit, the value of the descending sequence reduces by 1. The basic processing circuit reads the value of the descending sequence. If the value is greater than zero, the basic processing circuit performs data type conversion. If the value is equal to or less than zero, the basic processing circuit does not perform data type conversion. This configuration is set according to the basic processing circuits arranged in the form of the array. For instance, for the m basic processing circuits of the $i^{th}$ column, the main processing circuit requires the 5 basic processing circuits at the front to perform data type conversion. In this case, the main processing circuit sends a special instruction that includes a descending sequence, where an initial value of the descending sequence may be 5. Every time after passing a basic processing circuit, the value of the descending sequence reduces by 1. At a fifth basic processing circuit, the value of the descending sequence is 1, and at a sixth basic processing circuit, the value of the descending sequence is 0. At this point, the sixth basic processing circuit may not perform data type conversion. By using this method, the main processing circuit may dynamically configure an execution subject and a count of execution times of data type conversion.

An example of the present disclosure provides an integrated circuit chip device. The integrated circuit chip device includes a main processing circuit (may also be referred to as a main unit) and a plurality of basic processing circuits (may also be referred to as basic units). A structure of the example is shown in FIG. 1b. What is inside a dashed box is an internal structure of the neural network computing device. Gray arrows indicate data transfer paths between the main processing circuit and a basic processing circuit array. Outlined arrows indicate data transfer paths between the respective basic processing circuits (adjacent basic processing circuits) in the basic processing circuit array. The length and width of the basic processing circuit array may be different. In other words, the values of m and n may be different or the same. The present disclosure does not restrict the specific values.

FIG. 1c shows a circuit structure of a basic processing circuit. A dashed box in the figure indicates the border of the basic processing circuit. A thick arrow that intersects the dashed box indicates a data input pathway and a data output pathway (the arrow pointing to the internal of the dashed box is the input pathway, and the arrow pointing to the external of the dashed box is the output pathway). A rectangular box inside the dashed box indicates a storage unit circuit (a register and/or an on-chip cache) including input data 1, input data 2, a result of multiplication or inner product, and accumulation data. A diamond-shaped box indicates a computing unit circuit including a multiplier or inner product computing unit, and an adder.

In the present disclosure, the neural network computing device includes a main processing circuit and 16 basic processing circuits (the 16 basic processing circuit are given by way of illustration, other number may be used in a certain application).

In the present example, a basic processing circuit may have two data input interfaces and two data output interfaces. In the following description of the present example, a horizontal input interface (a horizontal arrow pointing to a present unit as shown in FIG. 1b) is referred to as an input 0, a vertical input interface (a vertical arrow pointing to a present unit as shown in FIG. 1b) is referred to as an input 1; a horizontal data output interface (a horizontal arrow pointing away from a present unit as shown in FIG. 1b) is referred to as an output 0, a vertical data output interface (a vertical arrow pointing away from a present unit as shown in FIG. 1b) is referred to as an output 1.

The data input interface and the data output interface of each basic processing circuit may be connected to different units respectively which includes the main processing circuit and other basic processing circuits.

In the present example, inputs 0 of the four basic processing circuits 0, 4, 8, 12 (see FIG. 1b for the serial numbers) are connected to the data output interfaces of the main processing circuit.

In the present example, inputs 1 of the four basic processing circuits 0, 1, 2, 3 are connected to the data output interfaces of the main processing circuit.

In the present example, outputs 1 of basic processing circuits 12,13,14,15 are connected to the data input interfaces of the main processing circuit.

Connections of the output interfaces of the basic processing circuits and the input interfaces of other basic processing circuits of the present example can be seen in FIG. 1b, and thus are not explained in detail here.

Specifically, an output interface S1 of an S unit is connected to an input interface P1 of a P unit, which indicates that the P unit can receive data that the S unit sends to the S1 interface via the P1 interface.

The present example includes a main processing circuit. The main processing circuit is connected to an external device (in other words, the main processing circuit has both input interfaces and output interfaces). Some data output interfaces of the main processing circuit are connected to the data input interfaces of some basic processing circuits. Some data input interfaces of the main processing circuit are connected to the data output interfaces of some basic processing circuits.

An example of the present disclosure provides a method of using the integrated circuit chip device.

Data involved in the method provided by the present disclosure may be data of any data type. For instance, the data may be data represented by a floating point number of any bit width, or data represented by a fixed point number of any bit width.

FIG. 1e is a structural diagram of the fixed point data, which shows a method of representing fixed point data. For a computing system, the storage bit of one set of floating point data is 32 bits. For fixed point data, particularly a data representation using the floating point data shown in FIG. 1e, the storage bit of one set of fixed point data can be reduced to below 16 bits, which may greatly reduce transferring overhead between computing units during conversion. In addition, for a computing unit, the storage space of data having fewer bits may be smaller, which in other words, means that the storage overhead may be less, computations may also be reduced, and the computational overhead may be reduced. In this case, the fixed point data shown in FIG. 1e may reduce the computational overhead and storage overhead. However, data type conversion requires some computational overhead, which will be referred to as conversion overhead below. For data that requires a large amount of computations and storage, the conversion overhead is almost negligible compared with subsequent computational overhead, storage overhead, and transferring overhead. In this case, the present disclosure adopts a technical solution of converting data into fixed point data for data that require a large amount of computations and a large amount of storage. On the contrary, for data that requires a small amount of computations and storage, the data require less computational overhead, storage overhead, and transferring overhead. Since the precision of fixed point data is lower than the precision of floating point data, if fixed point data is used, under the premise that the amount of computations is relatively small, the fixed point data may be converted to floating point data so that the precision of computations can be guaranteed. In other words, the precision of computations may be improved by increasing a small amount of overhead.

A computation that needs to be completed in the basic processing circuits may be performed according to the following method:

converting, by the main processing circuit, the type of data, then transferring the data to the basic processing circuits for computations (for instance, the main processing circuit may convert a floating point number to a fixed point number that has less bit width, and may transfer the fixed point number to the basic processing circuits. Technical effects of the method include that the bit width of data being transferred may be reduced, the total count of bits being transferred may be reduced, the basic processing circuits may achieve better efficiency with less power consumption when performing fixed point computations of such bit width);

after receiving the data, converting, by the basic processing circuits, the data type of the data, then performing computations (for instance, the basic processing circuits receive a floating point number transferred from the main processing circuit, then convert the floating point number to a fixed point number for performing computations. In this way, the computational efficiency may be improved, and the power consumption may be reduced); and obtaining, by the basic processing circuits, results from computations, converting the data type of the results, then transferring the results to the main processing circuit (for instance, a computation result of a floating point number obtained by a basic processing circuit may first be converted into a fixed point number having a less bit width, then the fixed point number is transferred to the main processing circuit. Technical effects of this method include that the bit width during the transferring process may be reduced, and better efficiency with less power consumption may be realized).

A method of using the basic processing circuits (as shown in FIG. 2a) includes:

receiving, by the main processing circuit, input data to be computed from the external of the device;

Alternatively or additionally, using, by the main processing circuit, various computational circuits of the present unit such as the vector computational circuit, the inner product computing unit circuit, and the accumulator circuit to perform computations on the data; and transferring (as shown in FIG. 2b), by the main processing circuit via the data output interface, the data to the basic processing circuit array (the set of all the basic processing circuits is referred to as a basic processing circuit array).

A method of transferring data here may be transferring data to some basic processing circuits directly, which in other words, refers to a method of broadcasting for a plurality of times.

A method of transferring data here may also be transferring different data to different basic processing circuits, which in other words, refers to a method of distributing.

The method of using the basic processing circuits further includes: performing, by the basic processing circuit array, computations on the data; and performing, by the basic processing circuits, computations after receiving the data.

Alternatively or additionally, after a basic processing circuits receives data, the method includes: outputting, by a basic processing circuit, the data via the data output interface of the unit (the basic processing circuit transfers data to another basic processing circuit that does not receive data from the main processing circuit directly).

Alternatively or additionally, the method includes: transferring, by a basic processing circuit, a computation result (an intermediate result or a final computation result) via the data output interface;

receiving, by the main processing circuit, output data returned by the basic processing circuit array;

Alternatively or additionally, processing (such as accumulating or activation operating), by the main processing circuit, the data received from the basic processing circuit array; and transferring, by the main processing circuit, a processing result to the external of the device via the data output interface after finishing the processing.

The present disclosure may use the circuit device to perform a matrix-multiply-vector computation (a matrix-multiply-vector computation refers to a computation of obtaining a vector by performing inner product computations between each row of a matrix and a vector, then placing the results according to a corresponding order).

Below is a description of performing multiplication of a matrix S with a size of M rows and L columns and a vector P with a length of L, which is shown in FIG. 2c.

The present method may use all or some of the basic processing circuits of the neural network computing device. It is assumed that K basic processing circuits are used.

The main processing circuit may transfer data in all or some rows of the matrix S to each basic processing circuit of the k basic processing circuits.

In an alternative example, each time, the control circuit of the main processing circuit transfers a number or some numbers of data in a row of the matrix S to a basic processing circuit. For instance, when a number is transferred at a time, for a basic processing circuit, a $1^{st}$ number in a $3^{rd}$ row is transferred at a $1^{st}$ time, a $2^{nd}$ number in the $3^{rd}$ row is transferred at a $2^{nd}$ time, a $3^{rd}$ number in the $3^{rd}$ row is transferred at a $3^{rd}$ time, . . . ; or when some numbers are transferred at a time, first two numbers (a first number and a second number) in the $3^{rd}$ row are transferred at a $1^{st}$ time, a $3^{rd}$ number and a $4^{th}$ number in the $3^{rd}$ row are transferred at a $2^{nd}$ time, a $5^{th}$ number and a $6^{th}$ number in the $3^{rd}$ row are transferred at a $3^{rd}$ time . . . .

In an alternative example, each time, the control circuit of the main processing circuit transfers a number or some numbers of some rows of data of the matrix S to a basic processing circuit. For instance, for a basic processing circuit, $1^{st}$ numbers in a $3^{rd}$, $4^{th}$, and $5^{th}$ rows are transferred at a $1^{st}$ time, $2^{nd}$ numbers in the $3^{rd}$, $4^{th}$, and $5^{th}$ rows are transferred at a $2^{nd}$ time, $3^{rd}$ numbers in the $3^{rd}$, $4^{th}$, and $5^{th}$ rows are transferred at a $3^{rd}$ time, . . . ; or first two numbers in the $3^{rd}$, $4^{th}$, and $5^{th}$ rows are transferred at a $1^{st}$ time, $3^{rd}$ numbers and $4^{th}$ numbers in the $3^{rd}$, $4^{th}$, and $5^{th}$ rows are transferred at a $2^{nd}$ time, $5^{th}$ numbers and $6^{th}$ numbers in the $3^{rd}$, $4^{th}$, and $5^{th}$ rows are transferred at a $3^{rd}$ time . . . .

The control circuit of the main processing circuit successively transfers data in the vector P to the zeroth basic processing circuit.

After receiving the data of the vector P, the zeroth basic processing circuit transfers the data to a next basic processing circuit that is connected to the zeroth basic processing circuit, which is the basic processing circuit 1.

Specifically, some basic processing circuits cannot obtain data required for computations directly from the main processing circuit. For instance, the basic processing circuit 1 in FIG. 2d only has one data input interface that is connected to the main processing circuit. In this case, the basic processing circuit 1 can only obtain data of the matrix S directly from the main processing circuit, and has to obtain data of the vector P from the basic processing circuit 0. Similarly, after receiving the data of the vector P, the basic processing circuit 1 continues to output the data to the basic processing circuit 2.

Each basic processing circuit performs computations on the received data. The computations may include but are not limited to: an inner product computation, a multiplication computation, an addition computation, and the like.

In an alternative example, each time, a basic processing circuit performs multiplication on one group or a plurality of groups of two sets of data, then accumulates results in the register and/or the on-chip cache.

In an alternative example, each time, a basic processing circuit computes an inner product of one group or a plurality of groups of two vectors, then accumulates results in the register and/or on-chip cache.

After obtaining a result by computing, the basic processing circuit outputs the result through the data output interface (in other words, transfers the result to another basic processing circuit connected to the basic processing circuit).

In an alternative example, the computation result may be a final result or an intermediate result of an inner product computation.

After the basic processing circuit receives a computation result from another basic processing circuit, the basic processing circuit transfers the data to yet another basic processing circuit that is connected to the basic processing circuit or to the main processing circuit.

The main processing circuit receives inner product computation results transferred by each of the basic processing circuits, and processes (which may be an accumulation computation, an activation computation, or the like) the results to obtain a final result.

Below is a description of an example of using the computing device to realize a matrix-multiply-vector computation.

In an alternative example, a plurality of basic processing circuits used in the method may be arranged according to a manner shown in FIG. 2d or FIG. 2e.

As shown in FIG. 2c, the data type conversion circuit of the main processing circuit converts a matrix S and a matrix P into fixed point data. The control circuit of the main processing circuit divides M rows of data of the matrix S into K groups. An $i^{th}$ basic processing circuit is configured to perform the computation of an $i^{th}$ group (a set of rows in the group of data is referred to as Ai).

A method of grouping the M rows of data is any grouping method as long as there is no repeated allocation.

In an alternative example, the following grouping method may be used: allocating a $j^{th}$ row to a j % $K^{th}$ (% is a computation for taking a remainder) basic processing circuit.

As an alternative example, in a case where rows cannot be grouped evenly, some rows may be grouped evenly first, and the remaining rows may be allocated in any manner.

Each time, the control circuit of the main processing circuit successively transfers data of some or all rows in the matrix S to corresponding basic processing circuits.

In an alternative example, each time, the control circuit of the main processing circuit transfers one or a plurality of data in a row of data of an $i^{th}$ group of data Mi that the $i^{th}$ basic processing circuit is responsible for to the $i^{th}$ basic processing circuit.

In an alternative example, each time, the control circuit of the main processing circuit transfers one or a plurality of data in each row of some or all rows of the $i^{th}$ group of data Mi that the $i^{th}$ basic processing circuit is responsible for to the $i^{th}$ basic processing circuit.

The control circuit of the main processing circuit successively transfers data in the vector P to a first basic processing circuit.

In an alternative example, each time, the control circuit of the main processing circuit transfers one or a plurality of data in the vector P.

After the $i^{th}$ basic processing circuit receives the data of the vector P, the $i^{th}$ basic processing circuit transfers the data of the vector P to an $i+1^{th}$ basic processing circuit that is connected to the $i^{th}$ basic processing circuit.

After each basic processing circuit receives one or a plurality of data from one or a plurality of rows of the matrix S and one or a plurality of data from the vector P, the basic processing circuit performs computations (the computations include but are not limited to multiplication or addition).

In an alternative example, each time, a basic processing circuit performs multiplication on one group or a plurality of groups of two sets of data, then accumulates results in the register and/or the on-chip cache.

In an alternative example, each time, a basic processing circuit computes an inner product of one group or a plurality of groups of two vectors, then accumulates results in the register and/or on-chip cache.

In an alternative example, the computation result may be a final result or an intermediate result of an inner product computation.

The basic processing circuit transfers a local computation result to another basic processing circuit that is connected to the basic processing circuit or the main processing circuit.

In an alternative example, corresponding to a structure shown in FIG. 2d, only the output interface of a last basic processing circuit in each column is connected to the main processing circuit. In this case, only the last basic processing circuit can directly transfer a local computation result to the main processing circuit. Computation results of other basic processing circuits all need to be transferred to subsequent basic processing circuits, and then be transferred by the subsequent basic processing circuits to basic processing circuits after the subsequent basic processing circuits, until the computation results are transferred to the last basic processing circuit. The last basic processing circuit accumulates a local computation result with results received from other basic processing circuits of the column to obtain an intermediate result and transfers the intermediate result to the main processing circuit. The last basic processing circuit may also transfer the local computation result and the results received from other basic processing circuits of the column to the main processing circuit directly.

In an alternative example, corresponding to a structure of FIG. 2e, each basic processing circuit has an output interface that is connected to the main processing circuit. In this case, each basic processing circuit can transfer a local computation result to the main processing circuit directly.

After the basic processing circuit receives a computation result from another basic processing circuit, the basic processing circuit transfers the data to yet another basic processing circuit that is connected to the basic processing circuit or to the main processing circuit.

The main processing circuit receives results of M inner product computations. The results serve as a computation result of the matrix-multiply-vector computation.

The present disclosure uses the circuit device to perform a matrix-multiply-matrix computation.

Below is a description of performing multiplication of a matrix S with a size of M rows and L columns and a matrix P with a size of L rows and N columns (each row of the matrix S is as long as each column of the matrix P, which is as shown in FIG. 2f).

The method is explained by using the device of FIG. 1b.

The method includes: converting, by the data type conversion circuit of the main processing circuit, a matrix S and a matrix P into fixed point data; and transferring, by the control circuit of the main processing circuit, data of some or all rows of the matrix S to basic processing circuits that are directly connected to the main processing circuit via horizontal data input interfaces (for instance, gray vertical data pathways at the top of FIG. 1b).

In an alternative example, each time, the control circuit of the main processing circuit transfers a number or some numbers of data in a row of the matrix S to a basic processing circuit (for instance, for a basic processing circuit, a $1^{st}$ number in a $3^{rd}$ row is transferred at a $1^{st}$ time, a $2^{nd}$ number in the $3^{rd}$ row is transferred at a $2^{nd}$ time, a $3^{rd}$ number in the $3^{rd}$ row is transferred at a $3^{rd}$ time, . . . ; or first two numbers in the $3^{rd}$ row are transferred at a $1^{st}$ time, a $3^{rd}$ number and a $4^{th}$ number in the $3^{rd}$ row are transferred at a $2^{nd}$ time, a $5^{th}$ number and a $6^{th}$ number in the $3^{rd}$ row are transferred at a $3^{rd}$ time, . . . ).

In an alternative example, each time, the control circuit of the main processing circuit transfers a number or some numbers of some rows of data of the matrix S to a basic processing circuit (for instance, for a basic processing circuit, $1^{st}$ numbers in a $3^{rd}$, $4^{th}$, and $5^{th}$ rows are transferred at a $1^{st}$ time, $2^{nd}$ numbers in the $3^{rd}$, $4^{th}$, and $5^{th}$ rows are transferred at a $2^{nd}$ time, $3^{rd}$ numbers in the $3^{rd}$, $4^{th}$, and $5^{th}$ rows are transferred at a $3^{rd}$ time, . . . ; or first two numbers in the $3^{rd}$, $4^{th}$, and $5^{th}$ rows are transferred at a $1^{st}$ time, $3^{rd}$ numbers and $4^{th}$ numbers in the $3^{rd}$, $4^{th}$, and $5^{th}$ rows are transferred at a $2^{nd}$ time, $5^{th}$ numbers and $6^{th}$ numbers in the $3^{rd}$, $4^{th}$, and $5^{th}$ rows are transferred at a $3^{rd}$ time, . . . ).

The control circuit of the main processing circuit transfers data of some or all columns of the matrix P to basic processing circuits that are directly connected to the main processing circuit via vertical data input interfaces (for instance, gray horizontal data pathways on the left of the basic processing circuit array shown in FIG. 1b).

In an alternative example, each time, the control circuit of the main processing circuit transfers a number or some numbers of a column of the matrix P to a basic processing circuit (for instance, for a basic processing circuit, a $1^{st}$ number in a $3^{rd}$ column is transferred at a $1^{st}$ time, a $2^{nd}$ number in the $3^{rd}$ column is transferred at a $2^{nd}$ time, a $3^{rd}$ number in the $3^{rd}$ column is transferred at a $3^{rd}$ time, . . . ; or first two numbers in the $3^{rd}$ column are transferred at a $1^{st}$ time, a $3^{rd}$ number and a $4^{th}$ number in the $3^{rd}$ column are transferred at a $2^{nd}$ time, a $5^{th}$ number and a $6^{th}$ number in the $3^{rd}$ column are transferred at a $3^{rd}$ time, . . . ).

In an alternative example, each time, the control circuit of the main processing circuit transfers a number or some numbers of some columns of data of the matrix P to a basic processing circuit. For instance, for a basic processing circuit, $1^{st}$ numbers in a $3^{rd}$, $4^{th}$, and $5^{th}$ columns are transferred at a $1^{st}$ time, $2^{nd}$ numbers in the $3^{rd}$, $4^{th}$, and $5^{th}$ columns are transferred at a $2^{nd}$ time, $3^{rd}$ numbers in the $3^{rd}$, $4^{th}$, and $5^{th}$ columns are transferred at a $3^{rd}$ time, . . . ; or first two numbers in the $3^{rd}$, $4^{th}$, and $5^{th}$ columns are transferred at a $1^{st}$ time, $3^{rd}$ numbers and $4^{th}$ numbers in the $3^{rd}$, $4^{th}$, and $5^{th}$ columns are transferred at a $2^{nd}$ time, $5^{th}$ numbers and $6^{th}$ numbers in the $3^{rd}$, $4^{th}$, and $5^{th}$ columns are transferred at a $3^{rd}$ time . . . .

After a basic processing circuit receives the data of the matrix S, the basic processing circuit transfers the data to a subsequent basic processing circuit connected to the basic processing circuit via a horizontal data output interface of the basic processing circuit (for instance, white horizontal data pathways at the center of the basic processing circuit array shown in FIG. 1b). After a basic processing circuit receives the data of matrix P, the basic processing circuit transfers the data to a subsequent basic processing circuit connected to the basic processing circuit via a vertical data output interface of the basic processing circuit (for instance, white vertical data pathways at the center of the basic processing circuit array shown in FIG. 1b).

Each basic processing circuit performs computations on received data.

In an alternative example, each time, a basic processing circuit performs multiplication on one group or a plurality of groups of two sets of data, then accumulates results in the register and/or the on-chip cache.

In an alternative example, each time, the basic processing circuit computes an inner product of one group or a plurality of groups of two vectors, then accumulate results in the register and/or on-chip cache.

After a basic processing circuit obtain a result by computing, the basic processing circuit outputs the result through the data output interface.

In an alternative example, the computation result may be a final result or an intermediate result of an inner product computation.

Specifically, if the basic processing circuit has an output interface that is directly connected to the main processing circuit, the basic processing circuit outputs the result via the interface. If the basic processing circuit does not have such output interface, the basic processing circuit outputs the result towards a basic processing circuit that can output to the main processing circuit directly (for instance, in FIG. 1b, basic processing circuits at a bottom row can transfer results to the main processing circuit directly, in this case, other basic processing circuits may transfer results downwards via vertical output interfaces).

After the basic processing circuit receives a computation result from another basic processing circuit, the basic processing circuit transfers the data to yet another basic processing circuit that is connected to the basic processing circuit or to the main processing circuit.

The basic processing circuit outputs a result towards the main processing circuit (for instance, as shown in FIG. 1b, basic processing circuits at a bottom row transfer results to the main processing circuit directly, and other basic processing circuits transfer results downwards via vertical output interfaces).

The main processing circuit receives inner product computation results transferred by the respective basic processing circuits to obtain an output result.

The present disclosure further provides an example of a method of a matrix-multiply-matrix computation.

The method uses a basic processing circuit array arranged according to the manner shown in FIG. 1b. It is assumed that there are h rows and w columns.

The method includes: converting, by the data type conversion circuit of the main processing circuit, the data type of a matrix S and a matrix P; and dividing, by the control circuit of the main processing circuit, the h rows of data of the matrix S into h groups, where an $i^{th}$ basic processing circuit performs the computations of an $i^{th}$ group (a set of rows in the group of data is referred to as Hi), and a method of grouping the h rows of data is any grouping method as long as there is no repeated allocation.

In an alternative example, the following allocation method may be used: allocating, by the control circuit of the main processing circuit, a $j^{th}$ row to a j % $h^{th}$ basic processing circuit.

As an alternative example, in a case where rows cannot be grouped evenly, some rows may be grouped evenly first, and the remaining rows may be allocated in any manner.

The method further includes: dividing, by the control circuit of the main processing circuit, the W columns of data of the matrix P into w groups, where the $i^{th}$ basic processing circuit performs the computations of an $i^{th}$ group (a set of rows in the group of data is referred to as Wi), and a method of grouping the W columns of data is any grouping method without repeated allocation;

in an alternative example, the following allocation method may be used: the control circuit of the main processing circuit allocates a $j^{th}$ row to a j % $w^{th}$ basic processing circuit;

as an alternative example, in a case where columns cannot be grouped evenly, some columns may be grouped evenly first, and the remaining columns may be allocated in any manner.

Alternatively or additionally, the control circuit of the main processing circuit transfers data in all or some rows of the matrix S to a first basic processing circuit in each row of the basic processing circuit array.

In an alternative example, each time, the control circuit of the main processing circuit transfers one or a plurality of data in a row of data of an $i^{th}$ group of data Hi that a $1^{st}$ basic processing circuit of an $i^{th}$ row of the basic processing circuit array is responsible for to the $1^{st}$ basic processing circuit.

In an alternative example, each time, the control circuit of the main processing circuit transfers one or a plurality of data in each row of some or all rows of the $i^{th}$ group of data Hi that the $1^{st}$ basic processing circuit of the $i^{th}$ row of the basic processing circuit array is responsible for to the $1^{st}$ basic processing circuit.

The control circuit of the main processing circuit transfers data in some or all columns of the matrix P to a $1^{st}$ basic processing circuit in each column of the basic processing circuit array.

In an alternative example, each time, the control circuit of the main processing circuit transfers one or a plurality of data in a column of data of an $i^{th}$ group of data Wi that a $1^{st}$ basic processing circuit of an $i^{th}$ column of the basic processing circuit array is responsible for to the $1^{st}$ basic processing circuit.

In an alternative example, each time, the control circuit of the main processing circuit transfers one or a plurality of data in each column of some or all columns of an $i^{th}$ group of data Ni that the $1^{st}$ basic processing circuit of the $i^{th}$ column of the basic processing circuit array is responsible for to the $11^{th}$ basic processing circuit.

After a basic processing circuit receives the data of the matrix S, the basic processing circuit transfers the data to a subsequent basic processing circuit connected to the basic processing circuit via a horizontal data output interface of the basic processing circuit (for instance, white horizontal data pathways at the center of the basic processing circuit array shown in FIG. 1b). After a basic processing circuit receives the data of matrix P, the basic processing circuit transfers the data to a subsequent basic processing circuit connected to the basic processing circuit via a vertical data output interface of the basic processing circuit (for instance, white vertical data pathways at the center of the basic processing circuit array shown in FIG. 1b).

Each basic processing circuit performs computations on received data.

In an alternative example, each time, a basic processing circuit performs multiplication on one group or a plurality of groups of two sets of data, then accumulates results in the register and/or the on-chip cache.

In an alternative example, each time, the basic processing circuit computes an inner product of one group or a plurality of groups of two vectors, then accumulates results in the register and/or on-chip cache.

After the basic processing circuit obtains a result by computing, the basic processing circuit outputs the result through the data output interface.

In an alternative example, the computation result may be a final result or an intermediate result of an inner product computation.

Specifically, if the basic processing circuit has an output interface that is directly connected to the main processing circuit, the basic processing circuit outputs the result via the interface. If the basic processing circuit does not have such output interface, the basic processing circuit outputs the result towards a basic processing circuit that can output to the main processing circuit directly (for instance, basic processing circuits at a bottom row can transfer results to the main processing circuit directly, in this case, other basic processing circuits may transfer results downwards via vertical output interfaces).

After the basic processing circuit receives a computation result from another basic processing circuit, the basic processing circuit transfers the data to yet another basic processing circuit that is connected to the basic processing circuit or to the main processing circuit.

The basic processing circuit outputs a result towards the main processing circuit (for instance, basic processing circuits at a bottom row can transfer results to the main processing circuit directly, and other basic processing circuits may transfer results downwards via vertical output interfaces).

The main processing circuit receives inner product computation results transferred by each basic processing circuit to obtain an output result.

The words "horizontal", "vertical", and the like used in the description above are only for the purpose of explaining the example shown in FIG. 1b. In a certain application, it is only required that "horizontal" and "vertical" interfaces of each unit represent two different interfaces.

The present disclosure can use the circuit device to perform a fully connected computation.

If input data of a fully connected layer is a vector (in other words, a case where input of a neural network is a single sample), a weight matrix of the fully connected layer serves as a matrix S, an input vector serves as a vector P. A matrix-multiply-vector computation can be performed according to the method of the device.

If the input data of the fully connected layer is a matrix (in other words, a case where the input of the neural network is a plurality of samples), the weight matrix of the fully connected layer serves as the matrix S, the input vector serves as a matrix P, or the weight matrix of the fully connected layer serves as the matrix P, and the input vector serves as the matrix S. A matrix-multiply-matrix computation may be performed according to the method of the device.

The present disclosure can use the circuit device to perform a fully convolution computation.

Figure 3A:
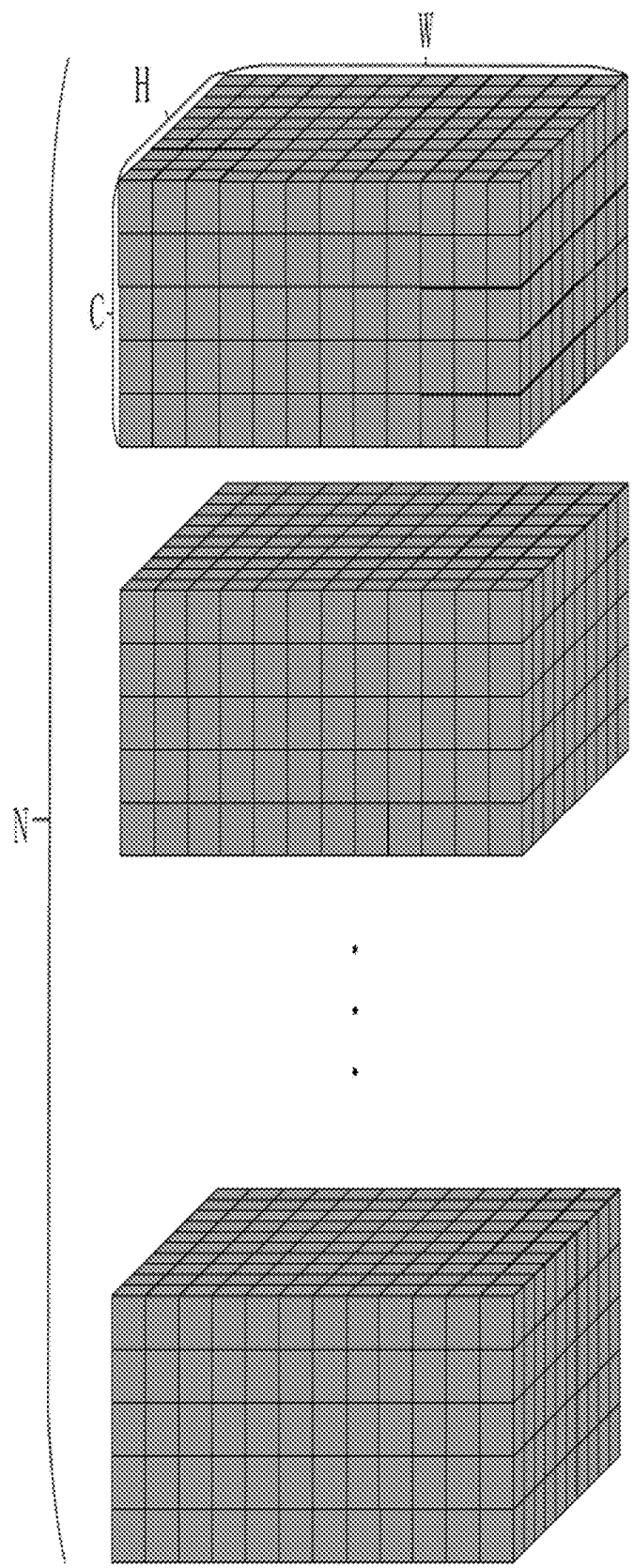
FIG. 3a is a schematic diagram of convolution input data.
Figure 3B:
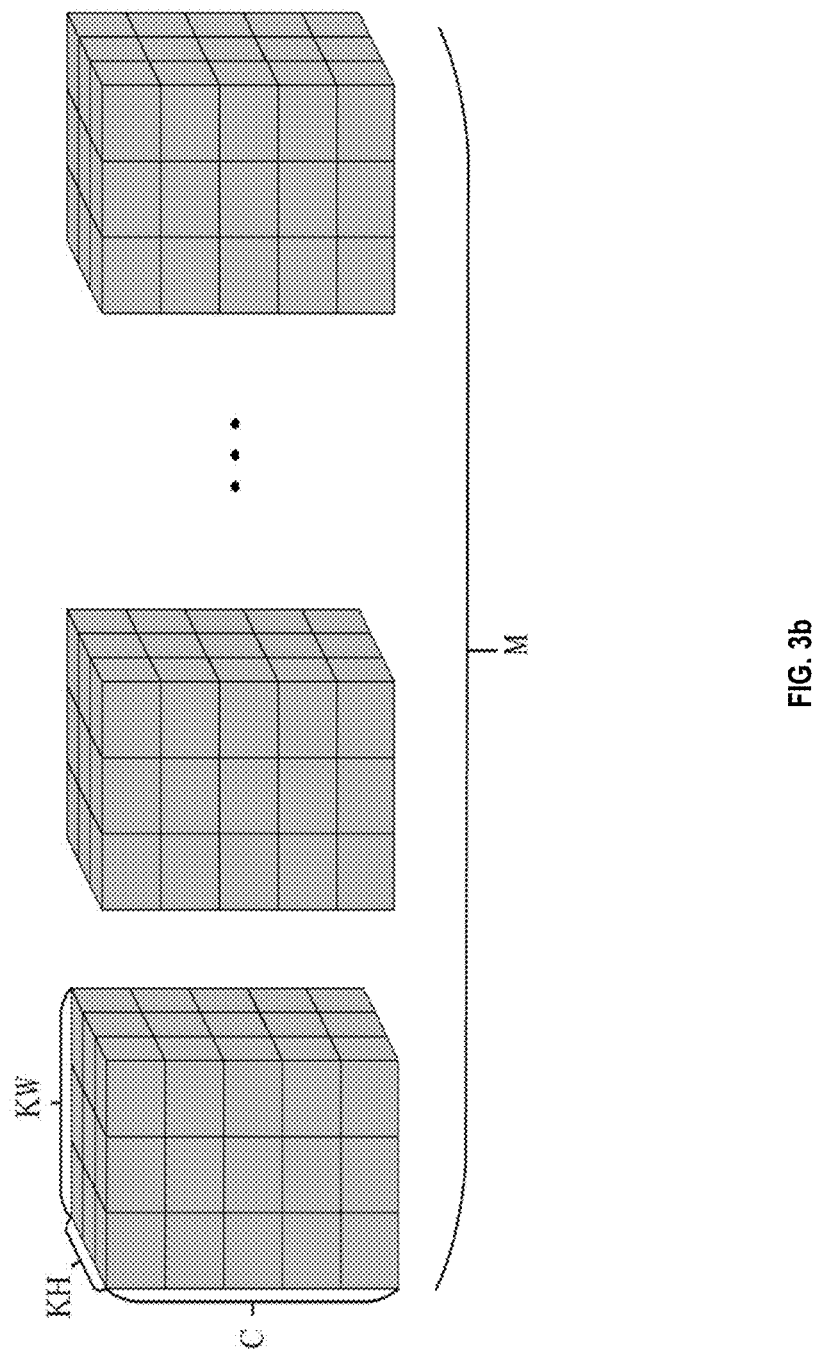
FIG. 3b is a schematic diagram of a convolution kernel.
Figure 3C:
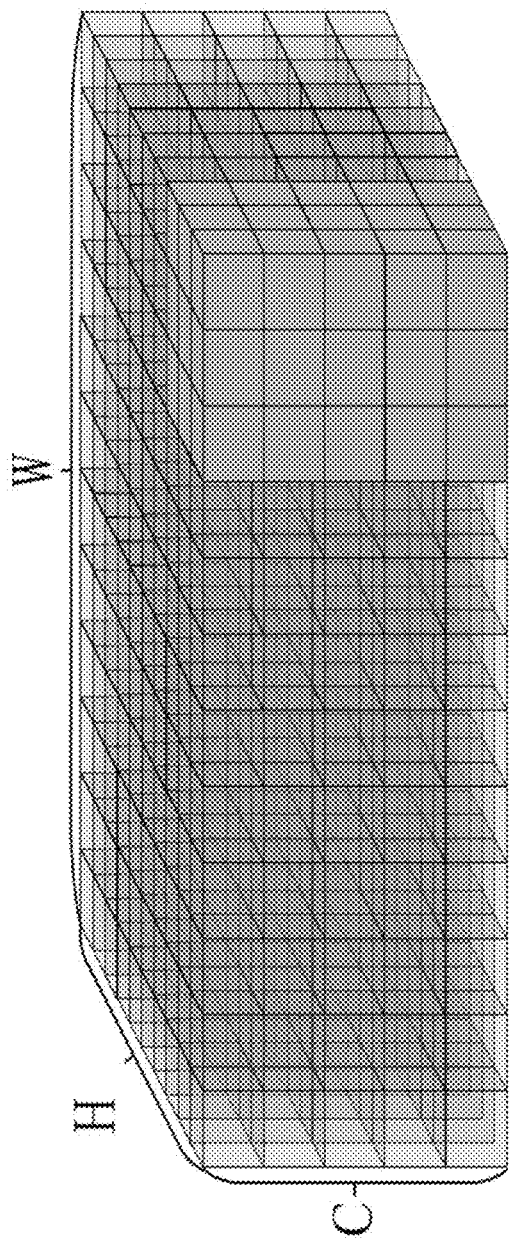
FIG. 3c is a schematic diagram of a computation window of a three-dimensional data block of input data.
Figure 3D:
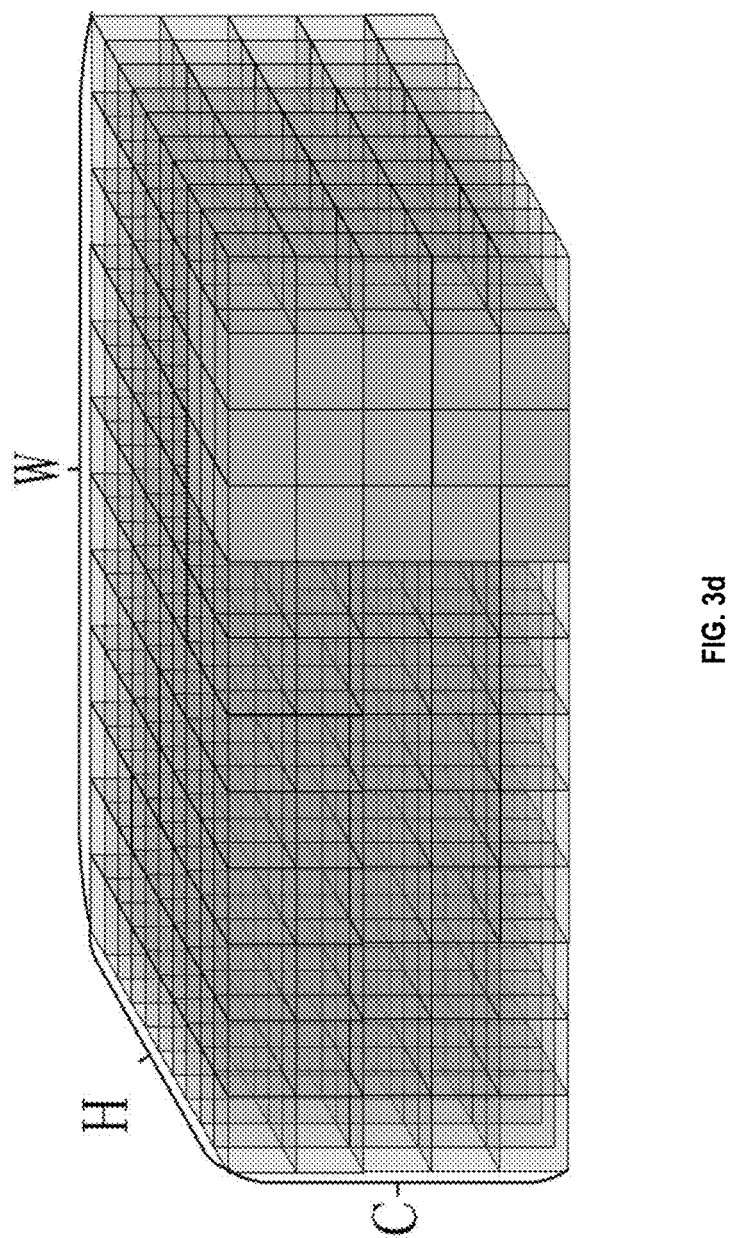
FIG. 3d is a schematic diagram of another computation window of a three-dimensional data block of input data.
Figure 3E:
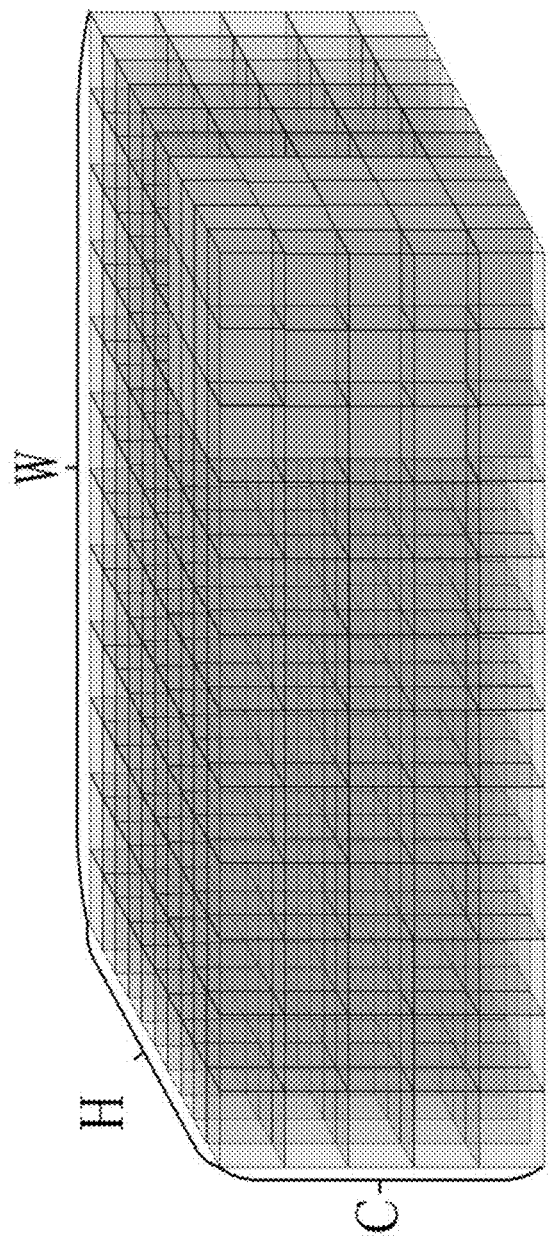
FIG. 3e is a schematic diagram of another computation window of a three-dimensional data block of input data.

Below is a description of the convolution computation. A block in the drawing represents one data, input data is shown by FIG. 3a (N samples, each sample has C channels, and a feature map of each channel has a height of H and a width of W). A weight, which is a convolution kernel, is shown by FIG. 3b (with M convolution kernels of which each has C channels with a height being KH and a width being KW). For the N samples of the input data, rules for convolution computations are the same. Below is an explanation of a process of performing a convolution computation on a sample. Each of the M convolution kernels is subject to the same computation. A plane feature map can be obtained from the computation of each convolution kernel. M plane feature maps can be obtained from the computations of M plane feature maps (for a sample, output of convolution is M feature maps). For a convolution kernel, inner product computations are to be performed on each plane of a sample. Then the convolution kernel slides in a direction of H and a direction of W. For instance, FIG. 3c shows an inner product computation of a convolution kernel at a position at lower right corner of a sample of input data. FIG. 3d shows the convolution kernel slides leftwards for one grid. FIG. 3e shows the convolution kernel slides upwards for one grid.

The method is explained by using the device of FIG. 1b.

The method includes: converting, by the data type conversion circuit of the main processing circuit, data in some or all convolution kernels of the weight to fixed point data; transferring, by the control circuit of the main processing circuit, data of some or all convolution kernels of the weight to basic processing circuits that are directly connected to the main processing circuit via horizontal data input interfaces (for instance, gray vertical data pathways at the top of FIG. 1b).

In an alternative example, each time, the control circuit of the main processing circuit transfers a number or some numbers of data in a convolution kernel of the weight to a basic processing circuit. For instance, for a basic processing circuit, a $1^{st}$ number in a $3^{rd}$ row is transferred at a $1^{st}$ time, a $2^{nd}$ number in the $3^{rd}$ row is transferred at a $2^{nd}$ time, a $3^{rd}$ number in the $3^{rd}$ row is transferred at a $3^{rd}$ time, . . . , or first two numbers in a $3^{rd}$ row are transferred at a $1^{st}$ time, a $3^{rd}$ number and a $4^{th}$ number in the $3^{rd}$ row are transferred at a $2^{nd}$ time, a $5^{th}$ number and a $6^{th}$ number in the $3^{rd}$ row are transferred at a $3^{rd}$ time . . . .

Another case in an alternative example may be that, each time, the control circuit of the main processing circuit transfers a number or some numbers of data of some convolution kernels of the weight to a basic processing circuit. For instance, for a basic processing circuit, $1^{st}$ numbers in a $3^{rd}$, $4^{th}$, and $5^{th}$ rows are transferred at a $1^{st}$ time, $2^{nd}$ numbers in the $3^{rd}$, $4^{th}$, and $5^{th}$ rows are transferred at a $2^{nd}$ time, $3^{rd}$ numbers in the $3^{rd}$, $4^{th}$, and $5^{th}$ rows are transferred at a $3^{rd}$ time, . . . , or first two numbers in the $3^{rd}$, $4^{th}$, and $5^{th}$ rows are transferred at a $1^{st}$ time, $3^{rd}$ numbers and $4^{th}$ numbers in the $3^{rd}$, $4^{th}$, and $5^{th}$ rows are transferred at a $2^{nd}$ time, $5^{th}$ numbers and $6^{th}$ numbers in the $3^{rd}$, $4^{th}$, and $5^{th}$ rows are transferred at a $3^{rd}$ time . . . .

The control circuit of the main processing circuit classifies input data according to positions of convolution, and transfers data of some or all positions of convolution in the input data to the basic processing circuits that are directly connected to the main processing circuit via the vertical data input interfaces (for instance, the gray horizontal data pathways on the left of the basic processing circuit array shown in FIG. 1b).

In an alternative example, each time, the control circuit of the main processing circuit transfers a number or some numbers of data of a position of convolution in the input data to a basic processing circuit. For instance, for a basic processing circuit, a $1^{st}$ number in a $3^{rd}$ column is transferred at a $1^{st}$ time, a $2^{nd}$ number in the $3^{rd}$ column is transferred at a $2^{nd}$ time, a $3^{rd}$ number in the $3^{rd}$ column is transferred at a $3^{rd}$ time, . . . , or first two numbers in the $3^{rd}$ column are transferred at a $1^{st}$ time, a $3^{rd}$ number and a $4^{th}$ number in the $3^{rd}$ column are transferred at a $2^{nd}$ time, a $5^{th}$ number and a $6^{th}$ number in the $3^{rd}$ column are transferred at a $3^{rd}$ time . . . .

Another case in an alternative example may be that, each time, the control circuit of the main processing circuit transfers a number or some numbers of data of some positions of convolution in the input data to a basic processing circuit. For instance, for a basic processing circuit, $1^{st}$ numbers in a $3^{rd}$, $4^{th}$, and $5^{th}$ columns are transferred at a $1^{st}$ time, $2^{nd}$ numbers in the $3^{rd}$, $4^{th}$, and $5^{th}$ columns are transferred at a $2^{nd}$ time, $3^{rd}$ numbers in the $3^{rd}$, $4^{th}$, and $5^{th}$ columns are transferred at a $3^{rd}$ time, . . . , or first two numbers in the $3^{rd}$, $4^{th}$, and $5^{th}$ columns are transferred at a $1^{st}$ time, $3^{rd}$ numbers and $4^{th}$ numbers in the $3^{rd}$, $4^{th}$, and $5^{th}$ columns are transferred at a $2^{nd}$ time, $5^{th}$ numbers and $6^{th}$ numbers in the $3^{rd}$, $4^{th}$, and $5^{th}$ columns are transferred at a $3^{rd}$ time . . . .

After the basic processing circuit receives the data of the weight, the basic processing circuit transfers the data to a subsequent basic processing circuit that is connected to the basic processing circuit via a horizontal data output interface of the basic processing circuit (for instance, horizontal data pathways filled in white at the center of the basic processing circuit array shown in FIG. 1b). After the basic processing circuit receives the input data, the basic processing circuit transfers the data to a subsequent basic processing circuit that is connected to the basic processing circuit via a vertical data output interface of the basic processing circuit (for instance, vertical data pathways filled in white at the center of the basic processing circuit array shown in FIG. 1b).

Each basic processing circuit performs computations on received data.

In an alternative example, each time, the basic processing circuit performs multiplication of one group or a plurality of groups of two sets of data, then accumulates results in the register and/or on-chip cache.

In an alternative example, each time, the basic processing circuit computes an inner product of one group or a plurality of groups of two vectors, then accumulates results in the register and/or on-chip cache.

After the basic processing circuit obtains a result by computing, the basic processing circuit outputs the result through the data output interface.

In an alternative example, the computation result may be a final result or an intermediate result of an inner product computation.

Specifically, if the basic processing circuit has an output interface that is directly connected to the main processing circuit, the basic processing circuit outputs the result via the interface. If the basic processing circuit does not have such output interface, the basic processing circuit outputs the result towards a basic processing circuit that can output to the main processing circuit directly (for instance, in FIG. 1b, basic processing circuits at a bottom row can transfer results to the main processing circuit directly, in this case, other basic processing circuits may transfer results downwards via vertical output interfaces).

After the basic processing circuit receives a computation result from another basic processing circuit, the basic processing circuit may transfer the data to yet another basic processing circuit that is connected to the basic processing circuit or to the main processing circuit.

The basic processing circuit outputs a result towards the main processing circuit (for instance, basic processing circuits at a bottom row can transfer results to the main processing circuit directly, and other basic processing circuits may transfer results downwards via vertical output interfaces).

The main processing circuit receives inner product computation results transferred by the respective basic processing circuit to obtain an output result.

The present disclosure provides a method of using the circuit device to perform an operation of giving a bias.

The vector computing unit circuit of the main processing circuit may be used to realize a function of adding two vectors together or adding two matrices together.

The vector computing unit circuit of the main processing circuit may be used to realize a function of adding a vector to each row of a matrix, or to each column of a matrix.

In an alternative example, the matrix may be from a result of a matrix-multiply-matrix computation performed by the device.

In an alternative example, the vector may be from a result of a matrix-multiply-vector computation performed by the device.

In an alternative example, the matrix may be from data received from the external by the main processing circuit of the device.

In an alternative example, the vector may be from data received from the external by the main processing circuit of the device.

Data sources of the matrix and/or the vector may include but are not limited to the above-mentioned data sources.

The present disclosure provides a method of using the circuit device to perform an activation function computation.

The method includes: using the activation circuit of the main processing circuit to input a vector, and computing to obtain an activation vector of the vector.

In an alternative example, the activation circuit of the main processing circuit performs a computation to obtain a numerical value for each value of an input vector according to an activation function (input of the activation function is a numerical value, and output is also a numerical value), and outputs the numerical value to a corresponding position of an output vector.

In an alternative example, the activation function is: $y=\max(m, x)$. x denotes an input numerical value, y denotes an output numerical value, and m denotes a constant.

In an alternative example, the activation function is: $y=\tanh(x)$. x denotes an input numerical value, and y denotes an output numerical value.

In an alternative example, the activation function is: $y=\text{sigmoid}(x)$. x denotes an input numerical value, y denotes an output numerical value.

In an alternative example, the activation function is a piecewise linear function.

In an alternative example, the activation function is a function of randomly inputting a number and outputting a number.

In an alternative example, a source of the input vector may include but is not limited to: an external data source of the device.

In an alternative example, the input data may come from a computation result of a matrix-multiply-vector computation performed by the device.

In an alternative example, the input data may come from a computation result of a matrix-multiply-matrix computation performed by the device.

The main processing circuit of the device computes to obtain a result.

In an alternative example, the input data may come from a computation result obtained after the main processing circuit of the device is biased.

The present disclosure provides a method of using the device to realize BLAS (Basic Linear Algebra Subprograms).

A GEMM computation refers to a computation of matrix-matrix multiplication in a BLAS library. A common representation of the computation is C=alpha*op(S)*op(P)+beta*C. A and B denote two input matrices, C denotes an output matrix, alpha and beta denote scalars, op denotes an operation performed on the matrix S or P. In addition, other supporting integers may be used as parameters to explain the width and height of the matrices A and B.

A step of using the device to realize the GEMM computation is:

before performing an op operation, the main processing circuit may perform data type conversion on the input matrix S and the matrix P;

performing, by the conversion circuit of the main processing circuit, corresponding op operation on the matrix S and the matrix P respectively.

In an alternative example, the op operation may be a matrix transposition operation which can be realized by using a vector computation function or data rearrangement function of the main processing circuit (as described above, the main processing circuit has a data rearrangement circuit). In a certain application, the op operation may also be realized by the conversion circuit directly. Taking the matrix transposition operation as an instance, the op operation may be realized by the matrix transposition circuit directly.

In an alternative example, op of a matrix may be null, which means the op operation may not be performed.

The computation method of matrix-multiply-matrix may be used to perform a matrix multiplication computation between op(S) and op(P).

The arithmetic and logic circuit of the main processing circuit may be used to perform an operation of multiplying each value in a result of op(S)*op(P) by alpha.

As an alternative example, in a case where alpha is 1, the operation of multiplying a value by alpha may not be performed.

The arithmetic and logic circuit of the main processing circuit may be used to realize a computation of beta*C.

As an alternative example, in a case where beta is 1, the operation of multiplying by beta may not be performed.

The arithmetic and logic circuit of the main processing circuit may be used to realize a step of adding corresponding positions of matrices alpha*op(S)*op(P) and beta*C together.

As an alternative example, in a case where beta is 0, the operation of adding may not be performed.

A GEMV computation refers to a computation of matrix-vector multiplication in a BLAS library. A common representation of the computation is C=alpha*op(S)*P+beta*C, where S denotes an input matrix, P denotes an input vector, C is denotes output vector, alpha and beta denote scalars, and op denotes an operation performed on the matrix S.

A step of using the device to realize the GEMV computation is:

before an op operation, converting, by the main processing circuit, the data type of the input matrix S and the matrix P; and performing, by the conversion circuit of the main processing circuit, a corresponding op operation on the matrix S.

As an alternative example, op may be a matrix transposition operation. The matrix transposition circuit of the main processing circuit may be used to realize the matrix transposition operation.

As an alternative example, op of a matrix may be null, which means the op operation may not be performed.

The computation method of matrix-multiply-vector may be used to perform a matrix-vector multiplication between the matrix op(S) and the vector op(P).

The arithmetic and logic circuit of the main processing circuit may be used to perform an operation of multiplying each value in a result of op(S)*P by alpha.

As an alternative example, in a case where alpha is 1, the operation of multiplying a value by alpha may not be performed.

The arithmetic and logic circuit of the main processing circuit may be used to realize a computation of beta*C.

As an alternative example, in a case where beta is 1, the operation of multiplying by beta may not be performed.

The arithmetic and logic circuit of the main processing circuit may be used to realize a step of adding corresponding positions of matrices alpha*op(S)*P and beta*C together.

As an alternative example, in a case where beta is 0, the operation of adding may not be performed.

The present disclosure provides a method of converting the type of data, which includes:

using the data type conversion circuit of the main processing circuit to convert the type of data.

In an alternative example, a form of data type conversion includes but is not limited to: converting a floating point number to a fixed point number, converting a fixed point number to a floating point number, and the like.

The present disclosure provides a method of updating a weight.

The method includes: using the vector computing unit circuit of the main processing circuit to realize a function of weight updating during neural network training. Specifically, the weight updating refers to a method of using a gradient of the weight to update the weight.

In an alternative example, the vector computing unit circuit of the main processing circuit may be used to perform addition and subtraction computations on the weight and the gradient of the weight, which are two vectors, to obtain a computation result. The computation result is an updated weight.

In an alternative example, the vector computing unit circuit of the main processing circuit may be used to multiply or divide the weight and the gradient of the weight by a number to obtain an intermediate weight and an intermediate gradient of the weight, then perform addition and subtraction computations on the intermediate weight and the intermediate gradient of the weight to obtain a computation result. The computation result is an updated weight.

In an alternative example, the gradient of the weight may first be subject to computations to obtain a group of momentum. Then the momentum and the weight may be subject to addition and subtraction computations to obtain an updated weight.

The present disclosure further provides a method of realizing a backward computation of a fully connected layer.

The backward computation of the fully connected layer has two parts. As shown in the accompanied drawing, an arrow with continuous line represents a process of a forward computation of the fully connected layer, and the part indicated by the dashed line shows a process of the backward computation of the fully connected layer.

It can be seen that the device can be used to perform the backward computation of the fully connected layer according to the method of a matrix-multiply-matrix computation.

The present disclosure provides a method of realizing a backward computation of a convolution layer.

The backward computation of the convolution layer has two parts. As shown in FIG. 4a, an arrow with continuous line represents a process of a forward computation of the convolution layer. FIG. 4b shows a process of the backward computation of the convolution layer.

The backward computation of the convolution layer as shown in FIG. 4a and FIG. 4b may be performed by using the device of FIG. 1a or the device of FIG. 1b. The forward computation or the backward computation is in fact a plurality of neural network operations. The plurality of operations include but are not limited to one or more of: a matrix-multiply-matrix computation, a matrix-multiply-vector computation, a convolution computation, an activation computation, and the like. A method of performing the computations above is similar to the related description in the preceding part, and thus is not explained in detail here.

FIG. 1f provides an integrated circuit chip device configured to perform neural network training. The neural network has n layers, where n is an integer greater than or equal to 2. The integrated circuit chip device includes a main processing circuit and a plurality of basic processing circuits. The main processing circuit includes a data type conversion circuit configured to convert data between a floating point data type and a fixed point data type.

The integrated circuit chip device is configured to receive a training instruction, determine input data and weight group data of a first layer according to the training instruction, and perform forward computations of the n layers of the neural network on the input data and the weight group data of the first layer to obtain an $n^{th}$ output result of the forward computations.

The main processing circuit is further configured to obtain an $n^{th}$ output result gradient according to the $n^{th}$ output result, obtain an $n^{th}$ backward computation of backward computations of an $n^{th}$ layer according to the training instruction, obtain an $n^{th}$ backward computation complexity according to the $n^{th}$ output result gradient, input data of the $n^{th}$ layer, weight group data of the $n^{th}$ layer, and the $n^{th}$ backward computation, and determine an $n^{th}$ back data type corresponding to the $n^{th}$ output result gradient, the input data of the $n^{th}$ layer, and the weight group data of the $n^{th}$ layer according to the $n^{th}$ backward computation complexity.

The main processing circuit is configured to determine the $n^{th}$ output result gradient, the input data of the $n^{th}$ layer, and the weight group data of the $n^{th}$ layer as a broadcasting data block and a distribution data block according to a type of the $n^{th}$ backward computation, partition the distribution data block of the $n^{th}$ back data type to obtain a plurality of basic data blocks, distribute the plurality of basic data blocks to at least one of the plurality of basic processing circuits, and broadcast the broadcasting data block of the $n^{th}$ back data type to the plurality of basic processing circuits.

The plurality of basic processing circuits are configured to perform computations on the broadcasting data block and the basic data blocks in the $n^{th}$ back data type to obtain computation results, and transfer the computation results to the main processing circuit.

The main processing circuit is configured to process the computation results to obtain a weight group gradient of the $n^{th}$ layer and an input data gradient of the $n^{th}$ layer, and update the weight group data of the $n^{th}$ layer according to the weight group gradient of the $n^{th}$ layer. The $n^{th}$ back data type includes a fixed point type or a floating point type.

The integrated circuit device is configured to perform backward computations of an $n-1^{th}$ layer by using the input data gradient of the $n^{th}$ layer as an $n-1^{th}$ output result gradient of the $n-1^{th}$ layer to obtain a weight group gradient of the $n-1^{th}$ layer, and update weight group data of a corresponding layer according to the weight group gradient of the $n-1^{th}$ layer, where the weight group data includes at least two weights.

FIG. 2f shows a forward computation of a neural network provided by an example of the present disclosure. Each layer may use input data and a weight of the present layer to obtain corresponding output data by performing computations according to a computation rule designated by a type of the layer.

The forward computation (also referred to as inference) of a neural network is a process of obtaining output data by processing input data of each layer and performing computations layer by layer, which has the following characteristics:

input of a layer:
input of a layer may be input data of a neural network;
input of a layer may be output data of another layer;
input of a layer may be output of the present layer at a last time (corresponding to a case of a recurrent neural network);
a layer may obtain input from a plurality of the sources above simultaneously.

output of a layer:
output of a layer may serve as an output result of a neural network;
output of a layer may be input of another layer;
output of a layer may be input of the present layer at a next time (corresponding to a case of a recurrent neural network);
a layer may output a result to a plurality of the output directions above.

Specifically, a type of a computation of a neural network layer may include but is not limited to:
a convolution layer (for performing a convolution computation);
a fully connected layer (for performing a fully connected computation);
a normalization layer, including a LRN (Local Response Normalization) layer, a BN (Batch Normalization) layer, and other types of layer;
a pooling layer; and
an activation layer, including but not limited to a Sigmoid layer, a ReLU layer, a PReLu layer, a LeakyReLu layer, and a Tan h layer.

A backward computation of a neural network layer includes computations of two parts. A first part is computing a gradient (a weight used in a weight updating step to update a weight of a current layer) of a weight by using an output data gradient that may be sparse and input data that may be sparse. A second part is computing an input data gradient (used as output data of a next layer in the backward computation so that the backward computation can be performed) by using an output data gradient that may be sparse and a weight that may be sparse.

The backward computation may follow an order that is opposite to an order of a forward computation to transfer a gradient reversely from a last layer.

In an alternative example, an output data gradient obtained from the backward computation of a layer may be from:

a gradient returned by a last lost function (or cost function) of the neural network;

an input data gradient of another layer; and an input data gradient of the present layer at a last time (corresponding to a case of a recurrent neural network).

A layer may obtain an output data gradient from a plurality of above-mentioned sources simultaneously.

After the backward computation of the neural network is completed, a gradient of a weight of each layer is obtained. In this step, a first input cache and a second input cache may be configured to store a weight and a gradient of the weight of a layer, then use the gradient of the weight in a computing unit to update the weight.

The above-mentioned computation is a computation of a neural network layer. For a multi-layer neural network, an implementation of the computation may be that, in a forward computation, after the computation of a previous layer of the artificial neural network is completed, a computation instruction of a next layer is performed by using output data obtained by a computing unit as input data of the next layer to perform a computation (or perform some operations on the output data then use the output data as input data of the next layer). At the same time, a weight is replaced with a weight of the next layer. In a backward computation, after the backward computation of a previous layer of the artificial neural network is completed, a computation instruction of a next layer is performed by using an input data gradient obtained by a computing unit as an output data gradient of the next layer to perform a computation (or perform some operations on the input data gradient then use the input data gradient as output data gradient of the next layer). At the same time, a weight is replaced with a weight of the next layer (as shown in the accompanied drawing, the dashed line arrow indicates the backward computation, the continuous line arrow indicates the forward computation. The marks below each figure indicate the meaning of the figure).

The present disclosure provides a method of fixed point data conversion.

The method of fixed point data conversion refers to converting a data representation of a data block in a network into a data representation of which the decimal point has a fixed position (a manner of placing 0/1 bit of data that is mapped to circuit device).

As an alternative example, a plurality of groups of data constitute a plurality of data blocks. The plurality of data blocks may be converted into a fixed point representation as whole according to the same fixed point representation method.

FIG. 1e shows a method of storing data which has a fixed point data structure with fewer digits according to an example of the present disclosure. 1 bit is for representing a symbol, M bits for representing an integer part, and N bits for representing a decimal part. Compared with a 32-bit floating point number representation, the present disclosure uses a fixed point data representation with fewer digits. The data representation above has fewer bits. Additionally, for data of the same layer and the same type in a neural network, such as all weight data of a first convolution layer, a flag bit (point location) is set in the data representation to mark the position of the decimal point. In this way, the precision of the data representation and the representable data range may be adjusted according to the distribution of data.

A floating point number may be represented in 32 bits. The present disclosure uses the fixed point data representation. In this way, bits of a numerical value may be reduced, and data transfer as well as computations may be reduced.

Input data is shown in FIG. 3a (N samples, each sample has C channels, and a feature map of each channel has a height of H and a width of W). A weight, which is a convolution kernel, is shown in FIG. 3b (with M convolution kernels. Each convolution kernel has C channels with a height being KH and a width being KW). For the N samples of the input data, rules for convolution computations are the same. Below is an explanation of a process of performing a convolution computation on a sample. Each of the M convolution kernels is subject to the same computation. A plane feature map can be obtained from the computation of each convolution kernel. M plane feature maps can be obtained from the computations of M plane feature maps (for a sample, output of convolution is M feature maps). For a convolution kernel, inner product computations are to be performed on each plane of a sample. Then the convolution kernel slides in a direction of H and a direction of W. For instance, FIG. 3c shows an inner product computation of a convolution kernel at a position at lower right corner of a sample of input data. FIG. 3d shows the convolution kernel slides leftwards for one grid. FIG. 3e shows the convolution kernel slides upwards for one grid.

If a first computation is a convolution computation, the input data is convolution input data, and the weight data is a convolution kernel.

The first complexity is computed as: the first complexity=$\alpha * C * kH * kW * M * N * W * C * H$.

$\alpha$ is a convolution coefficient greater than 1. C, kH, kW, M are values of four dimensions of the convolution kernel. N, W, C, H are values of four dimensions of the convolution input data.

If the first complexity is greater than a preset threshold, it needs to be determined whether the convolution input data and the convolution kernel are floating point data. If the convolution input data and the convolution kernel are not floating point data, the convolution input data and the convolution kernel are converted into floating point data, and then the convolution input data and the convolution kernel are subject to a convolution computation of the floating point data type.

Specifically, the convolution may be processed by using the chip structure shown in FIG. 1f. When the first complexity is greater than the preset threshold, the data type conversion circuit of the main processing circuit (or may be referred to as main unit) converts data in some or all convolution kernels of the weight to fixed point data. The control circuit of the main processing circuit transfers data of some or all convolution kernels of the weight to basic processing circuits (or may be referred to as basic unit) that are directly connected to the main processing circuit via horizontal data input interfaces.

In an alternative example, each time, the control circuit of the main processing circuit transfers a number or some numbers of data in a convolution kernel of the weight to a basic processing circuit. For instance, for a basic processing circuit, a $1^{st}$ number in a $3^{rd}$ row is transferred at a $1^{st}$ time, a $2^{nd}$ number in the $3^{rd}$ row is transferred at a $2^{nd}$ time, a $3^{rd}$ number in the $3^{rd}$ row is transferred at a $3^{rd}$ time, . . . , or first two numbers in a $3^{rd}$ row are transferred at a $1^{st}$ time, a $3^{rd}$ number and a $4^{th}$ number in the $3^{rd}$ row are transferred at a $2^{nd}$ time, a $5^{th}$ number and a $6^{th}$ number in the $3^{rd}$ row are transferred at a $3^{rd}$ time . . . .

Another case in an alternative example may be that, each time, the control circuit of the main processing circuit transfers a number or some numbers of data of some convolution kernels of the weight to a basic processing circuit. For instance, for a basic processing circuit, $1^{st}$ numbers in a $3^{rd}$, $4^{th}$, and $5^{th}$ rows are transferred at a $1^{st}$ time, $2^{nd}$ numbers in the $3^{rd}$, $4^{th}$, and $5^{th}$ rows are transferred at a $2^{nd}$ time, $3^{rd}$ numbers in the $3^{rd}$, $4^{th}$, and $5^{th}$ rows are transferred at a $3^{rd}$ time, . . . , or first two numbers in the $3^{rd}$, $4^{th}$, and $5^{th}$ rows are transferred at a $1^{st}$ time, $3^{rd}$ numbers and $4^{th}$ numbers in the $3^{rd}$, $4^{th}$, and $5^{th}$ rows are transferred at a $2^{nd}$ time, $5^{th}$ numbers and $6^{th}$ numbers in the $3^{rd}$, $4^{th}$, and $5^{th}$ rows are transferred at a $3^{rd}$ time . . . .

The control circuit of the main processing circuit classifies input data according to positions of convolution, and transfers data of some or all positions of convolution in the input data to the basic processing circuits that are directly connected to the main processing circuit via vertical data input interfaces.

In an alternative example, each time, the control circuit of the main processing circuit transfers a number or some numbers of data of a position of convolution in the input data to a basic processing circuit. For instance, for a basic processing circuit, a $1^{st}$ number in a $3^{rd}$ column is transferred at a $1^{st}$ time, a $2^{nd}$ number in the $3^{rd}$ column is transferred at a $2^{nd}$ time, a $3^{rd}$ number in the $3^{rd}$ column is transferred at a $3^{rd}$ time, . . . , or first two numbers in the $3^{rd}$ column are transferred at a $1^{st}$ time, a $3^{rd}$ number and a $4^{th}$ number in the $3^{rd}$ column are transferred at a $2^{nd}$ time, a $5^{th}$ number and a $6^{th}$ number in the $3^{rd}$ column are transferred at a $3^{rd}$ time . . . .

Another case in an alternative example may be that, each time, the control circuit of the main processing circuit transfers a number or some numbers of data of some positions of convolution in the input data to a basic processing circuit. For instance, for a basic processing circuit, $1^{st}$ numbers in a $3^{rd}$, $4^{th}$, and $5^{th}$ columns are transferred at a $1^{st}$ time, $2^{nd}$ numbers in the $3^{rd}$, $4^{th}$, and $5^{th}$ columns are transferred at a $2^{nd}$ time, $3^{rd}$ numbers in the $3^{rd}$, $4^{th}$, and $5^{th}$ columns are transferred at a $3^{rd}$ time, . . . , or first two numbers in the $3^{rd}$, $4^{th}$, and $5^{th}$ columns are transferred at a $1^{st}$ time, $3^{rd}$ numbers and $4^{th}$ numbers in the $3^{rd}$, $4^{th}$, and $5^{th}$ columns are transferred at a $2^{nd}$ time, $5^{th}$ numbers and $6^{th}$ numbers in the $3^{rd}$, $4^{th}$, and $5^{th}$ columns are transferred at a $3^{rd}$ time . . . .

After receiving the data of the weight, the basic processing circuit transfers the data to a subsequent basic processing circuit that is connected to the basic processing circuit via a horizontal data output interface of the basic processing circuit. After receiving the input data, the basic processing circuit transfers the data to a subsequent basic processing circuit that is connected to the basic processing circuit via a vertical data output interface of the basic processing circuit.

Each basic processing circuit performs computations on received data.

In an alternative example, each time, the basic processing circuit performs multiplication of one group or a plurality of groups of two sets of data, then accumulates results in the register and/or on-chip cache.

In an alternative example, each time, the basic processing circuit computes an inner product of one group or a plurality of groups of two vectors, then accumulates results in the register and/or on-chip cache.

After the basic processing circuit obtains a result by computing, the basic processing circuit outputs the result through the data output interface.

In an alternative example, the computation result may be a final result or an intermediate result of an inner product computation.

Specifically, if the basic processing circuit has an output interface that is directly connected to the main processing circuit, the basic processing circuit outputs the result via the interface. If the basic processing circuit does not have such output interface, the basic processing circuit outputs the result towards a basic processing circuit that can output to the main processing circuit directly.

After the basic processing circuit receives a computation result from another basic processing circuit, the basic processing circuit transfers the data to yet another basic processing circuit that is connected to the basic processing circuit or to the main processing circuit.

The basic processing circuit outputs a result towards the main processing circuit (for instance, basic processing circuits at a bottom row can transfer results to the main processing circuit directly, and other basic processing circuits may transfer results downwards via vertical output interfaces).

The main processing circuit receives inner product computation results transferred by the respective basic processing circuits to obtain an output result.

FIG. 2f shows a matrix-multiply-matrix computation. If the first computation is a matrix-multiply-matrix computation, the input data is a first matrix in the matrix-multiply-matrix computation, and the weight data is a second matrix in the matrix-multiply-matrix computation.

The first complexity is computed as: the first complexity=$\beta*F*G*E*F$. $\beta$ is a matrix coefficient greater than or equal to 1. F and G are row and column values of the first matrix. E and F are row and column values of the second matrix.

If the first complexity is greater than the preset threshold, it needs to be determined whether the first matrix and the second matrix are floating point data. If the first matrix and the second matrix are not floating point data, the first matrix and the second matrix are converted into floating point data. Then the first matrix and the second matrix are subject to a matrix-multiply-matrix computations of the floating point type.

Figure 7:
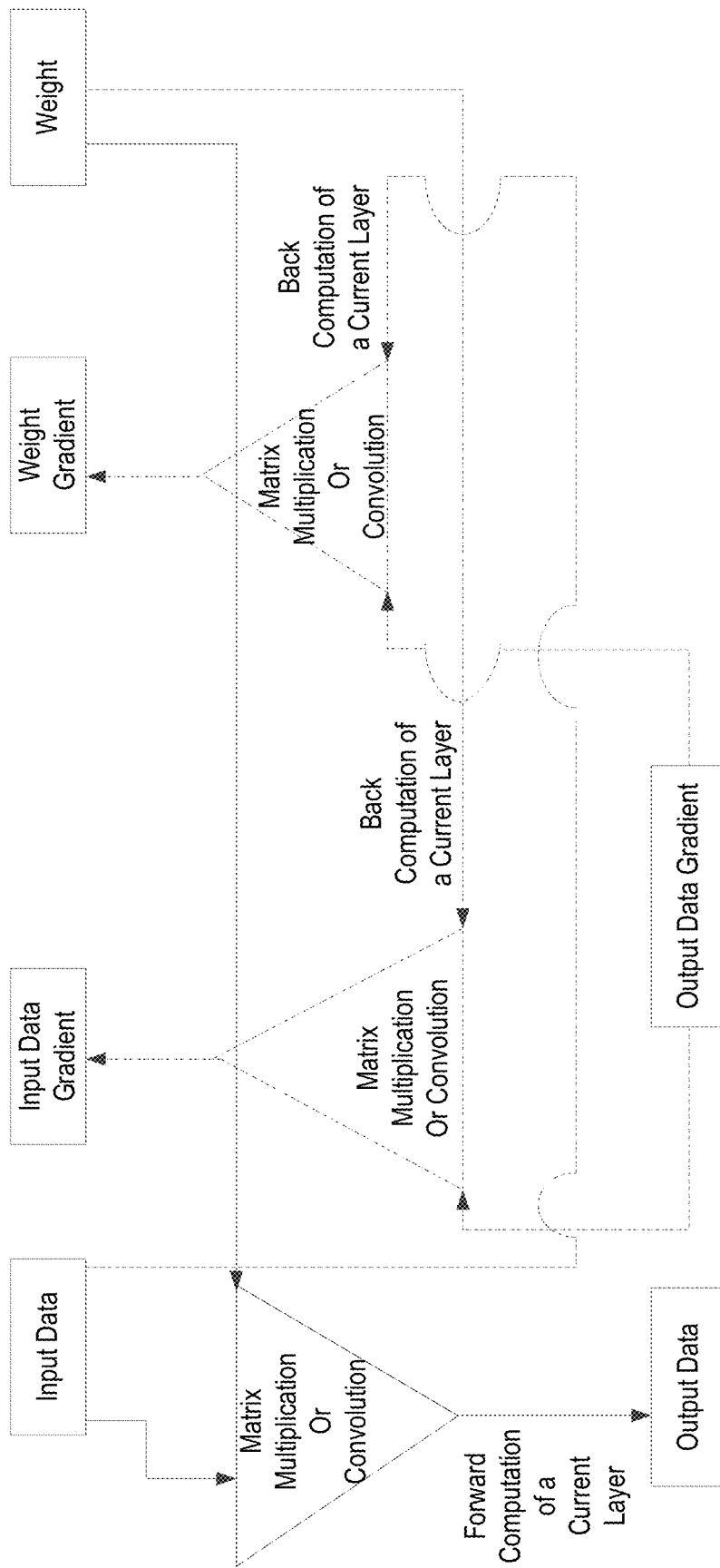
FIG. 7 is a schematic diagram of a neural network training method.
Figure 7A:
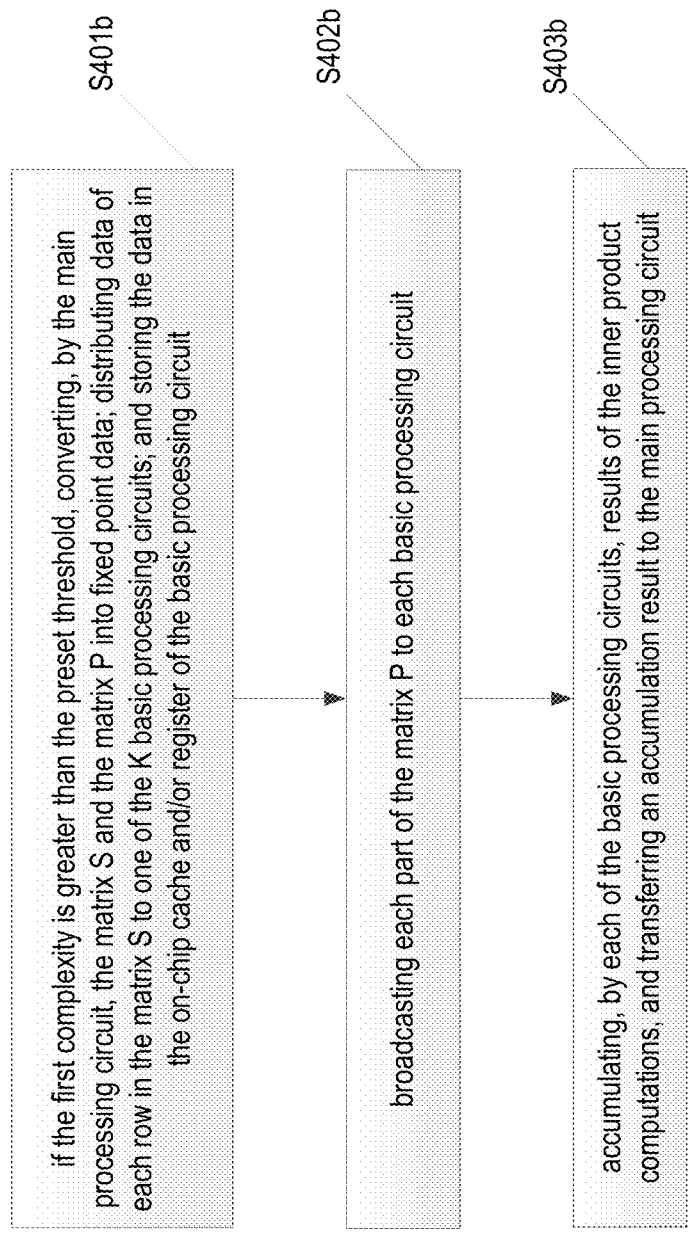
FIG. 7a is a flowchart of a method of a matrix-multiply-matrix computation.

FIG. 7a is a flowchart of using the device of FIG. 1f to perform a matrix-multiply-matrix computation.

Below is a description of performing multiplication of a matrix S with a size of M rows and L columns and a matrix P with a size of L rows and N columns (each row of the matrix S is as long as each column of the matrix P, which is as shown in FIG. 3d). The neural network computing device has K basic processing circuits.

A method of the multiplication includes: S401b, if the first complexity is greater than the preset threshold, converting, by the main processing circuit, the matrix S and the matrix P into fixed point data; distributing, by the control circuit of the main processing circuit, data of each row in the matrix S to one of the K basic processing circuits; storing, by the basic processing circuit, the received data in the on-chip cache and/or the register; and specifically, the data may be transferred to basic processing circuits that are directly connected to the main processing circuit.

In an alternative example, M is the count of rows of the matrix S. If M<=K, the control circuit of the main processing circuit distributes a row of data of the matrix S to M basic processing circuits respectively.

As an alternative example, M is the count of rows of the matrix S, if M>K, the control circuit of the main processing circuit distributes data of one or a plurality of rows of the matrix S to each basic processing circuit respectively.

In a case where Mi rows of the matrix S are distributed to an $i^{th}$ basic processing circuit (a set of the Mi rows can be referred to as Ai), FIG. 3e shows a computation to be performed by the $i^{th}$ basic processing circuit.

As an alternative example, for each of the basic processing circuits, such as the $i^{th}$ basic processing circuit:

the matrix Ai distributed by the main processing circuit is received and stored in the register and/or on-chip cache of the $i^{th}$ basic processing circuit. Technical effects of the example include that data that is transferred later may be reduced, the computational efficiency may be improved, and the power consumption may be reduced.

The method includes S402b, broadcasting, by the control circuit of the main processing circuit, each part of the matrix P to each basic processing circuit.

As an alternative example, each part of the matrix P is broadcast for only once to the register or on-chip cache of each basic processing circuit. The $i^{th}$ basic processing circuit fully reuses data of the matrix P which is obtained at this time to complete an inner product computation corresponding to each row of the matrix Ai. The reusing mentioned in the example may be repeatedly using data by the basic processing circuits during computation. For instance, reusing data of the matrix P may be using the data of the matrix P for a plurality of times.

As an alternative example, the control circuit of the main processing circuit sequentially broadcasts each part of the matrix P to the register or on-chip cache of each basic processing circuit. The $i^{th}$ basic processing circuit does not reuse the data of the matrix P which is obtained at each time, and completes an inner product computation corresponding to each row of the matrix Ai at different times.

As an alternative example, the control circuit of the main processing circuit sequentially broadcasts each part of the matrix P to the register or on-chip cache of each basic processing circuit. The $i^{th}$ basic processing circuit partially reuses the data of the matrix P which is obtained at each time, and complete an inner product computation corresponding to each row of the matrix Ai.

In an alternative example, each of the basic processing circuits, such as the $i^{th}$ basic processing circuit, computes an inner product of the data of the matrix Ai and the data of the matrix P.

The method includes S403b, accumulating, by the accumulator circuit of each of the basic processing circuits, results of the inner product computations, and transferring an accumulation result to the main processing circuit.

As an alternative example, the basic processing circuits transfer a partial sum obtained from each inner product computation to the main processing circuit for accumulating.

In an alternative example, partial sums obtained from the inner product computations performed each time by the basic processing circuits may be stored in the on-chip caching circuits and/or the registers of the basic processing circuits, and transferred to the main processing circuit after the accumulation ends.

As an alternative example, partial sums obtained from the inner product computations performed each time by the basic processing circuits may also, in some cases, be stored in the on-chip caching circuits and/or the registers of the basic processing circuits for accumulating, and in some cases, be transferred to the main processing circuit for accumulating, then be transferred to the main processing circuit after the accumulation ends.

FIG. 2c is a schematic diagram of a matrix-multiply-vector computation. The first computation may be: a matrix-multiply-vector computation. The input data is a first matrix in the matrix-multiply-vector computation, and the weight data is a vector in the matrix-multiply-vector computation.

The first complexity=$\beta*F*G*F$. $\beta$ is a matrix coefficient, $\beta$ is greater than or equal to 1, F and G are row and column values of the first matrix, and F is a column value of the vector.

If the first complexity is greater than the preset threshold, it needs to be determined whether the first matrix and the vector are floating point data. If the first matrix and the vector are not floating point data, the first matrix and the vector are converted into floating point data. Then the first matrix and the vector are subject to a matrix-multiply-vector computation according to the floating point data type.

Figure 7B:
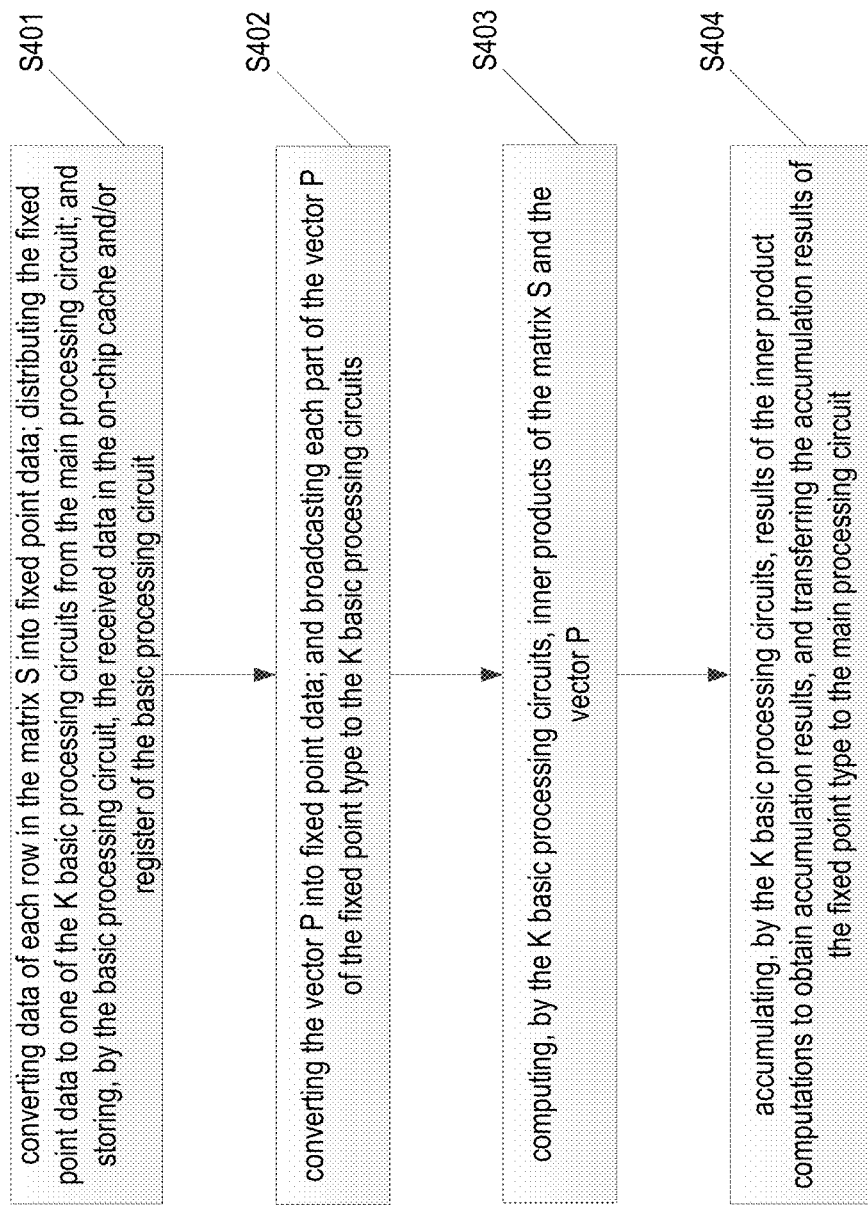
FIG. 7b is a flowchart of a method of a matrix-multiply-vector computation.

Referring to FIG. 7b, an implementation method of a matrix-multiply-vector computation is provided, which may include:

S401, converting, by the data type conversion circuit of the main processing circuit, data of each row in the matrix S into fixed point data; distributing, by the control circuit of the main processing circuit, the fixed point data to one of the K basic processing circuits; and storing, by the basic processing circuit, the received data in the on-chip cache and/or the register of the basic processing circuit.

As an alternative example, M is the count of rows of the matrix S. If M<=K, the control circuit of the main processing circuit distributes a row of the matrix S to the K basic processing circuits respectively.

As an alternative example, M is the count of rows of the matrix S. If M>K, the control circuit of the main processing circuit distributes data of one or a plurality of rows of the matrix S to each basic processing circuit respectively.

A set of rows of the matrix S that are distributed to an $i^{th}$ basic processing circuit is referred to as Ai, which has Mi rows in total. FIG. 3c shows a computation to be performed by the $i^{th}$ basic processing circuit.

As an alternative example, for each basic processing circuit, such as the $i^{th}$ basic processing circuit, the received data such as a matrix Ai which is transferred by means of distributing may be stored in the register and/or on-chip cache. Technical effects of the example include that data that is transferred afterwards by means of distributing may be reduced, the computational efficiency may be improved, and the power consumption may be reduced.

The method includes S402, converting, by the data type conversion circuit of the main processing circuit, the vector P into fixed point data; and broadcasting, by the control circuit of the main processing circuit, each part of the vector P of the fixed point type to the K basic processing circuits.

As an alternative example, the control circuit of the main processing circuit may broadcast each part of the vector P for only once to the register or on-chip cache of each basic processing circuit. The $i^{th}$ basic processing circuit may fully reuse data of the vector P which is obtained at this time to complete an inner product computation corresponding to each row of the matrix Ai. Technical effects of the example include that the data of the vector P which are repeatedly transferred from the main processing circuit to the basic processing circuits may be reduced, the execution efficiency may be improved, and the power consumption for transfer may be reduced.

As an alternative example, the control circuit of the main processing circuit sequentially broadcasts each part of the vector P to the register or on-chip cache of each basic processing circuit. The $i^{th}$ basic processing circuit does not reuse data of the vector P which is obtained at each time, and completes an inner product computation corresponding to each row of the matrix Ai at different times. Technical effects of the example include that the data of the vector P which is transferred at a single time in the basic processing circuits may be reduced, the capacity of the cache and/or the register of the basic processing circuits may be reduced, the execution efficiency may be improved, the power consumption for transfer may be reduced, and the costs may be reduced.

As an alternative example, the control circuit of the main processing circuit sequentially broadcasts each part of the vector P to the register or on-chip cache of each basic processing circuit. The $i^{th}$ basic processing circuit partly reuses data of the vector P which is obtained at each time and completes an inner product computation corresponding to each row of the matrix Ai. Technical effects of the example include that the data transferred from the main processing circuit to the basic processing circuits may be reduced, the data that is transferred within the basic processing circuits may be reduced, the execution efficiency may be improved, and the power consumption for transfer may be reduced.

The method includes S403, computing, by the inner product computing unit circuits of the K basic processing circuits, inner products of the matrix S and the vector P; for instance, computing, by the $i^{th}$ basic processing circuit, an inner product of the data of matrix Ai and the data of the vector P; and S404, accumulating, by the accumulator circuits of the K basic processing circuits, results of the inner product computations to obtain accumulation results, and transferring the accumulation results of a fixed point type to the main processing circuit.

As an alternative example, a partial sum obtained from the inner product computation performed each time by a basic processing circuit may be transferred to the main processing circuit for accumulating (the partial sum refers to part of the accumulation result, for instance, if the accumulation result is F1*G1+F2*G2+F3*G3+F4*G4+F5*G5, the partial sum may be the value of F1*G1+F2*G2+F3*G3). Technical effects of the example include that computations performed within the basic processing circuits may be reduced, and the computational efficiency of the basic processing circuits may be improved.

In an alternative example, a partial sum obtained from the inner product computation performed each time by a basic processing circuit may be stored in the on-chip caching circuit and/or the register of the basic processing circuit, and transferred to the main processing circuit after the accumulation ends. Technical effects of the example include that data which are transferred between the basic processing circuit and the main processing circuit may be reduced, the computational efficiency may be improved, and the power consumption of data transfer may be reduced.

As an alternative example, a partial sum obtained from the inner product computation performed each time by a basic processing circuits may also, in some cases, be stored in the on-chip caching circuit and/or the register of the basic processing circuit for accumulating, and in some cases, be transferred to the main processing circuit for accumulating, then be transferred to the main processing circuit after the accumulation ends. Technical effects of the example include that data which are transferred between the basic processing circuit and the main processing circuits may be reduced, the computational efficiency may be improved, the power consumption of data transfer may be reduced, computations performed within the basic processing circuit may be reduced, and the computational efficiency of the basic processing circuit may be improved.

The present disclosure provides a neural network training method.

Data involved in the neural network training may be represented according to different methods.

The data representation methods include but are not limited to:

floating point numbers with different bit widths;

fixed point numbers with different bit widths; and fixed point numbers with different positions of fixed point.

Different times during a training process (different times of iterations or the time of initialization), different stages during the training process (forward or backward computation), different layers, different data blocks in the same layer (a plurality of input data blocks and output data blocks), or different sub-data blocks in the same data block may all:

be fixed point or floating point representation.

For the fixed point representation:

different fixed point bit widths may be used;

different fixed point bias values (fixed point positions) may be used.

Below is an example for explaining an implementation method of neural network training. FIG. 2f shows a computation of the neural network training of a single layer. Input data and a weight or a parameter are used for the computation of the layer. The technical solution of the example determines whether to convert the type of the input data and the weight according to the input data, the weight, and the amount of forward computations of the layer. A process of making the determination may be: if the register space or memory space for storing the input data and the weight is greater than a preset threshold, the amount of forward computations of the layer is greater than a preset amount of computations, and the input data and the weight are floating point data, it is determined that the input data and the weight are to be converted to fixed point data. If the register space or memory space for storing the input data and the weight is less than the preset threshold, and the input data and the weight are fixed point data, the computations of the layer are to be performed after the input data and the weight are converted to floating point data.

The principle of the data type conversion is explained below. FIG. 1e shows a representation of fixed point data. For a computing system, the storage bit of one set of floating point data is 32 bits. For fixed point data, particularly a data representation using the floating point data shown in FIG. 1e, the storage bit of one set of fixed point data can be reduced to below 16 bits, which may greatly reduce transferring overhead between computing units during conversion. In addition, for a computing unit, the storage space of data having fewer bits may be smaller, which means that the storage overhead may be less, computations may also be reduced, and the computational overhead may be reduced. In this case, the fixed point data shown in FIG. 1e may reduce the computational overhead and storage overhead. However, data type conversion requires some computational overhead, which will be referred to as conversion overhead below. For data that requires a large amount of computations and storage, the conversion overhead is almost negligible compared with subsequent computational overhead, storage overhead, and transferring overhead. In this case, the present disclosure adopts a technical solution of converting data into fixed point data for data that requires a large amount of computations and a large amount of storage. On the contrary, for data that requires a small amount of computations and storage, the data requires less computational overhead, storage overhead, and transferring overhead. Since the precision of fixed point data is lower than the precision of floating point data, if fixed point data is used, under the premise that the amount of computations is relatively small, the fixed point data may be converted to floating point data so that the precision of computations can be guaranteed. In other words, the precision of computations may be improved by increasing a small amount of overhead.

Figure 7C:
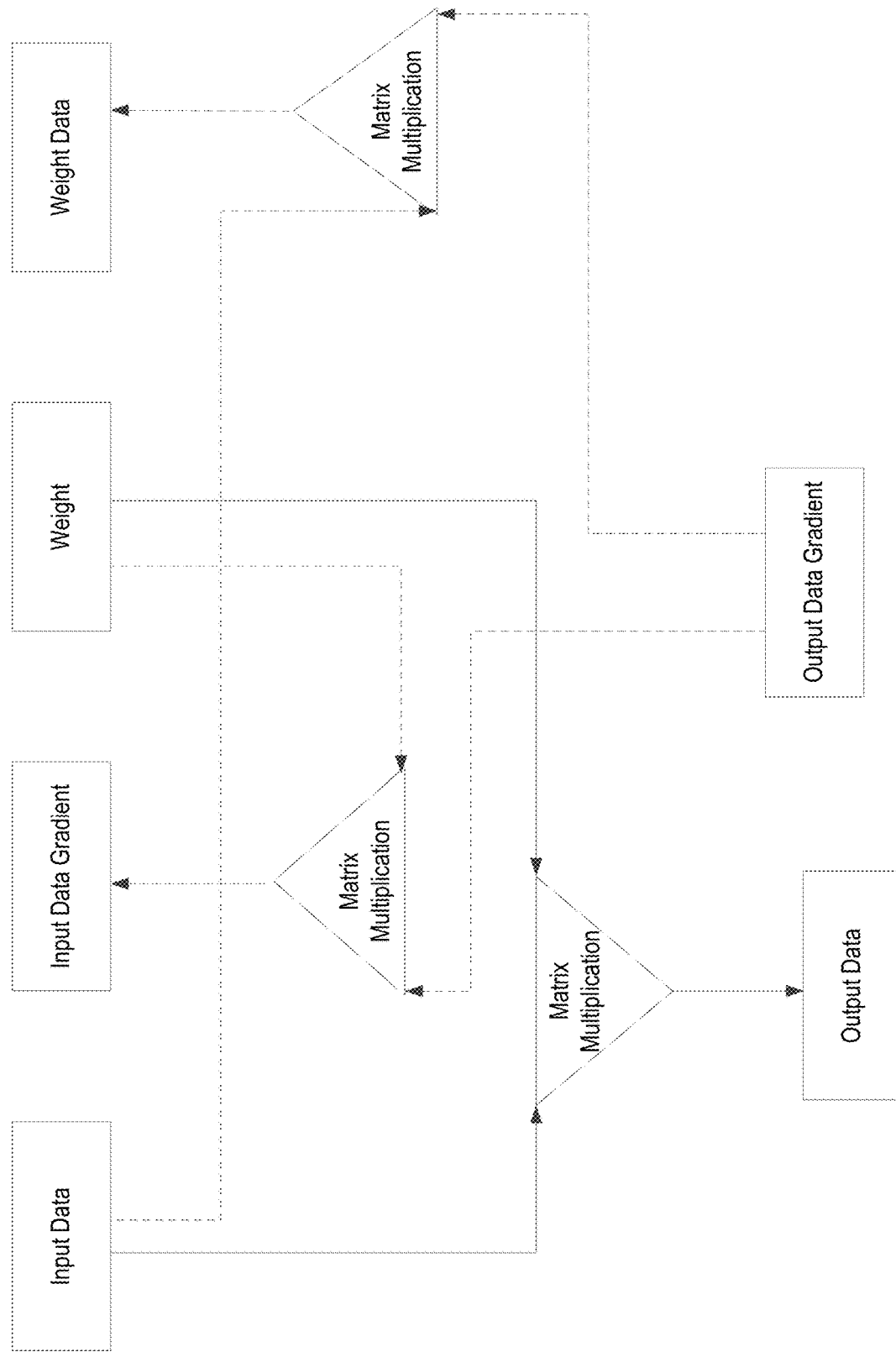
FIG. 7c is a schematic diagram of neural network training.
Figure 7D:
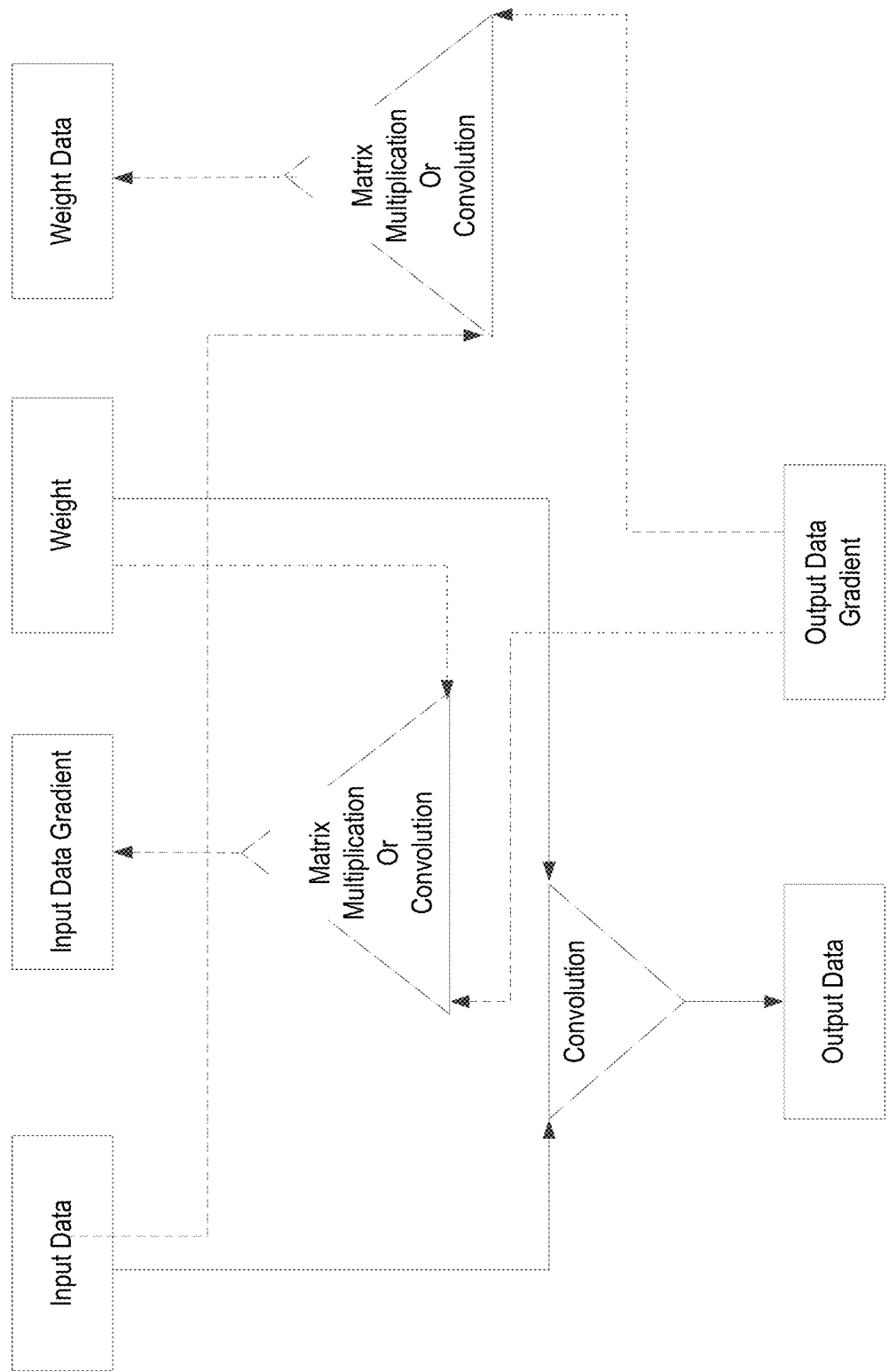
FIG. 7d is another schematic diagram of neural network training.

Below is an example. As show in FIG. 7c, the computation of a present layer is a matrix multiplication. The input data and the weight of the layer are matrices. For ease of explanation, in the example, the input data is a matrix I, and the weight is a matrix W. As shown in FIG. 7c, input data=matrix I*matrix W. If the sum of the columns of I and W as well the sum of the rows of I and W are relatively large, it can be considered that the matrix I and the matrix W occupy relatively large space of the memory and/or the register and have a relatively large amount of computations. In this case, if the matrix I and the matrix W are floating point data, the matrix I and the matrix W are first converted to fixed point data before being subject to the matrix multiplication.

For instance, the matrix I is a 1000*1000 matrix, and the matrix W is a 1000*1000 matrix. The sum of the columns and the sum of the rows are 2000, which are large and correspond to a large amount of computations. The matrix-multiply-matrix inner product computation includes 109 times of multiplication. In this technical solution, since the matrix I and the matrix W are large, it is impossible to transfer all the data at once. In this case, the same data may be transferred for several times. If data is transferred in fixed-point type, the amount of data transferred may be greatly reduced, which may thus reduce transferring overhead. The computations and storage of data with fewer bits may also reduce the computational overhead and storage overhead.

Figure 7E:
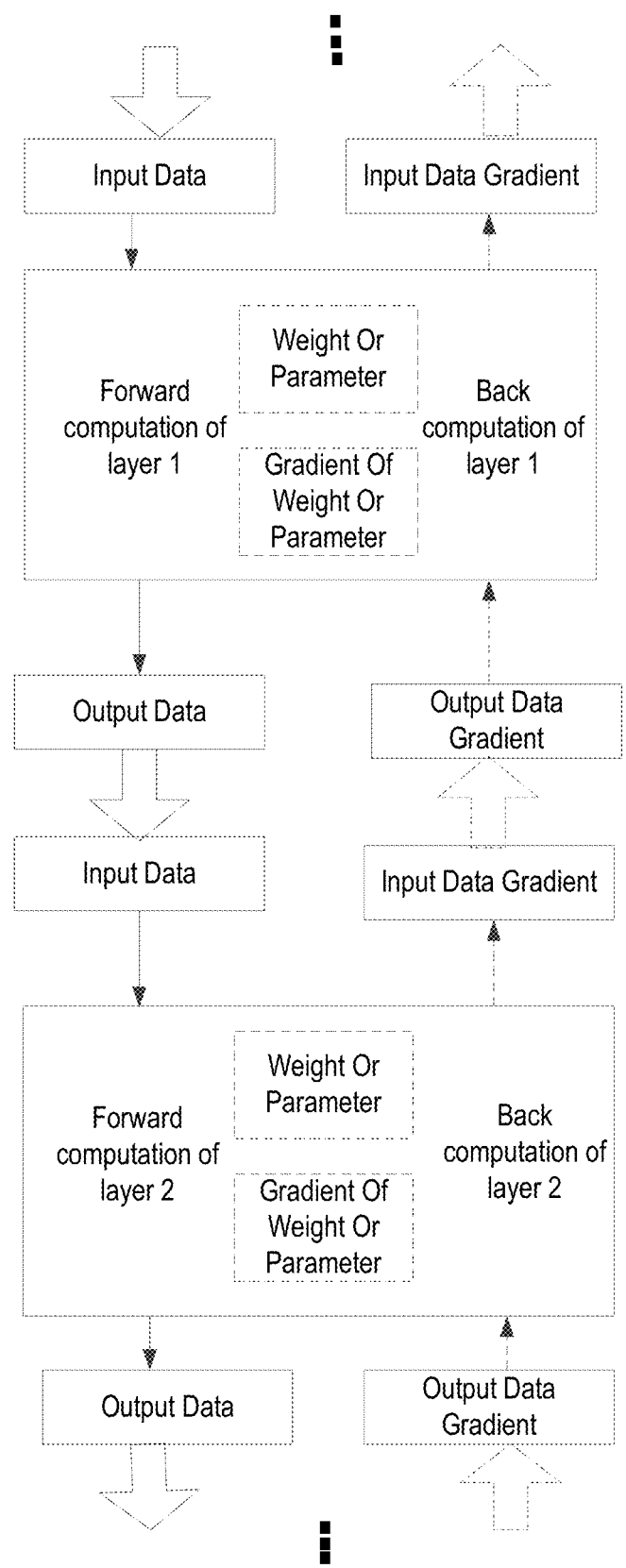
FIG. 7e is a schematic diagram of a forward computation and a backward computation of a neural network.
Figure 7F:
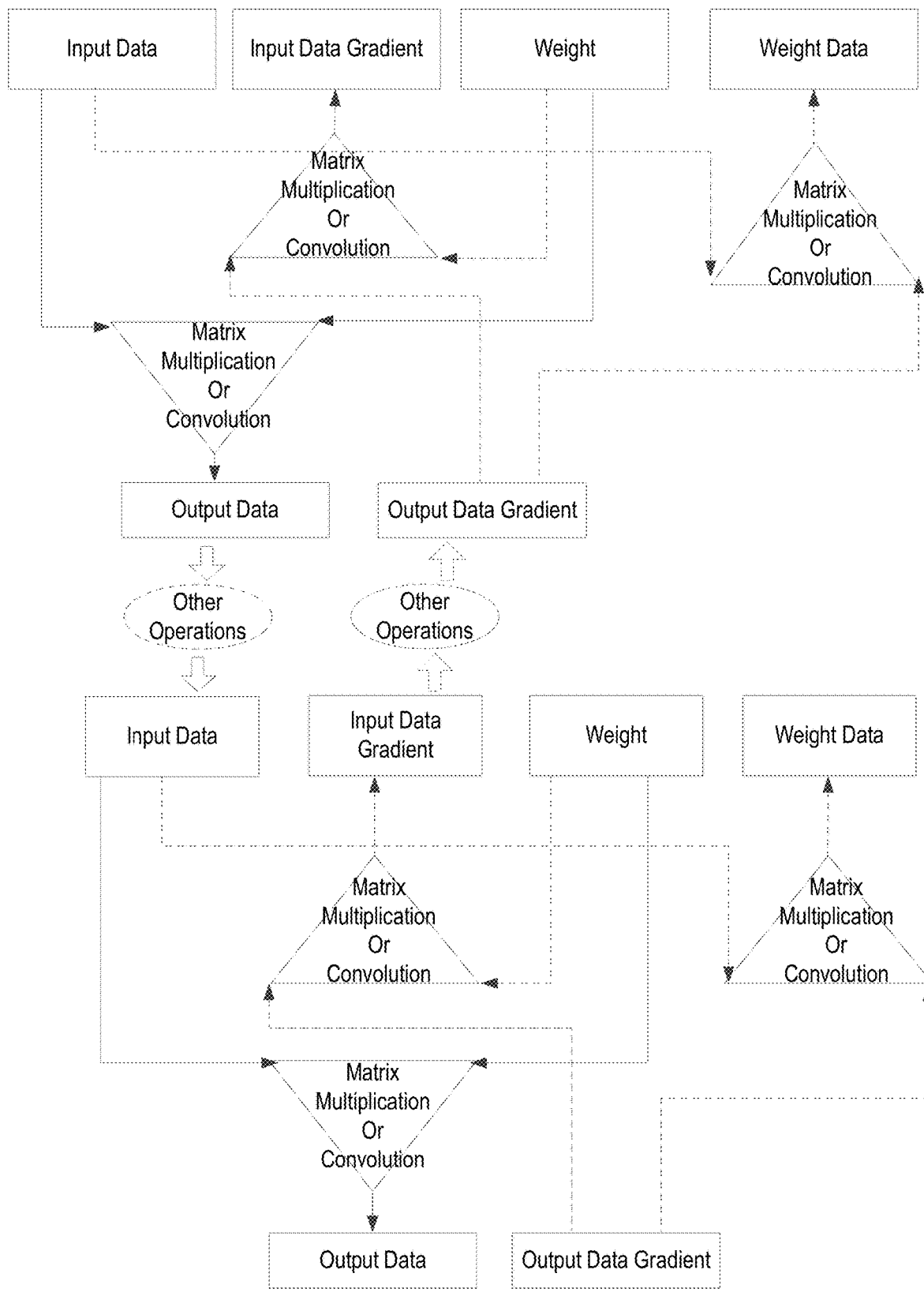
FIG. 7f is a schematic diagram of a multi-layer structure of neural network training.

Regarding a technical solution of converting fixed point data to floating point data, taking a backward computation as an instance, a direction indicated by up arrows in a computational structure shown in FIG. 7e illustrates a backward computation. During a backward computation, it is an output data gradient that is computed. For a last layer of a present iteration computation, the output data gradient is obtained by performing a preset computation (which can be set by the manufacturer according to certain demands. The present disclosure does not restrict the steps of the preset computation) on output data of the last layer. For a layer except the last layer of the present iteration computation, such as an $n^{th}$ layer, the output data gradient is an input data gradient obtained from the backward computation of an $n+1^{th}$ layer.

Below is an example. As show in FIG. 7e, the computation of a present layer is a matrix multiplication. The input data of the layer is a matrix and a weight of the layer is a scalar. For ease of explanation, in the example, the input data is a matrix I, and the weight is a scalar C. As shown in FIG. 7e, output data=matrix I*scalar C. Since the weight is the data of the scalar, the amount of data computations is relatively small. In this case, if the matrix I is fixed point data, the matrix I is converted to floating point data before being subject to a matrix-multiply-scalar multiplication.

For instance, the matrix I is a 10*10 matrix, and the scalar is C. The sum of the columns and the sum of the rows are 20, which are relatively small (it is assumed that a sum greater than 100 is considered to be relatively large, and a sum less than 100 is considered to be relatively small. Besides 100, those skilled in the art may set another number). The corresponding amount of computations is relatively small. The matrix-multiply-matrix inner product computation includes 102 times of multiplication. Since the amount of computations is relatively small, if the computations are still performed on fixed point data, the precision may be affected. In this case, floating point data may be used in the computations to improve the precision under the premise of the small amount of computations.

In an alternative example, data blocks in network layers may have a fixed bit width. However, the position of the fixed point may change according to the iteration cycles of training.

Specifically, during a training process, a data representation method of a data block may be set as follows:

when the training starts, the data block may be represented randomly;

Alternatively or additionally, the data block may be represented as a floating point data block with a certain bit width;

Alternatively or additionally, the data block may be represented as a fixed point data block with a specific form of which the fixed point bit width may be specified or the fixed point position may be specified.

Alternatively or additionally, the fixed point position may be set according to a maximum value of absolute values of all data in the data block.

Alternatively or additionally, the fixed point position may be set according to a minimum value of the absolute values of all data in the data block.

In an alternative example, during initialization, the position of the fixed point of a data block may be determined according to the position of the fixed point of the of another data block.

Alternatively or additionally, the fixed point position of a data block may be set according to an empirical value.

Specifically, during a training process, the data representation method of a data block may be changed at any iteration cycle.

In an alternative example, the data representation of a data block may not be adjusted.

In an alternative example, the data representation may be adjusted every certain number of iterations.

In an alternative example, the data representation may be adjusted every certain number of training epochs.

In an alternative example, the data representation may be adjusted every unfixed number of iterations.

In an alternative example, the data representation may be adjusted every unfixed number of training epochs.

Specifically, during a training process, a representation method of a data block may be changed into any data representation method.

In an alternative example, if a data block is represented by a fixed point number with a fixed bit width, a method of adjusting the fixed point position of the data representation may be:

Alternatively or additionally, every time, setting the fixed point position according to a method of initializing the fixed point position; and Alternatively or additionally, when the fixed point position of a data block is obtained according to the method of initializing the fixed point position, if the fixed point position is increased in an iteration cycle compared with a previous iteration cycle, changing the fixed point position of the present iteration cycle towards the direction of increase, if the fixed point position is decreased in an iteration cycle compared with a previous iteration cycle, changing the fixed point position of the present iteration cycle towards the direction of decrease.

The present disclosure further provides an integrated circuit chip device for performing neural network training. The neural network includes a plurality of layers. The integrated circuit chip device includes a processing circuit and an external interface.

The external interface is configured to receive a training instruction.

The processing circuit is configured to determine input data of a first layer and weight data of the first layer according to the training instruction, and perform forward computations of n layers of the neural network according to the input data and the weight data of the first layer to obtain an $n^{th}$ output result.

The processing circuit is further configured to obtain an $n^{th}$ output result gradient according to the $n^{th}$ output result, obtain an $n^{th}$ backward computation of backward computations of an $n^{th}$ layer according to the training instruction, obtain an $n^{th}$ backward computation complexity according to the $n^{th}$ output result gradient, input data of the $n^{th}$ layer, weight group data of the $n^{th}$ layer, and the $n^{th}$ backward computation, determine an $n^{th}$ back data type of the $n^{th}$ output result gradient, the input data of the $n^{th}$ layer, and the weight group data of the $n^{th}$ layer according to the $n^{th}$ backward computation complexity, perform the backward computations of the $n^{th}$ layer of the neural network on the $n^{th}$ output result gradient, the input data of the $n^{th}$ layer, and the weight group data of the $n^{th}$ layer according to the $n^{th}$ back data type to obtain n weight gradients of the computations of the n layers, where the $n^{th}$ back data type includes: a fixed point type or a floating point type.

The processing circuit is further configured to update n weights of the computations of the n layers according to the n weight gradients.

As shown in FIG. 1f, the present disclosure provides an integrated circuit chip device configured to perform neural network forward computations. The neural network has n layers. The integrated circuit chip device includes a main processing circuit and a plurality of basic processing circuits. The main processing circuit includes a data type conversion circuit configured to convert data between a floating point data type and a fixed point data type.

The main processing circuit is configured to receive a first operation instruction, parse the first operation instruction to obtain a first computation instruction included in an $i^{th}$ layer of the forward computations of the first operation instruction and corresponding input data and weight data of the first operation instruction. i is an integer greater than or equal to 1 and less than or equal to n. For instance, if i is greater than or equal to 2, the input data is output data of an $i-1^{st}$ layer.

The main processing circuit is configured to determine a first complexity of the first computation instruction according to the input data, the weight data, and the first computation instruction, determine a first data type corresponding to the first computation instruction according to the first complexity, and determine whether to turn on the data type conversion circuit according to the first complexity. The first data type is the floating point type or the fixed point type.

The main processing circuit is configured to classify the input data of the first data type and the weight data of the first data type into a broadcasting data block and a distribution data block according to a type of the first computation instruction, partition the distribution data block to obtain a plurality of basic data blocks, distribute the plurality of basic data blocks to at least one of the plurality of basic processing circuits, and broadcast the broadcasting data block to the plurality of basic processing circuits.

The plurality of basic processing circuits are configured to perform computations on the broadcasting data block and the basic data blocks according to the fixed point data type to obtain computation results, and transfer the computation results to the main processing circuit.

The main processing circuit is configured to process the computation results to obtain an instruction result of the first computation instruction so that computations of the first computation instruction of the $i^{th}$ layer are completed.

Alternatively or additionally, the device may further include branch circuits. Each of the branch circuits is connected between the main processing circuit and the plurality of basic processing circuits, and is configured to convert data for the main processing circuit and the plurality of basic processing circuits. With the branch processing circuits, more basic processing circuits can be connected to the main processing circuit, and the data transfer overhead of the main processing circuit may be reduced.

FIG. 2f shows a neural network forward computation provided by an example of the present disclosure. Each layer uses input data and a weight of the layer to obtain corresponding output data by performing computations according to a computation rule designated by a type of the layer.

The forward computation (also referred to as inference) of a neural network is a process of obtaining output data by processing input data of each layer and performing computations layer by layer, which has the following characteristics:

input of a layer:

input of a layer may be input data of a neural network;

input of a layer may be output data of another layer;

input of a layer may be output of the present layer at a last time (corresponding to a case of a recurrent neural network); and a layer may obtain input from a plurality of above-mentioned input sources simultaneously.

output of a layer:

output of a layer may serve as an output result of a neural network;

output of a layer may be input of another layer; and output of a layer may be input of the present layer at a next time (corresponding to a case of a recurrent neural network).

A layer may output a result to a plurality of the output directions above.

Specifically, a type of a computation of a layer in the neural network may include but is not limited to:

a convolution layer (for performing a convolution computation);

a fully connected layer (for performing a fully connected computation);

a normalization layer, including a LRN (Local Response Normalization) layer, a BN (Batch Normalization) layer, and other types of layer;

a pooling layer; and an activation layer, including but not limited to a Sigmoid layer, a ReLU layer, a PReLu layer, a LeakyReLu layer, and a Tan h layer.

A backward computation of a neural network layer includes computations of two parts. A first part is computing a gradient (a weight used in a weight updating step to update a weight of a current layer) of a weight by using an output data gradient that may be sparse and input data that may be sparse. A second part is computing an input data gradient (used as output data of a next layer in the backward computation so that the backward computation can be performed) by using an output data gradient that may be sparse and a weight that may be sparse.

The backward computation may follow an order that is opposite to an order of a forward computation to transfer a gradient reversely from a last layer.

In an alternative example, an output data gradient obtained from the backward computation of a layer may be from:

a gradient returned by a last lost function (or cost function) of the neural network;

an input data gradient of another layer; and an input data gradient of the present layer at a last time (corresponding to a case of a recurrent neural network).

A layer may obtain an output data gradient from a plurality of above-mentioned sources simultaneously.

After the backward computation of the neural network is completed, a gradient of a weight of each layer is obtained. In this step, a first input cache and a second input cache may be configured to store a weight and a gradient of the weight of a layer, then use the gradient of the weight in a computing unit to update the weight.

The above-mentioned computation is a computation of a neural network layer. For a multi-layer neural network, an implementation of the computation may be that, in a forward computation, after the computation of a previous layer of the artificial neural network is completed, a computation instruction of a next layer is performed by using output data obtained by a computing unit as input data of the next layer to perform a computation (or perform some operations on the output data then use the output data as input data of the next layer). At the same time, a weight is replaced with a weight of the next layer. In a backward computation, after the backward computation of a previous layer of the artificial neural network is completed, a computation instruction of a next layer is performed by using an input data gradient obtained by a computing unit as an output data gradient of the next layer to perform a computation (or perform some operations on the input data gradient then use the input data gradient as output data gradient of the next layer). At the same time, a weight is replaced with a weight of the next layer (as shown in the accompanied drawing, the dashed line arrow indicates the backward computation, the continuous line arrow indicates the forward computation. The marks below each figure indicate the meaning of the figure).

The present disclosure provides a method of fixed point data conversion.

The method of fixed point data conversion refers to converting a data representation of a data block in a network into a data representation of which the decimal point has a fixed position (a manner of placing 0/1 bit of data that is mapped to circuit device).

As an alternative example, a plurality of groups of data constitute a plurality of data blocks. The plurality of data blocks may be converted into a fixed point representation as whole according to the same fixed point representation method.

FIG. 1d shows a method of representing a fixed point data structure having fewer digits according to an example of the present disclosure. 1 bit is for representing a symbol, M bits for representing an integer part, and N bits for representing a decimal part. Compared with a 32-bit floating point number representation, the present disclosure uses a fixed point data representation with fewer digits. The data representation above has fewer bits. Additionally, for data of the same layer and the same type in a neural network, such as all weight data of a first convolution layer, a flag bit (point location) is set in the data representation to mark the position of the decimal point. In this way, the precision of the data representation and the representable data range may be adjusted according to the distribution of data.

A floating point number may be represented in 32 bits. The present disclosure uses the fixed point data representation. In this way, bits of a numerical value may be reduced, and data transfer as well as computations may be reduced.

Input data is shown in FIG. 3a (N samples, each sample has C channels, and a feature map of each channel has a height of H and a width of W). A weight, which is a convolution kernel, is shown in FIG. 3b (with M convolution kernels. Each convolution kernel has C channels with a height being KH and a width being KW). For the N samples of the input data, rules for convolution computations are the same. Below is an explanation of a process of performing a convolution computation on a sample. Each of the M convolution kernels is subject to the same computation. A plane feature map can be obtained from the computation of each convolution kernel. M plane feature maps can be obtained from the computations of M plane feature maps (for a sample, output of convolution is M feature maps). For a convolution kernel, inner product computations are to be performed on each plane of a sample. Then the convolution kernel slides in a direction of H and a direction of W. For instance, FIG. 3c shows an inner product computation of a convolution kernel at a position at lower right corner of a sample of input data. FIG. 3d shows the convolution kernel slides leftwards for one grid. FIG. 3e shows the convolution kernel slides upwards for one grid.

If a first computation is a convolution computation, the input data is convolution input data, and the weight data is a convolution kernel.

The first complexity is computed as: the first complexity=$\alpha*C*kH*kW*M*N*W*C*H$.

$\alpha$ is a convolution coefficient greater than 1. C, kH, kW, M are values of four dimensions of the convolution kernel. N, W, C, H are values of four dimensions of the convolution input data.

If the first complexity is greater than the preset threshold, the main processing circuit determines whether the convolution input data and the convolution kernel are floating point data. If the convolution input data and the convolution kernel are not floating point data, the main processing circuit converts the convolution input data and the convolution kernel into floating point data, and performs convolution computations on the convolution input data and the convolution kernel of the floating point type.

Specifically, a method of convolution process may be performed using the chip structure shown in FIG. 1f or FIG. 1a. When the first complexity is greater than the preset threshold, the data type conversion circuit of the main processing circuit (or may be referred to as main unit) converts data in some or all convolution kernels of the weight to fixed point data. The control circuit of the main processing circuit transfers data of some or all convolution kernels of the weight to basic processing circuits (or may be referred to as basic unit) that are directly connected to the main processing circuit via horizontal data input interfaces.

In an alternative example, each time, the control circuit of the main processing circuit transfers a number or some numbers of data in a convolution kernel of the weight to a basic processing circuit. For instance, for a basic processing circuit, a $1^{st}$ number in a $3^{rd}$ row is transferred at a $1^{st}$ time, a $2^{nd}$ number in the $3^{rd}$ row is transferred at a $2^{nd}$ time, a $3^{rd}$ number in the $3^{rd}$ row is transferred at a $3^{rd}$ time, ..., or first two numbers in a $3^{rd}$ row are transferred at a $1^{st}$ time, a $3^{rd}$ number and a $4^{th}$ number in the $3^{rd}$ row are transferred at a $2^{nd}$ time, a $5^{th}$ number and a $6^{th}$ number in the $3^{rd}$ row are transferred at a $3^{rd}$ time . . . .

Another case in an alternative example may be that, each time, the control circuit of the main processing circuit transfers a number or some numbers of data of some convolution kernels of the weight to a basic processing circuit. For instance, for a basic processing circuit, $1^{st}$ numbers in a $3^{rd}$, $4^{th}$, and $5^{th}$ rows are transferred at a $1^{st}$ time, $2^{nd}$ numbers in the $3^{rd}$, $4^{th}$, and $5^{th}$ rows are transferred at a $2^{nd}$ time, $3^{rd}$ numbers in the $3^{rd}$, $4^{th}$, and $5^{th}$ rows are transferred at a $3^{rd}$ time, ..., or first two numbers in the $3^{rd}$, $4^{th}$, and $5^{th}$ rows are transferred at a $1^{st}$ time, $3^{rd}$ numbers and $4^{th}$ numbers in the $3^{rd}$, $4^{th}$, and $5^{th}$ rows are transferred at a $2^{nd}$ time, $5^{th}$ numbers and $6^{th}$ numbers in the $3^{rd}$, $4^{th}$, and $5^{th}$ rows are transferred at a $3^{rd}$ time . . . .

The control circuit of the main processing circuit classifies input data according to positions of convolution, and transfers data of some or all positions of convolution in the input data to the basic processing circuits that are directly connected to the main processing circuit via vertical data input interfaces.

In an alternative example, each time, the control circuit of the main processing circuit transfers a number or some numbers of data of a position of convolution in the input data to a basic processing circuit. For instance, for a basic processing circuit, a $1^{st}$ number in a $3^{rd}$ column is transferred at a $1^{st}$ time, a $2^{nd}$ number in the $3^{rd}$ column is transferred at a $2^{nd}$ time, a $3^{rd}$ number in the $3^{rd}$ column is transferred at a $3^{rd}$ time, ..., or first two numbers in the $3^{rd}$ column are transferred at a $1^{st}$ time, a $3^{rd}$ number and a $4^{th}$ number in the $3^{rd}$ column are transferred at a $2^{nd}$ time, a $5^{th}$ number and a $6^{th}$ number in the $3^{rd}$ column are transferred at a $3^{rd}$ time . . . .

Another case in an alternative example may be that, each time, the control circuit of the main processing circuit transfers a number or some numbers of data of some positions of convolution in the input data to a basic processing circuit. For instance, for a basic processing circuit, $1^{st}$ numbers in a $3^{rd}$, $4^{th}$, and $5^{th}$ columns are transferred at a $1^{st}$ time, $2^{nd}$ numbers in the $3^{rd}$, $4^{th}$, and $5^{th}$ columns are transferred at a $2^{nd}$ time, $3^{rd}$ numbers in the $3^{rd}$, $4^{th}$, and $5^{th}$ columns are transferred at a $3^{rd}$ time, . . . , or first two numbers in the $3^{rd}$, $4^{th}$, and $5^{th}$ columns are transferred at a $1^{st}$ time, $3^{rd}$ numbers and $4^{th}$ numbers in the $3^{rd}$, $4^{th}$, and $5^{th}$ columns are transferred at a $2^{nd}$ time, $5^{th}$ numbers and $6^{th}$ numbers in the $3^{rd}$, $4^{th}$, and $5^{th}$ columns are transferred at a $3^{rd}$ time . . . .

After receiving the data of the weight, the basic processing circuit transfers the data to a subsequent basic processing circuit that is connected to the basic processing circuit via a horizontal data output interface of the basic processing circuit. After receiving the input data, the basic processing circuit transfers the data to a subsequent basic processing circuit that is connected to the basic processing circuit via a vertical data output interface of the basic processing circuit.

Each basic processing circuit performs computations on received data.

In an alternative example, each time, the basic processing circuit performs multiplication of one group or a plurality of groups of two sets of data, then accumulates results in the register and/or on-chip cache.

In an alternative example, each time, the basic processing circuit computes an inner product of one group or a plurality of groups of two vectors, then accumulates results in the register and/or on-chip cache.

After the basic processing circuit obtains a result by computing, the basic processing circuit outputs the result through the data output interface.

In an alternative example, the computation result may be a final result or an intermediate result of an inner product computation.

Specifically, if the basic processing circuit has an output interface that is directly connected to the main processing circuit, the basic processing circuit outputs the result via the interface. If the basic processing circuit does not have such output interface, the basic processing circuit outputs the result towards a basic processing circuit that can output to the main processing circuit directly.

After the basic processing circuit receives a computation result from another basic processing circuit, the basic processing circuit transfers the data to yet another basic processing circuit that is connected to the basic processing circuit or to the main processing circuit.

The basic processing circuit outputs a result towards the main processing circuit (for instance, basic processing circuits at a bottom row can transfer results to the main processing circuit directly, and other basic processing circuits may transfer results downwards via vertical output interfaces).

The main processing circuit receives inner product computation results transferred by the respective basic processing circuit to obtain an output result.

FIG. 2f shows a matrix-multiply-matrix computation. If the first computation is a matrix-multiply-matrix computation, the input data is a first matrix in the matrix-multiply-matrix computation, and the weight data is a second matrix in the matrix-multiply-matrix computation.

The first complexity is computed as: the first complexity=$\beta*F*G*E*F$. $\beta$ is a matrix coefficient greater than or equal to 1. F and G are row and column values of the first matrix. E and F are row and column values of the second matrix.

If the first complexity is greater than the preset threshold, it needs to be determined whether the first matrix and the second matrix are floating point data. If the first matrix and the second matrix are not floating point data, the first matrix and the second matrix are converted into floating point data. Then the first matrix and the second matrix are subject to a matrix-multiply-matrix computations of the floating point type.

FIG. 7a is a flowchart of using the device of FIG. 1f to perform a matrix-multiply-matrix computation.

Below is a description of performing multiplication of a matrix S with a size of M rows and L columns and a matrix P with a size of L rows and N columns (each row of the matrix S is as long as each column of the matrix P, which is as shown in FIG. 3d). The neural network computing device has K basic processing circuits.

A method of the multiplication includes: S401b, if the first complexity is greater than the preset threshold, converting, by the main processing circuit, the matrix S and the matrix P into fixed point data; distributing, by the control circuit of the main processing circuit, data of each row in the matrix S to one of the K basic processing circuits; and storing, by the basic processing circuit, the received data in the on-chip cache and/or the register. Specifically, the data may be transferred to basic processing circuits that are directly connected to the main processing circuit.

As an alternative example, M is the count of rows of the matrix S, if M<=K, the control circuit of the main processing circuit distributes a row of the matrix S to M basic processing circuits respectively.

As an alternative example, M is the count of rows of the matrix S, if M>K, the control circuit of the main processing circuit distributes data of one or a plurality of rows of the matrix S to each basic processing circuit respectively.

In a case where Mi rows of the matrix S are distributed to an $i^{th}$ basic processing circuit, a set of the Mi rows can be referred to as Ai. FIG. 3e shows a computation to be performed by the $i^{th}$ basic processing circuit.

As an alternative example, in each of the basic processing circuits, for instance, in the $i^{th}$ basic processing circuit:

the matrix Ai distributed by the main processing circuit is received and stored in the register and/or on-chip cache of the $i^{th}$ basic processing circuit. Technical effects of the example include that data that is transferred later may be reduced, the computational efficiency may be improved, and the power consumption may be reduced.

The method of the multiplication includes: S402b, broadcasting, by the control circuit of the main processing circuit, each part of the matrix P to each basic processing circuit.

As an alternative example, each part of the matrix P may be broadcast for only once to the register or on-chip cache of each basic processing circuit. The $i^{th}$ basic processing circuit may fully reuse data of the matrix P which is obtained at this time to complete an inner product computation corresponding to each row of the matrix Ai. The "reusing" mentioned in the example may be "repeatedly using data by the basic processing circuits during computation". For instance, reusing data of the matrix P may be using the data of the matrix P for a plurality of times.

As an alternative example, the control circuit of the main processing circuit sequentially broadcasts each part of the matrix P to the register or on-chip cache of each basic processing circuit. The $i^{th}$ basic processing circuit does not reuse the data of the matrix P which is obtained at each time, and completes an inner product computation corresponding to each row of the matrix Ai at different times.

As an alternative example, the control circuit of the main processing circuit sequentially broadcasts each part of the matrix P to the register or on-chip cache of each basic processing circuit. The $i^{th}$ basic processing circuit partially reuses the data of the matrix P which is obtained at each time, and completes an inner product computation corresponding to each row of the matrix Ai.

In an alternative example, each of the basic processing circuits, such as the $i^{th}$ basic processing circuit, computes an inner product of the data of the matrix Ai and the data of the matrix P.

The method of the multiplication includes: S403b, accumulating, by the accumulator circuit of each of the basic processing circuits, results of inner product computations, and transferring an accumulation result to the main processing circuit.

As an alternative example, the basic processing circuits may transfer a partial sum obtained from each inner product computation to the main processing circuit for accumulating.

In an alternative example, partial sums obtained from the inner product computations performed each time by the basic processing circuits may be stored in the on-chip caching circuits and/or the registers of the basic processing circuits, and transferred to the main processing circuit after the accumulation ends.

As an alternative example, partial sums obtained from the inner product computations performed each time by the basic processing circuits may also, in some cases, be stored in the on-chip caching circuits and/or the registers of the basic processing circuits for accumulating, and in some cases, be transferred to the main processing circuit for accumulating, then be transferred to the main processing circuit after the accumulation ends.

FIG. 2c is a schematic diagram of a matrix-multiply-vector computation. The first computation may be: a matrix-multiply-vector computation. The input data is a first matrix in the matrix-multiply-vector computation, and the weight data is a vector in the matrix-multiply-vector computation.

The first complexity=$\beta*F*G*F$. $\beta$ is a matrix coefficient greater than or equal to 1, F and G are row and column values of the first matrix, and F is a column value of the vector.

If the first complexity is greater than the preset threshold, the method includes determining whether the first matrix and the vector are floating point data, if the first matrix and the vector are not floating point data, converting the first matrix and the vector into floating point data, and then performing a matrix-multiply-vector computation on the first matrix and the vector of the floating point data type.

Referring to FIG. 7b, an implementation method of a matrix-multiply-vector computation is provided, which includes:

S401, converting, by the data type conversion circuit of the main processing circuit, data of each row in the matrix S into fixed point data; distributing, by the control circuit of the main processing circuit, the fixed point data to one of the K basic processing circuits; and storing, by the basic processing circuits, the received data in the on-chip caches and/or the registers of the basic processing circuits.

In an alternative example, M is the count of rows of the matrix S. If M<=K, the control circuit of the main processing circuit distributes a row of of the matrix S to the K basic processing circuits respectively.

As an alternative example, M is the count of rows of the matrix S. If M>K, the control circuit of the main processing circuit distributes data of one or a plurality of rows of the matrix S to each of the basic processing circuits respectively.

A set of rows of the matrix S that are distributed to an $i^{th}$ basic processing circuit is referred to as Ai, which has Mi rows in total. FIG. 3c shows a computation to be performed by the $i^{th}$ basic processing circuit.

As an alternative example, for each basic processing circuit, such as the $i^{th}$ basic processing circuit, the received data such as a matrix Ai which is transferred by distributing may be stored in the register and/or on-chip cache. Technical effects of the example include that data that is transferred later by distributing may be reduced, the computational efficiency may be improved, and the power consumption may be reduced.

The method includes: S402, converting, by the data type conversion circuit of the main processing circuit, the vector P into fixed point data, and broadcasting, by the control circuit of the main processing circuit, each part of the fixed point vector P to the K basic processing circuits.

As an alternative example, the control circuit of the main processing circuit may broadcast each part of the vector P for only once to the register or on-chip cache of each basic processing circuit. The $i^{th}$ basic processing circuit fully reuses data of the vector P which is obtained at this time to complete an inner product computation corresponding to each row of the matrix Ai. Technical effects of the example include that the data of the vector P which are repeatedly transferred from the main processing circuit to the basic processing circuits may be reduced, the execution efficiency may be improved, and the power consumption for transfer may be reduced.

As an alternative example, the control circuit of the main processing circuit sequentially broadcasts each part of the vector P to the register or on-chip cache of each basic processing circuit. The $i^{th}$ basic processing circuit does not reuse data of the vector P which is obtained at each time, and completes an inner product computation corresponding to each row of the matrix Ai at different times. Technical effects of the example include that the data of the vector P which is transferred at a single time in the basic processing circuits may be reduced, the capacity of the cache and/or the register of the basic processing circuits may be reduced, the execution efficiency may be improved, the power consumption of transferring may be reduced, and the costs may be reduced.

As an alternative example, the control circuit of the main processing circuit may sequentially broadcast each part of the vector P to the register or on-chip cache of each basic processing circuit. The $i^{th}$ basic processing circuit partly reuses data of the vector P which is obtained at each time to complete an inner product computation corresponding to each row of the matrix Ai. Technical effects of the example include that the data transferred from the main processing circuit to the basic processing circuits may be reduced, the data that is transferred within the basic processing circuits may be reduced, the execution efficiency may be improved, and the power consumption of transferring may be reduced.

The method includes: S403, computing, by the inner product computing unit circuits of the K basic processing circuits, inner products of the matrix S and the vector P, for instance, computing, by the $i^{th}$ basic processing circuit, an inner product of the data of matrix Ai and the data of the vector P; and S404, accumulating, by the accumulator circuits of the K basic processing circuits, results of the inner product computations to obtain accumulation results, and transferring the accumulation results of the fixed point type to the main processing circuit.

As an alternative example, a partial sum obtained from the inner product computation performed each time by a basic processing circuit may be transferred to the main processing circuit for accumulating (the partial sum refers to part of the accumulation result, for instance, if the accumulation result is F1*G1+F2*G2+F3*G3+F4*G4+F5*G5, the partial sum may be the value of F1*G1+F2*G2+F3*G3). Technical effects of the example include that computations performed within the basic processing circuit may be reduced, and the computational efficiency of the basic processing circuit may be improved.

In an alternative example, a partial sum obtained from the inner product computation performed each time by a basic processing circuits may be stored in the on-chip caching circuit and/or the register of the basic processing circuit, and transferred to the main processing circuit after the accumulation ends. Technical effects of the example include that data which are transferred between the basic processing circuits and the main processing circuit may be reduced, the computational efficiency may be improved, and the power consumption of data transfer may be reduced.

As an alternative example, a partial sum obtained from the inner product computation performed each time by a basic processing circuits may also, in some cases, be stored in the on-chip caching circuit and/or the register of the basic processing circuit for accumulating, and in some cases, be transferred to the main processing circuit for accumulating, then be transferred to the main processing circuit after the accumulation ends. Technical effects of the example include that data which are transferred between the basic processing circuit and the main processing circuits may be reduced, the computational efficiency may be improved, the power consumption of data transfer may be reduced, computations performed within the basic processing circuit may be reduced, and the computational efficiency of the basic processing circuit may be improved.

As shown in FIG. 1f, the present disclosure provides an integrated circuit chip device configured to perform neural network forward computations. The neural network has n layers. The integrated circuit chip device includes a main processing circuit and a plurality of basic processing circuits. The main processing circuit includes a data type conversion circuit configured to convert data between a floating point data type and a fixed point data type.

The plurality of basic processing circuits are arranged as an array. Each basic processing circuit is connected to an adjacent basic processing circuit. The main processing circuit is connected to n basic processing circuits in a first row, n basic processing circuits in an $m^{th}$ row, and m basic processing circuits in a first column.

The main processing circuit is configured to receive a first operation instruction, parse the first operation instruction to obtain a first computation instruction included in an $i^{th}$ layer of the forward computations of the first operation instruction and corresponding input data and weight data of the first operation instruction. i is an integer greater than or equal to 1 and less than or equal to n. For instance, if i is greater than or equal to 2, the input data is output data of an i-$1^{st}$ layer.

The main processing circuit is configured to determine a first complexity of the first computation instruction according to the input data, the weight data, and the first computation instruction, determine a first data type corresponding to the first computation instruction according to the first complexity, and determine whether to turn on the data type conversion circuit according to the first complexity. The first data type is the floating point type or the fixed point type.

The main processing circuit is configured to determine the input data of the first data type and the weight data of the first data type as a broadcasting data block and a distribution data block according to a type of the first computation instruction, partition the distribution data block to obtain a plurality of basic data blocks, distribute the plurality of basic data blocks to the basic processing circuits connected to the main processing circuit, and broadcast the broadcasting data block to the basic processing circuits connected to the main processing circuit.

The basic processing circuits are configured to perform computations of the neural network in parallel according to the broadcasting data block of the first data type and the basic data blocks of the first data type to obtain computation results, and transfer the computation results to the main processing circuit through the basic processing circuits connected to the main processing circuit.

The main processing circuit is configured to process the computation results to obtain an instruction result of the first computation instruction so as to complete computations of the first computation instruction of the $i^{th}$ layer.

FIG. 2f shows a forward computation of a neural network provided by an example of the present disclosure. Each layer may use input data and a weight of the present layer to obtain corresponding output data by performing computations according to a computation rule designated by a type of the layer.

The forward computation (also referred to as inference) of a neural network is a process of obtaining output data by processing input data of each layer and performing computations layer by layer, which has the following characteristics:

input of a layer:
input of a layer may be input data of a neural network;
input of a layer may be output data of another layer; and
input of a layer may be output of the present layer at a last time (corresponding to a case of a recurrent neural network).

A layer may obtain input from a plurality of above-mentioned input sources simultaneously.

output of a layer:
output of a layer may serve as an output result of a neural network;
output of a layer may be input of another layer; and
output of a layer may be input of the present layer at a next time (corresponding to a case of a recurrent neural network).

A layer may output a result to a plurality of the output directions above.

Specifically, a type of a computation of a layer in the neural network may include but is not limited to:

a convolution layer (for performing a convolution computation);

a fully connected layer (for performing a fully connected computation);

a normalization layer: including a LRN (Local Response Normalization) layer, a BN (Batch Normalization) layer, and other types;

a pooling layer; and an activation layer, including but not limited to a Sigmoid layer, a ReLU layer, a PReLu layer, a LeakyReLu layer, and a Tan h layer.

A backward computation of a neural network layer includes computations of two parts. A first part is computing a gradient (a weight used in a weight updating step to update a weight of a current layer) of a weight by using a output data gradient that may be sparse and input data that may be sparse. A second part is computing an input data gradient (used as output data of a next layer in the backward computation so that the backward computation can be performed) by using an output data gradient that may be sparse and a weight that may be sparse.

The backward computation may follow an order that is opposite to an order of a forward computation to transfer a gradient reversely from a last layer.

In an alternative example, an output data gradient obtained from the backward computation of a layer may be from:

a gradient returned by a last lost function (or cost function) of the neural network;

an input data gradient of another layer;

an input data gradient of the present layer at a last time (corresponding to a case of a recurrent neural network).

A layer may obtain an output data gradient from a plurality of above-mentioned sources simultaneously.

After the backward computation of the neural network is completed, a gradient of a weight of each layer is obtained. In this step, a first input cache and a second input cache are configured to store a weight and a gradient of the weight of a layer, then use a weight gradient in a computing unit to update the weight.

The above-mentioned computation is a computation of a neural network layer. For a multi-layer neural network, an implementation of the computation may be that, in a forward computation, after the computation of a previous layer of the artificial neural network is completed, a computation instruction of a next layer is performed by using output data obtained by a computing unit as input data of the next layer to perform a computation (or perform some operations on the output data then use the output data as input data of the next layer). At the same time, a weight is replaced with a weight of the next layer. In a backward computation, after the backward computation of a previous layer of the artificial neural network is completed, a computation instruction of a next layer is performed by using an input data gradient obtained by a computing unit as an output data gradient of the next layer to perform a computation (or perform some operations on the input data gradient then use the input data gradient as output data gradient of the next layer). At the same time, a weight is replaced with a weight of the next layer (as shown in the accompanied drawing, the dashed line arrow indicates the backward computation, the continuous line arrow indicates the forward computation. The marks below each figure indicate the meaning of the figure).

The present disclosure provides a method of fixed point data conversion.

The method of fixed point data conversion refers to converting a data representation of a data block in a network into a data representation of which the decimal point has a fixed position (a manner of placing 0/1 bit of data that is mapped to circuit device).

As an alternative example, a plurality of groups of data constitute a plurality of data blocks. The plurality of data blocks may be converted into a fixed point representation as whole according to the same fixed point representation method.

FIG. 1e shows a method of storing data which has a fixed point data structure with fewer digits according to an example of the present disclosure. 1 bit is for representing a symbol, M bits for representing an integer part, and N bits for representing a decimal part. Compared with a 32-bit floating point number representation, the present disclosure uses a fixed point data representation with fewer digits. The data representation above has fewer bits. Additionally, for data of the same layer and the same type in a neural network, such as all weight data of a first convolution layer, a flag bit (point location) is set in the data representation to mark the position of the decimal point. In this way, the precision of the data representation and the representable data range may be adjusted according to the distribution of data.

A floating point number may be represented in 32 bits. The present disclosure uses the fixed point data representation. In this way, bits of a numerical value may be reduced, and data transfer as well as computations may be reduced.

Input data is shown in FIG. 3a (N samples, each sample has C channels, and a feature map of each channel has a height of H and a width of W). A weight, which is a convolution kernel, is shown in FIG. 3b (with M convolution kernels. Each convolution kernel has C channels with a height being KH and a width being KW). For the N samples of the input data, rules for convolution computations are the same. Below is an explanation of a process of performing a convolution computation on a sample. Each of the M convolution kernels is subject to the same computation. A plane feature map can be obtained from the computation of each convolution kernel. M plane feature maps can be obtained from the computations of M plane feature maps (for a sample, output of convolution is M feature maps). For a convolution kernel, inner product computations are to be performed on each plane of a sample. Then the convolution kernel slides in a direction of H and a direction of W. For instance, FIG. 3c shows an inner product computation of a convolution kernel at a position at lower right corner of a sample of input data. FIG. 3*d* shows the convolution kernel slides leftwards for one grid. FIG. 3*e* shows the convolution kernel slides upwards for one grid.

If a first computation is a convolution computation, the input data may be convolution input data, and the weight data may be a convolution kernel.

The first complexity is computed as: the first complexity=$\alpha*C*kH*kW*M*N*W*C*H$.

$\alpha$ is a convolution coefficient greater than 1. C, kH, kW, M are values of four dimensions of the convolution kernel. N, W, C, H are values of four dimensions of the convolution input data.

If the first complexity is greater than a preset threshold, it needs to be determined whether the convolution input data and the convolution kernel are floating point data. If the convolution input data and the convolution kernel are not floating point data, the convolution input data and the convolution kernel are converted into floating point data, and then the convolution input data and the convolution kernel are subject to a convolution computation of the floating point data type.

Specifically, the convolution may be processed by using the chip structure shown in FIG. 1*f* or FIG. 3*d*. When the first complexity is greater than the preset threshold, the data type conversion circuit of the main processing circuit (or may be referred to as main unit) may convert data in some or all convolution kernels of the weight to fixed point data, the control circuit of the main processing circuit may transfer data of some or all convolution kernels of the weight to basic processing circuits (or may be referred to as basic units) that are directly connected to the main processing circuit via horizontal data input interfaces (for instance, gray vertical data pathways at the top of FIG. 1*f*).

In an alternative example, each time, the control circuit of the main processing circuit transfers a number or some numbers of data in a convolution kernel of the weight to a basic processing circuit. For instance, for a basic processing circuit, a $1^{st}$ number in a $3^{rd}$ row is transferred at a $1^{st}$ time, a $2^{nd}$ number in the $3^{rd}$ row is transferred at a $2^{nd}$ time, a $3^{rd}$ number in the $3^{rd}$ row is transferred at a $3^{rd}$ time, . . . , or first two numbers in the $3^{rd}$ row are transferred at a $1^{st}$ time, a $3^{rd}$ number and a $4^{th}$ number in the $3^{rd}$ row are transferred at a $2^{nd}$ time, a $5^{th}$ number and a $6^{th}$ number in the $3^{rd}$ row are transferred at a $3^{rd}$ time . . . .

Another case in an alternative example may be that, each time, the control circuit of the main processing circuit transfers a number or some numbers of data of some convolution kernels of the weight to a basic processing circuit. For instance, for a basic processing circuit, $1^{st}$ numbers in a $3^{rd}$, $4^{th}$, and $5^{th}$ rows are transferred at a $1^{st}$ time, $2^{nd}$ numbers in the $3^{rd}$, $4^{th}$, and $5^{th}$ rows are transferred at a $2^{nd}$ time, $3^{rd}$ numbers in the $3^{rd}$, $4^{th}$, and $5^{th}$ rows are transferred at a $3^{rd}$ time, . . . , or first two numbers in the $3^{rd}$, $4^{th}$, and $5^{th}$ rows are transferred at a $1^{st}$ time, $3^{rd}$ numbers and $4^{th}$ numbers in the $3^{rd}$, $4^{th}$, and $5^{th}$ rows are transferred at a $2^{nd}$ time, $5^{th}$ numbers and $6^{th}$ numbers in the $3^{rd}$, $4^{th}$, and $5^{th}$ rows are transferred at a $3^{rd}$ time . . . .

The control circuit of the main processing circuit classifies input data according to positions of convolution, and transfers data of some or all positions of convolution in the input data to the basic processing circuits that are directly connected to the main processing circuit via the vertical data input interfaces (for instance, the gray horizontal data pathways on the left of the basic processing circuit array shown in FIG. 1*b*).

In an alternative example, each time, the control circuit of the main processing circuit transfers a number or some numbers of data of a position of convolution in the input data to a basic processing circuit. For instance, for a basic processing circuit, a $1^{st}$ number in a $3^{rd}$ column is transferred at a $1^{st}$ time, a $2^{nd}$ number in the $3^{rd}$ column is transferred at a $2^{nd}$ time, a $3^{rd}$ number in the $3^{rd}$ column is transferred at a $3^{rd}$ time, . . . , or first two numbers in the $3^{rd}$ column are transferred at a $1^{st}$ time, a $3^{rd}$ number and a $4^{th}$ number in the $3^{rd}$ column are transferred at a $2^{nd}$ time, a $5^{th}$ number and a $6^{th}$ number in the $3^{rd}$ column are transferred at a $3^{rd}$ time . . . .

Another case in an alternative example may be that, each time, the control circuit of the main processing circuit transfers a number or some numbers of data of some positions of convolution in the input data to a basic processing circuit. For instance, for a basic processing circuit, $1^{st}$ numbers in a $3^{rd}$, $4^{th}$, and $5^{th}$ columns are transferred at a $1^{st}$ time, $2^{nd}$ numbers in the $3^{rd}$, $4^{th}$, and $5^{th}$ columns are transferred at a $2^{nd}$ time, $3^{rd}$ numbers in the $3^{rd}$, $4^{th}$, and $5^{th}$ columns are transferred at a $3^{rd}$ time, . . . , or first two numbers in the $3^{rd}$, $4^{th}$, and $5^{th}$ columns are transferred at a $1^{st}$ time, $3^{rd}$ numbers and $4^{th}$ numbers in the $3^{rd}$, $4^{th}$, and $5^{th}$ columns are transferred at a $2^{nd}$ time, $5^{th}$ numbers and $6^{th}$ numbers in the $3^{rd}$, $4^{th}$, and $5^{th}$ columns are transferred at a $3^{rd}$ time . . . .

After the basic processing circuit receives the data of the weight, the basic processing circuit transfers the data to a subsequent basic processing circuit that is connected to the basic processing circuit via a horizontal data output interface of the basic processing circuit (for instance, horizontal data pathways filled in white at the center of the basic processing circuit array shown in FIG. 1*b*). After the basic processing circuit receives the input data, the basic processing circuit transfers the data to a subsequent basic processing circuit that is connected to the basic processing circuit via a vertical data output interface of the basic processing circuit (for instance, vertical data pathways filled in white at the center of the basic processing circuit array shown in FIG. 1*b*).

Each basic processing circuit performs computations on received data.

In an alternative example, each time, the basic processing circuit performs multiplication of one group or a plurality of groups of two sets of data, then accumulates results in the register and/or on-chip cache.

In an alternative example, each time, the basic processing circuit computes an inner product of one group or a plurality of groups of two vectors, then accumulates results in the register and/or on-chip cache.

After the basic processing circuit obtains a result by computing, the basic processing circuit outputs the result through the data output interface.

In an alternative example, the computation result may be a final result or an intermediate result of an inner product computation.

Specifically, if the basic processing circuit has an output interface that is directly connected to the main processing circuit, the basic processing circuit outputs the result via the interface. If the basic processing circuit does not have such output interface, the basic processing circuit outputs the result towards a basic processing circuit that can output to the main processing circuit directly (for instance, in FIG. 1*b*, basic processing circuits at a bottom row can transfer results to the main processing circuit directly, in this case, other basic processing circuits may transfer results downwards via vertical output interfaces).

After the basic processing circuit receives a computation result from another basic processing circuit, the basic processing circuit transfers the data to yet another basic processing circuit that is connected to the basic processing circuit or to the main processing circuit.

The basic processing circuit outputs a result towards the main processing circuit (for instance, basic processing circuits at a bottom row can transfer results to the main processing circuit directly, and other basic processing circuits may transfer results downwards via vertical output interfaces).

The main processing circuit receives inner product computation results transferred by each basic processing circuit to obtain an output result.

Referring to FIG. 2f, which shows a matrix-multiply-matrix computation. If the first computation is a matrix-multiply-matrix computation, the input data is a first matrix in the matrix-multiply-matrix computation, and the weight data is a second matrix in the matrix-multiply-matrix computation.

The first complexity is computed as: the first complexity=$\beta*F*G*E*F$. $\beta$ is a matrix coefficient greater than or equal to 1. F and G are row and column values of the first matrix. E and F are row and column values of the second matrix.

If the first complexity is greater than the preset threshold, it needs to be determined whether the first matrix and the second matrix are floating point data. If the first matrix and the second matrix are not floating point data, the first matrix and the second matrix are converted into floating point data. Then the first matrix and the second matrix are subject to a matrix-multiply-matrix computations of the floating point type.

FIG. 7a shows a method of using the device of FIG. 1b to perform a matrix-multiply-matrix computation.

Below is a description of performing multiplication of a matrix S with a size of M rows and L columns and a matrix P with a size of L rows and N columns (each row of the matrix S is as long as each column of the matrix P, which is as shown in FIG. 3d). The neural network computing device has K basic processing circuits.

A method of the multiplication includes: S401b, if the first complexity is greater than the preset threshold, converting, by the main processing circuit, the matrix S and the matrix P into fixed point data; distributing, by the control circuit of the main processing circuit, data of each row in the matrix S to one of the K basic processing circuits; storing, by the basic processing circuit, the received data in the on-chip cache and/or the register; and specifically, the data may be transferred to basic processing circuits that are directly connected to the main processing circuit.

As an alternative example, M is the count of rows of the matrix S, if M<=K, the control circuit of the main processing circuit distributes a row of the matrix S to M basic processing circuits respectively.

As an alternative example, M is the count of rows of the matrix S, if M>K, the control circuit of the main processing circuit distributes data of one or a plurality of rows of the matrix S to each basic processing circuit respectively.

In a case where Mi rows of the matrix S are distributed to an $i^{th}$ basic processing circuit, a set of the Mi rows can be referred to as Ai. FIG. 3e shows a computation to be performed by the $i^{th}$ basic processing circuit.

As an alternative example, in each of the basic processing circuits, for instance, in the $i^{th}$ basic processing circuit:
the matrix Ai distributed by the main processing circuit is received and stored in the register and/or on-chip cache of the $i^{th}$ basic processing circuit. Technical effects of the example include that data that is transferred later may be reduced, the computational efficiency may be improved, and the power consumption may be reduced.

The method includes: S402b, broadcasting, by the control circuit of the main processing circuit, each part of the matrix P to each basic processing circuit.

As an alternative example, each part of the matrix P is broadcast for only once to the register or on-chip cache of each basic processing circuit. The $i^{th}$ basic processing circuit fully reuses data of the matrix P which is obtained at this time to complete an inner product computation corresponding to each row of the matrix Ai. The reusing mentioned in the example may be repeatedly using data by the basic processing circuits during computation. For instance, reusing data of the matrix P may be using the data of the matrix P for a plurality of times.

As an alternative example, the control circuit of the main processing circuit sequentially broadcasts each part of the matrix P to the register or on-chip cache of each basic processing circuit. The $i^{th}$ basic processing circuit does not reuse the data of the matrix P which is obtained at each time, and completes an inner product computation corresponding to each row of the matrix Ai at different times.

As an alternative example, the control circuit of the main processing circuit sequentially broadcasts each part of the matrix P to the register or on-chip cache of each basic processing circuit. The $i^{th}$ basic processing circuit partially reuses the data of the matrix P which is obtained at each time, and complete an inner product computation corresponding to each row of the matrix Ai.

In an alternative example, each of the basic processing circuits, such as the $i^{th}$ basic processing circuit, computes an inner product of the data of the matrix Ai and the data of the matrix P.

The method of the multiplication includes: S403b, accumulating, by the accumulator circuit of each of the basic processing circuits, results of inner product computations, and transferring an accumulation result to the main processing circuit.

As an alternative example, the basic processing circuits transfer partial sums obtained from each inner product computation to the main processing circuit for accumulating.

In an alternative example, a partial sum obtained from the inner product computation performed each time by a basic processing circuits may be stored in the on-chip caching circuit and/or the register of the basic processing circuit, and transferred to the main processing circuit after the accumulation ends.

As an alternative example, a partial sum obtained from the inner product computation performed each time by a basic processing circuits may also, in some cases, be stored in the on-chip caching circuit and/or the register of the basic processing circuits for accumulating, and in some cases, be transferred to the main processing circuit for accumulating, then be transferred to the main processing circuit after the accumulation ends.

FIG. 2c is a schematic diagram of a matrix-multiply-vector computation. The first computation may be: a matrix-multiply-vector computation. The input data may be a first matrix in the matrix-multiply-vector computation, and the weight data may be a vector in the matrix-multiply-vector computation.

The first complexity=$\beta*F*G*F$. $\beta$ is a matrix coefficient greater than or equal to 1, F and G are row and column values of the first matrix, and F is a column value of the vector.

If the first complexity is greater than the preset threshold, it needs to be determined whether the first matrix and the vector are floating point data. If the first matrix and the vector are not floating point data, the first matrix and the vector are converted into floating point data. Then the first matrix and the vector are subject to a matrix-multiply-vector computation of the floating point data type.

Referring to FIG. 7b, an implementation method of a matrix-multiply-vector computation is provided, which includes:

S401, converting, by the data type conversion circuit of the main processing circuit, data of each row in the matrix S into fixed point data; distributing, by the control circuit of the main processing circuit, the fixed point data to one of the K basic processing circuits; and storing, by the basic processing circuits, the received data in the on-chip caches and/or the registers of the basic processing circuits.

In an alternative example, M is the count of rows of the matrix S. If M<=K, the control circuit of the main processing circuit distributes a row of the matrix S to the K basic processing circuits respectively.

As an alternative example, M is the count of rows of the matrix S, if M>K, the control circuit of the main processing circuit distributes data of one or a plurality of rows of the matrix S to the basic processing circuits respectively.

A set of rows of the matrix S that are distributed to an $i^{th}$ basic processing circuit is referred to as Ai, which has Mi rows in total. FIG. 3c shows a computation to be performed by the $i^{th}$ basic processing circuit.

As an alternative example, for each basic processing circuit, such as the $i^{th}$ basic processing circuit, the received data such as a matrix Ai which is transferred by distributing may be stored in the register and/or on-chip cache. Technical effects of the example include that data that is transferred later by distributing may be reduced, the computational efficiency may be improved, and the power consumption may be reduced.

The method includes: S402, converting, by the data type conversion circuit of the main processing circuit, the vector P into fixed point data, and broadcasting, by the control circuit of the main processing circuit, each part of the vector P in fixed point type to the K basic processing circuits.

As an alternative example, the control circuit of the main processing circuit may broadcast each part of the vector P for only once to the register or on-chip cache of each basic processing circuit. The $i^{th}$ basic processing circuit fully reuses data of the vector P which is obtained at this time to complete an inner product computation corresponding to each row of the matrix Ai. Technical effects of the example include that the data of the vector P which are repeatedly transferred from the main processing circuit to the basic processing circuits may be reduced, the execution efficiency may be improved, and the power consumption for transfer may be reduced.

As an alternative example, the control circuit of the main processing circuit sequentially broadcasts each part of the vector P to the register or on-chip cache of each basic processing circuit. The $i^{th}$ basic processing circuit does not reuse data of the vector P which is obtained at each time, and completes an inner product computation corresponding to each row of the matrix Ai at different times. Technical effects of the example include that the data of the vector P which is transferred at a single time in the basic processing circuits may be reduced, the capacity of the cache and/or the register of the basic processing circuits may be reduced, the execution efficiency may be improved, the power consumption of transferring may be reduced, and the costs may be reduced.

As an alternative example, the control circuit of the main processing circuit sequentially broadcasts each part of the vector P to the register or on-chip cache of each basic processing circuit. The $i^{th}$ basic processing circuit partly reuses data of the vector P which is obtained at each time and completes an inner product computation corresponding to each row of the matrix Ai. Technical effects of the example include that the data transferred from the main processing circuit to the basic processing circuits may be reduced, the data that is transferred within the basic processing circuits may be reduced, the execution efficiency may be improved, and the power consumption of transferring may be reduced.

The method includes: S403, computing, by the inner product computing unit circuits of the K basic processing circuits, inner products of the matrix S and the vector P, for instance, computing, by the $i^{th}$ basic processing circuit, an inner product of the data of matrix Ai and the data of the vector P; and S404, accumulating, by the accumulator circuits of the K basic processing circuits, results of inner product computations to obtain accumulation results, and transferring the accumulation results of a fixed point type to the main processing circuit.

As an alternative example, a partial sum obtained from the inner product computation performed each time by a basic processing circuits may be transferred to the main processing circuit for accumulating (the partial sum refers to part of the accumulation result, for instance, if the accumulation result is F1*G1+F2*G2+F3*G3+F4*G4+F5*G5, the partial sum is the value of F1*G1+F2*G2+F3*G3). Technical effects of the example include that computations performed within the basic processing circuits may be reduced, and the computational efficiency of the basic processing circuits may be improved.

In an alternative example, a partial sum obtained from the inner product computation performed each time by a basic processing circuit may be stored in the on-chip caching circuit and/or the register of the basic processing circuits, and transferred to the main processing circuit after the accumulation ends. Technical effects of the example include that data which are transferred between the basic processing circuit and the main processing circuit may be reduced, the computational efficiency may be improved, and the power consumption of data transfer may be reduced.

As an alternative example, a partial sum obtained from the inner product computation performed each time by a basic processing circuits may also, in some cases, be stored in the on-chip caching circuit and/or the register of the basic processing circuit for accumulating, and in some cases, be transferred to the main processing circuit for accumulating, then be transferred to the main processing circuit after the accumulation ends. Technical effects of the example include that data which are transferred between the basic processing circuit and the main processing circuits may be reduced, the computational efficiency may be improved, the power consumption of data transfer may be reduced, computations performed within the basic processing circuit may be reduced, and the computational efficiency of the basic processing circuit may be improved.

The present disclosure further provides an integrated circuit chip device configured to perform a forward computation of a neural network. The neural network includes a plurality of layers. The device may include a processing circuit and an external interface.

The external interface is configured to receive a first operation instruction.

The processing circuit is configured to parse the first operation instruction to obtain a first computation and corresponding input data and weight data of the first operation instruction which are included in an $i^{th}$ layer of a forward computation of the first operation instruction, where i may be 1. If 1 is 1, the input data is original input data. If i is greater than equal to 2, the input data may be output data of a previous layer, such as output data of i-$1^{th}$ layer.

The processing circuit is further configured to determine a first complexity of the first computation according to the input data, the weight data, and the first computation, and determine a first data type of the input data and the weight data when performing the first computation according to the first complexity. The first data type includes: a floating point type or a fixed point type.

The processing circuit is further configured to perform the first computation included in a layer of the forward computation on the input data and the weight data according to the first data type.

The present disclosure also provides a processing device which includes the above-mentioned neural network computing device, a general interconnection interface, and other processing devices (general-purpose processing devices). The neural network computing device interacts with other processing devices to perform operations specified by users. FIG. 3 is a schematic diagram of the processing device.

Other processing devices include one or more of a general-purpose/special-purpose processors such as a central processing unit (CPU), a graphics processing unit (GPU), a neural network processor, and the like. The present disclosure does not restrict a count of processors included in the other processing devices. Other processing devices may serve as interfaces that connect the neural network computing device to external data and control for data moving, and may perform the basic control such as starting and stopping the neural network computing device. Other processing devices may also cooperate with the neural network computing device to complete computation tasks.

The general interconnection interface is configured to transfer data and control instructions between the neural network computing device and other processing devices. The neural network computing device may obtain required input data from the other processing devices and write the data in an on-chip storage device of the neural network computing device. The neural network computing device may obtain control instructions from other processing devices, and write the control instructions in an on-chip control cache of the neural network computing device. The neural network computing device may further read data stored in a storage module of the neural network computing device and transfer the data to the other processing device.

Figure 4:
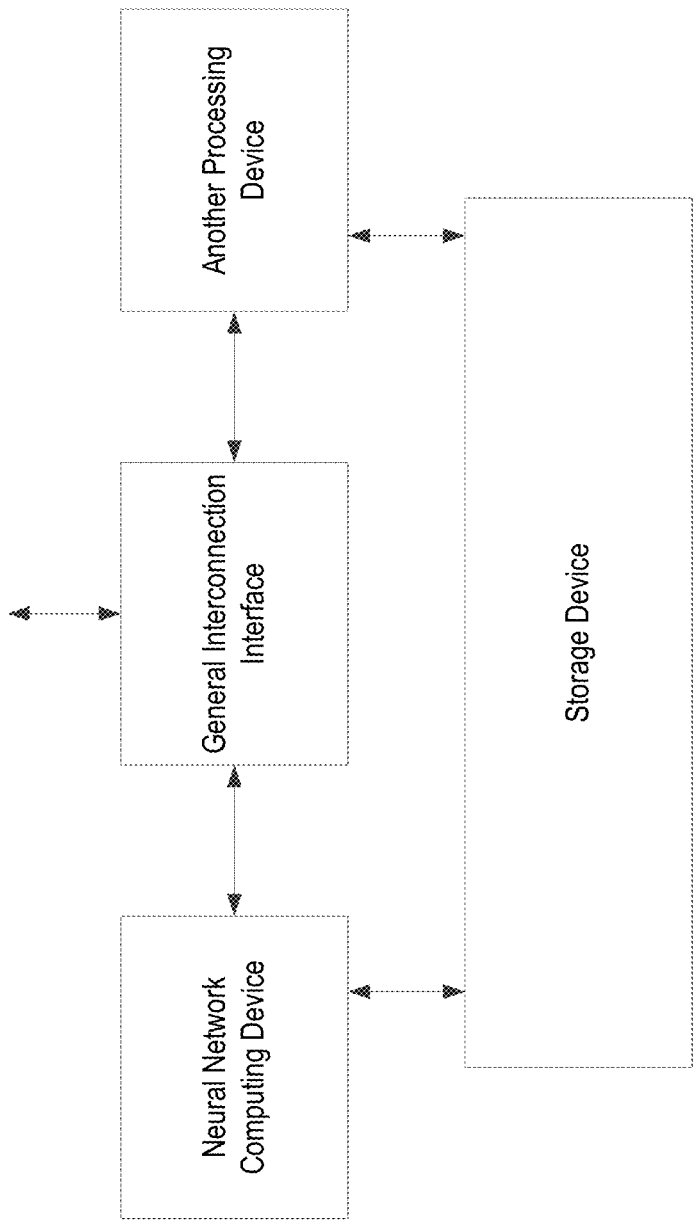
FIG. 4 is another structural diagram of a processing device according to the disclosure.
Figure 4A:
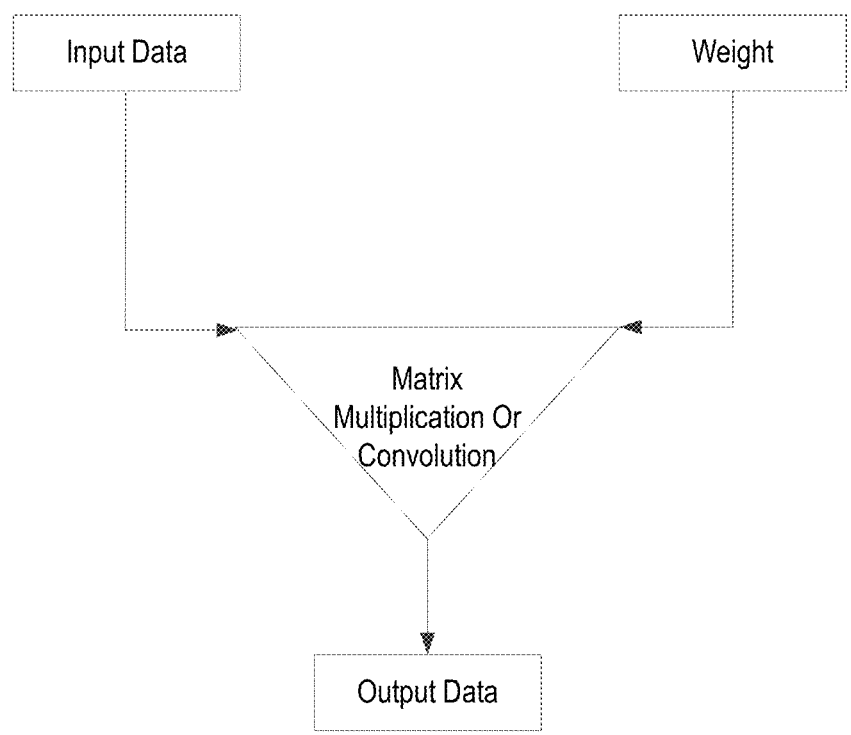
FIG. 4a is a schematic diagram of a neural network forward computation.
Figure 4B:
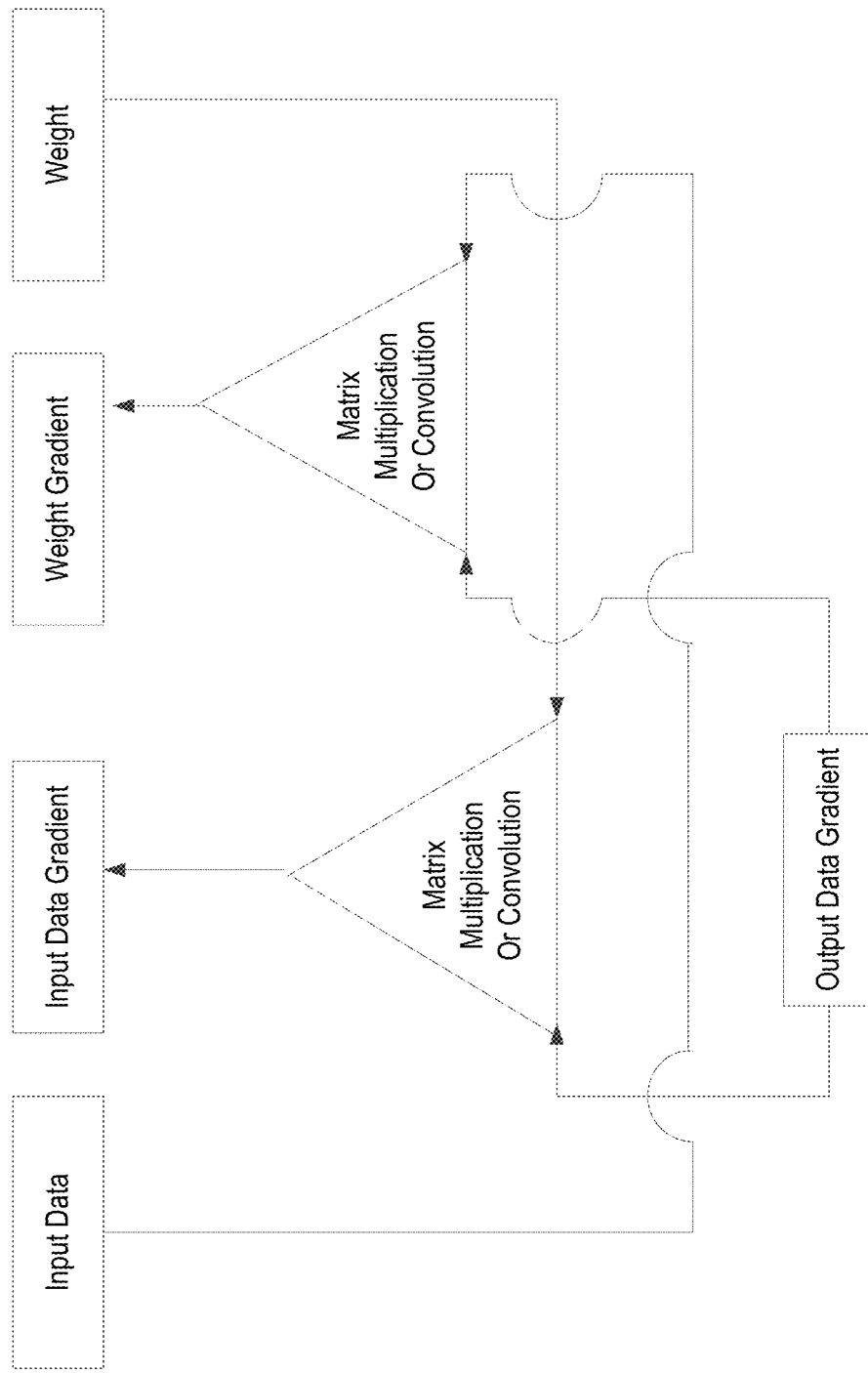
FIG. 4b is a schematic diagram of a neural network backward computation.
Figure 4C:
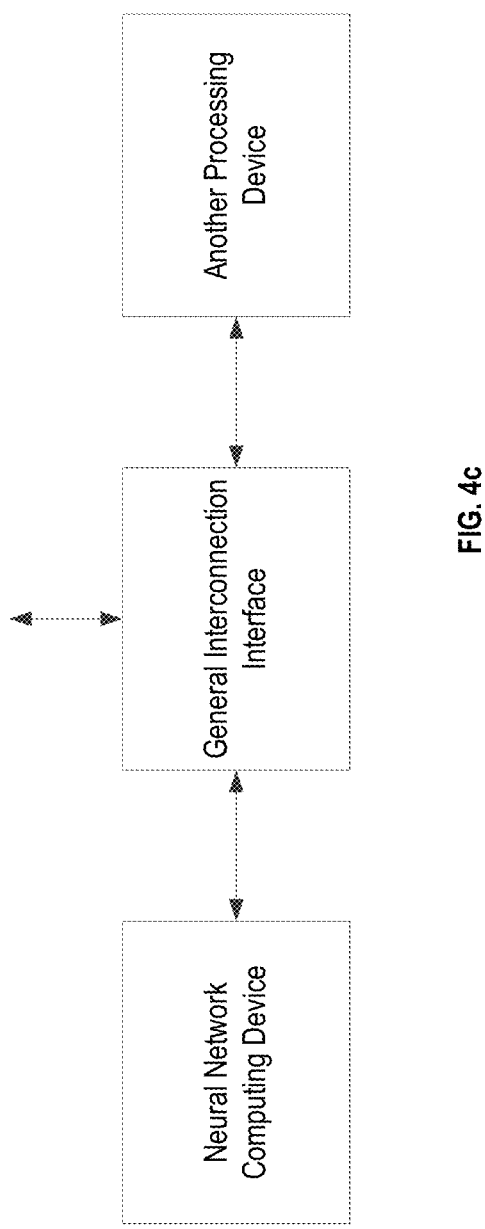
FIG. 4c is a schematic diagram of a processing device.
Figure 4D:
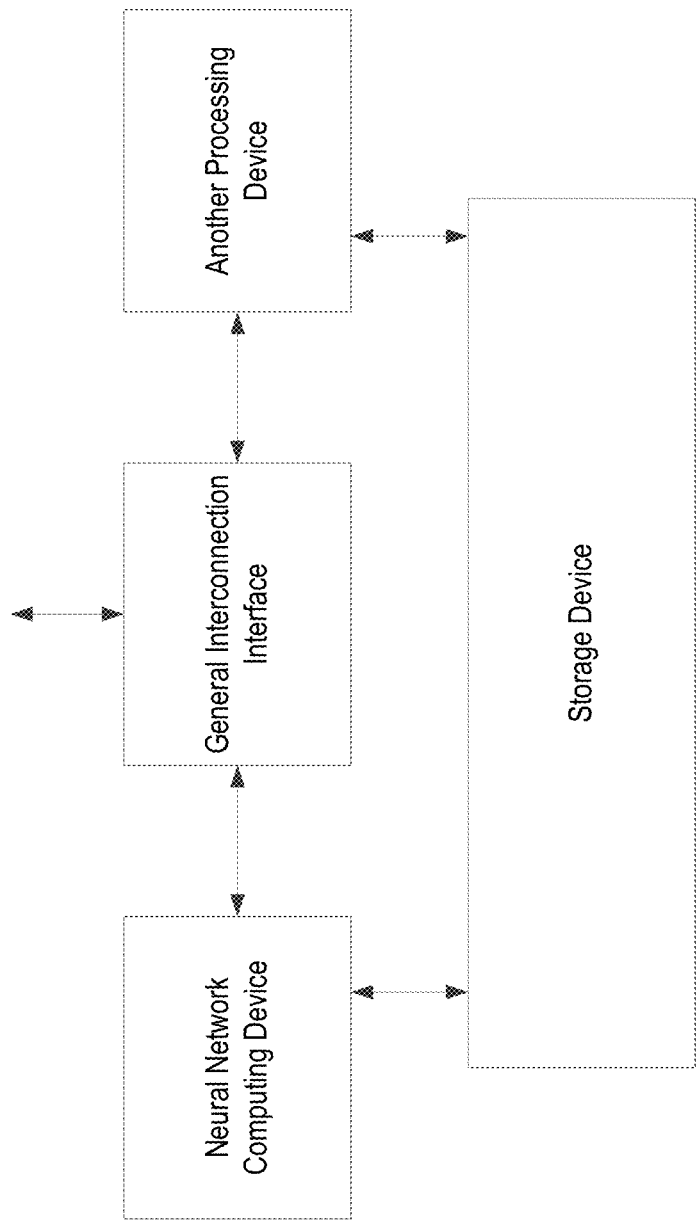
FIG. 4d is a schematic diagram of another processing device.

As shown in FIG. 4, Alternatively or additionally, the structure may further include a storage device configured to store required data of a present computing unit/computing apparatus or another computing unit, and is particularly suitable for a case where data that needs to be computed cannot be completely stored in an internal memory of the neural network computing device or another processing devices.

The processing device can be used as an SOC (System On Chip) of a device including a mobile phone, a robot, a drone, a video surveillance device, and the like, which may effectively reduce the core area of a control component, increase the processing speed, and reduce the overall power consumption. In this case, a universal interconnection interface of the combined processing device may be connected to some components of the device. The some components include webcams, monitors, mice, keyboards, network cards, and WIFI interfaces.

The present disclosure provides a neural network processor board card which can be used in various general-purpose or special-purpose computing system environments or configurations. For instance, personal computers, server computers, handheld or portable devices, tablet devices, smart home, home appliances, multiprocessor systems, microprocessor based systems, robots, programmable consumer electronics, network personal computers, small computers, large computers, distributed computing environments including any of the systems or devices above, and the like.

Figure 5A:
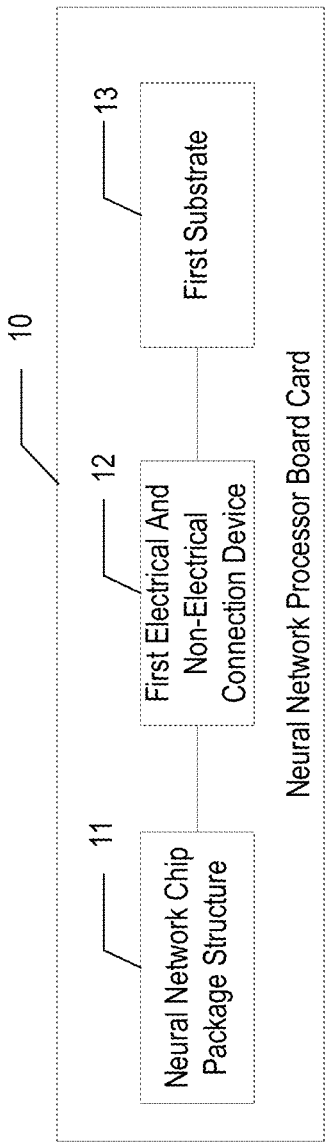
FIG. 5a is a structural diagram of a neural network processor board card according to an example of the present disclosure.
Figure 5B:
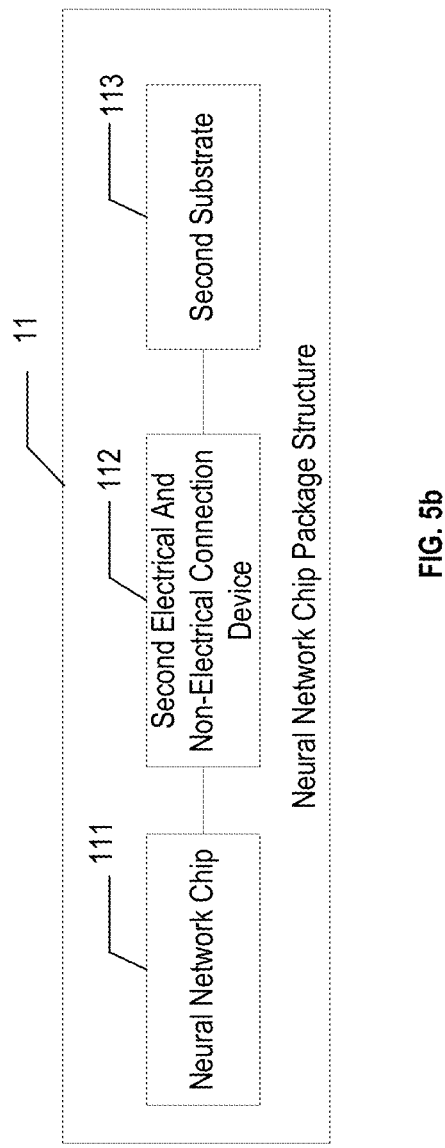
FIG. 5b is a structural diagram of a neural network chip package structure according to an example of the present disclosure.
Figure 5C:
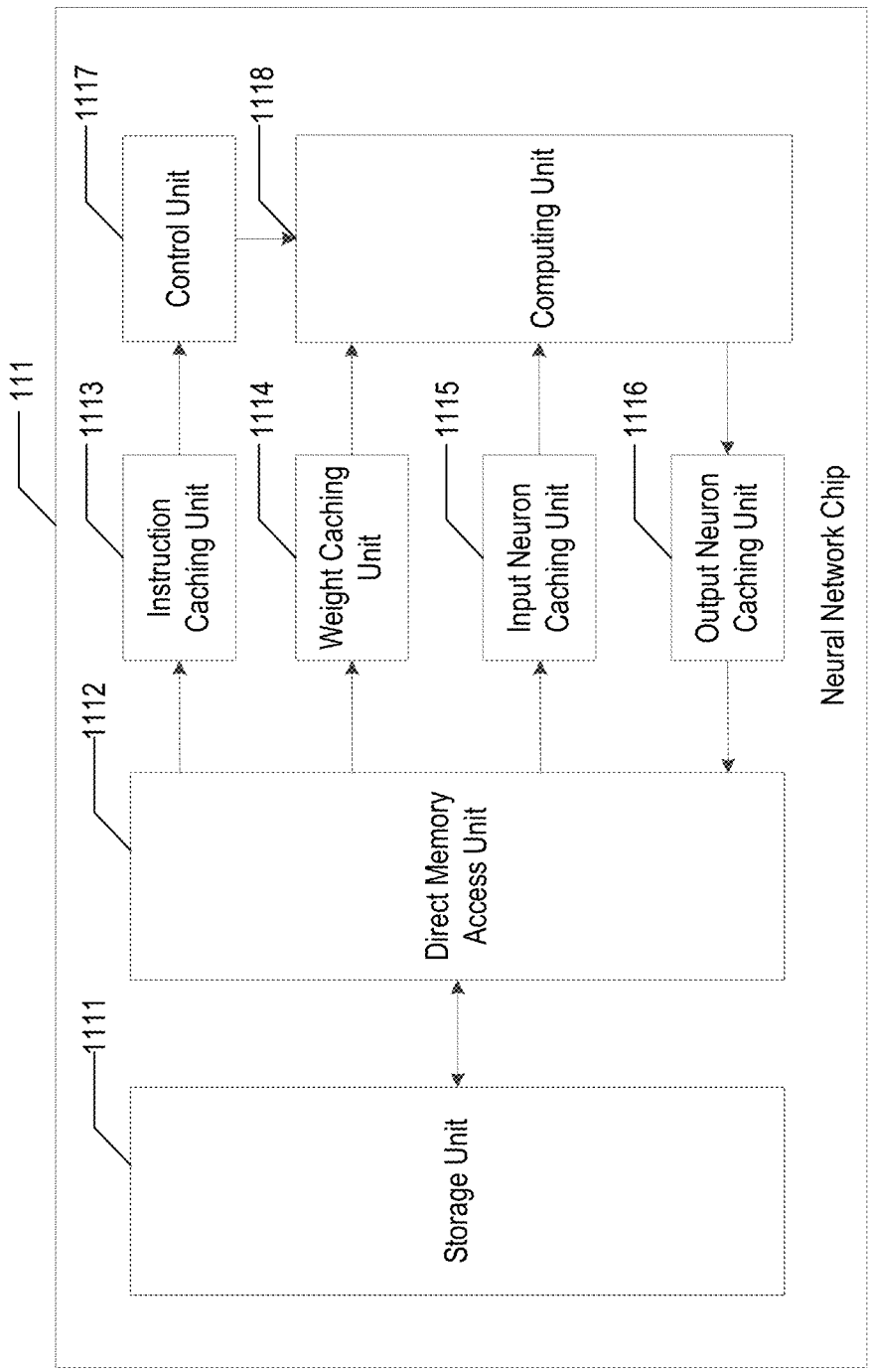
FIG. 5c is a structural diagram of a neural network chip according to an example of the present disclosure.

FIG. 5a is a structural diagram of a neural network processor board card according to an example of the present disclosure. As shown in FIG. 5c, the neural network processor board card 10 includes a neural network chip package structure 11, a first electrical and non-electrical connection device 12, and a first substrate 13.

The present disclosure does not restrict a specific structure of the neural network chip package structure 11. Optionally, as shown in FIG. 5b, the neural network chip package structure 11 includes a neural network chip 111, a second electrical and non-electrical connection device 112, and a second substrate 113.

The present disclosure does not restrict a specific form of the neural network chip 111. The neural network chip 111 may include but is not limited to a neural network wafer integrated with a neural network processor, where the wafer may be made of silicon material, germanium material, quantum material, or molecular material. The neural network wafer may be packaged according to a real situation (for example, a harsh environment) and different application requirements, so that most of the neural network wafer may be wrapped, and leads on the neural network wafer may be connected to the outside of the packaging structure through conductors such as gold wire, which can be used for circuit connection with an outer layer.

The present disclosure does not restrict a specific structure of the neural network chip 111. Alternatively or additionally, the device shown in FIG. 1a and FIG. 1b may be used as reference.

The present disclosure does not restrict types of the first substrate 13 and the second substrate 113. The first substrate and the second substrate may be a printed circuit board (PCB) or a printed wiring board (PWB), and may also be another type of circuit board. The present disclosure does not restrict the material that the PCB is made of.

The second substrate 113 of the present disclosure may be used to bear the neural network chip 111, and the chip package structure obtained by connecting the neural network chip 111 and the second substrate 113 through the second electrical and non-electrical connection device 112 is used for protecting the neural network chip 111, so that the neural network chip package structure 11 and the first substrate 13 can be further packaged.

The present disclosure does not restrict a specific manner for packaging and a corresponding structure of the manner for packaging of the second electrical and non-electrical connection device 112. An appropriate package manner can be selected and be subject to simple improvement according to a certain situation and different application requirements, such as Flip Chip Ball Grid Array Package (FCBGAP), Low-profile Quad Flat Package (LQFP), Quad Flat Package with Heat Sink (HQFP), Quad Flat Non-lead Package (QFN), or a Fine-Pitch Ball Grid Package (FBGA) and other package manners.

A flip chip may be suitable for a case where the requirement on the area after packaging is high or an inductor of a conductive wire and a transmission time of a signal are sensitive. In addition, a package manner of wire bonding may be adopted to reduce the cost and increase the flexibility of the package structure.

Ball Grid Array may provide more leads, and the average wire length of the leads is short, which can transfer signals at high speed, where the package may be replaced by Pin Grid Array (PGA), Zero Insertion Force (ZIF), Single Edge Contact Connection (SECC), Land Grid Array (LGA), and the like.

Figure 6:
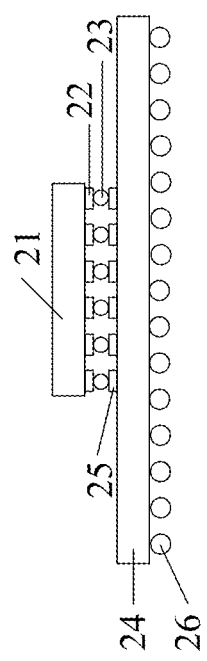
FIG. 6 is a schematic diagram of a neural network chip package structure according to an example of the present disclosure.

Optionally, the package manner of Flip Chip Ball Grid Array may be adopted to package the neural network chip 111 and the second substrate 113. Please refer to FIG. 6 for a schematic diagram of a package structure of the neural network chip. As shown in FIG. 6, the neural network chip package structure may include a neural network chip 21, a pad 22, a ball 23, a second substrate 24, a connection point 25 on the second substrate 24, and a lead 26.

The pad 22 is connected to the neural network chip 21, and the ball 23 is formed by welding between the pad 22 and the connection point 25 on the second substrate 24, in this way, the neural network chip 21 and the second substrate 24 is connected, thereby realizing the package of the neural network chip 21.

The lead 26 is used to connect an external circuit of the package structure (for instance, the first substrate 13 on the neural network processor board card 10) for transferring external data and internal data, which may facilitate data processing by the neural network chip 21 or a corresponding neural network processor of the neural network chip 21. A type and quantity of leads are not restricted in the present disclosure. Different lead types can be selected according to different packaging technologies, and leads can be arranged according to certain rules.

Optionally, the neural network chip package structure may further include an insulating filler disposed in the gap between the pad 22, the ball 23, and the connection point 25 for preventing interference between balls.

The material of the insulating filler may be silicon nitride, silicon oxide, or silicon oxynitride; and the interference may include electromagnetic interference, inductance interference, and the like.

Optionally, the neural network chip package structure may further include a heat dissipation device for dissipating heat generated during the operation of the neural network chip 21. The heat dissipation device may be a piece of metal with good thermal conductivity, a heat sink, or a radiator such as a fan.

Figure 6A:
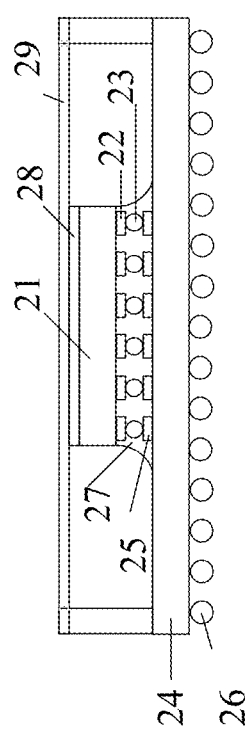
FIG. 6a is a schematic diagram of another neural network chip package structure according to an example of the present disclosure.

For instance, as shown in FIG. 6a, the neural network chip package structure 11 may include: a neural network chip 21, a pad 22, a ball 23, a second substrate 24, a connection point 25 on the second substrate 24, a lead 26, an insulating filler 27, thermal compound 28, and a fin 29 with metal housing. Among them, the thermal compound 28 and the fin 29 with metal housing are configured to dissipate the heat generated during the operation of the neural network chip 21.

Optionally, the neural network chip package structure 11 may further include a reinforcing structure, which is connected to the pad 22, and is buried in the ball 23 to improve the connection strength between the ball 23 and the pad 22.

The reinforcing structure may be a metal wire structure or a columnar structure, which is not restricted herein.

A specific form of the first electrical and non-electrical device 12 is not restricted in the present disclosure. Please refer to the description of the second electrical and non-electrical device 112. In other words, the neural network chip package structure may be packaged by welding, or by connecting the second substrate 113 and the first substrate 13 through a connecting line or by means of plugging, so that the first substrate 13 or the neural network chip package structure 11 can be replaced conveniently later.

Optionally, the first substrate 13 may include a memory unit interface for expanding storage capacity, such as a Synchronous Dynamic Random Access Memory (SDRAM), and a Double Date Rate (DDR) SDRAM, and the like. By expanding the memory, the processing capacity of the neural network processor may be improved.

The first substrate 13 may further include a Peripheral Component Interconnect-Express (PCI-E or PCIe) interface, a Small Form-factor Pluggable (SFP) interface, and an Ethernet interface, a Controller Area Network (CAN) interface, and the like, which can be used for data transfer between the package structure and external circuits. In this way, the computational speed may be improved, and the operation may be easier.

The neural network processor is packaged into a neural network chip 111, the neural network chip 111 is packaged into a chip package structure 11, and the neural network chip package structure 11 is packaged into a neural network processor board card 10. Data interaction with an external circuit (for instance, a computer motherboard) may be performed through an interface (slot or ferrule) on the board card, that is, the function of the neural network processor may be implemented by using the neural network processor board card 10 directly, which may also protect the neural network chip 111. In addition, other modules may be added to the neural network processor board card 10, which may improve the application range and computational efficiency of the neural network processor.

An example of the present disclosure provides an electronic device including the neural network processor board card 10 or the neural network chip package structure 11.

The electronic device includes a data processing device, a robot, a computer, a printer, a scanner, a tablet, a smart terminal, a mobile phone, a traffic recorder, a navigator, a sensor, a webcam, a server, a camera, a video camera, a projector, a watch, a headphone, a mobile storage, a wearable device, a vehicle, a household appliance, and/or a medical equipment.

The vehicle includes an airplane, a ship, and/or a car. The household electrical appliance includes a television, an air conditioner, a microwave oven, a refrigerator, an electric rice cooker, a humidifier, a washing machine, an electric lamp, a gas cooker, and a range hood. The medical equipment includes a nuclear magnetic resonance spectrometer, a B-ultrasonic scanner, and/or an electrocardiograph.

The examples of the present disclosure have been described in detail above. The principles and implementation manners of the present disclosure have been described with the examples. The descriptions of the examples are only used for facilitating understanding of the methods and core ideas of the present disclosure. Persons of ordinary skill in the art may change the implementation and application scope according to the ideas of the present disclosure. In summary, the content of this specification should not be construed as a limitation on the present disclosure.

The invention claimed is:

1. An integrated circuit chip device, comprising:
a main processing circuit; and
a plurality of basic processing circuits, wherein:
the main processing circuit comprises a data type conversion circuit configured to convert data between a floating point data type and a fixed point data type;
the plurality of basic processing circuits are arranged as an array having m rows and n columns, each basic processing circuit is connected to an adjacent basic processing circuit, the main processing circuit is connected to n basic processing circuits in a first row, n basic processing circuits in an $m^{th}$ row, and m basic processing circuits in a first column;
the main processing circuit is configured to:
obtain an input data block, a weight data block, and a multiplication instruction,
convert the input data block and the weight data block to an input data block of the fixed point type and a weight data block of the fixed point type, respectively, using the data type conversion circuit,
classify the input data block of the fixed point type into a distribution data block of the fixed point type according to the multiplication instruction,
classify the weight data block of the fixed point type into a broadcasting data block of the fixed point type according to the multiplication instruction,
partition the distribution data block of the fixed point type to obtain a plurality of basic data blocks of the fixed point type,
distribute the plurality of basic data blocks of the fixed point type to at least one of the plurality of basic processing circuits connected to the main processing circuit, and
broadcast the broadcasting data block of the fixed point type to the basic processing circuits connected to the main processing circuit;
the at least one of the plurality of basic processing circuits is configured to:
perform computations of a neural network in parallel according to the broadcasting data block of the fixed point type and the basic data blocks of the fixed point type to obtain computation results, and
transfer the computation results to the main processing circuit through the basic processing circuits connected to the main processing circuit; and
the main processing circuit is configured to process the computation results to obtain an instruction result of the multiplication instruction.

2. The integrated circuit chip device of claim 1, wherein:
the at least one of the plurality of basic processing circuits is configured to:
perform multiplication on the broadcasting data block of the fixed point type and the received basic data blocks of the fixed point type to obtain products of the fixed point type, and
transfer the products of the fixed point type as the computation results to the main processing circuit through the basic processing circuits that are connected to the main processing circuit; and
the main processing circuit is configured to:
convert the products of the fixed point type to products of the floating point type using the data type conversion circuit,
accumulate the products of the floating point type to obtain accumulation results, and
sort the accumulation results to obtain the instruction result.

3. The integrated circuit chip device of claim 1, wherein:
the at least one of the plurality of basic processing circuits are configured to:
perform inner product computations on the broadcasting data block of the fixed point type and the received basic data blocks of the fixed point type to obtain inner products of the fixed point type, and
transfer the inner products of the fixed point type as the computation results to the main processing circuit through the basic processing circuits that are connected to the main processing circuit; and
the main processing circuit is configured to:
convert the inner products of the fixed point type to inner products of the floating point type using the data type conversion circuit, and
sort the inner products of the floating point type to obtain the instruction result.

4. The integrated circuit chip device of claim 1, wherein the main processing circuit is configured to:
broadcast the broadcasting data block of the fixed point type as a whole to the basic processing circuits that are connected to the main processing circuit.

5. The integrated circuit chip device of claim 1, wherein the main processing circuit is configured to:
partition the broadcasting data block of the fixed point type into a plurality of partial broadcasting data blocks, and
sequentially broadcast the plurality of partial broadcasting data blocks to the basic processing circuits that are connected to the main processing circuit.

6. The integrated circuit chip device of claim 5, wherein the at least one of the plurality of basic processing circuits is configured to:
perform inner product processing on the partial broadcasting data blocks and the basic data blocks of the fixed point type to obtain results of inner product processing, and
transfer the results of inner product processing to the main processing circuit.

7. The integrated circuit chip device of claim 5, wherein the at least one of the plurality of basic processing circuits is configured to:
reuse the partial broadcasting data blocks for p times,
perform p times of inner product computations on the partial broadcasting data blocks and p basic data blocks of the fixed point type to obtain p partial processing results, and
transfer the p partial computation results to the main processing circuit, wherein p is an integer greater than or equal to 2.

8. The integrated circuit chip device of claim 1, wherein:
the main processing circuit includes a main register or a main on-chip caching circuit, and
each basic processing circuit includes a basic register or a basic on-chip caching circuit.

9. The integrated circuit chip device of claim 8, wherein the main processing circuit includes at least one of:
a vector computing unit circuit, an arithmetic and logic unit circuit, an accumulator circuit, a matrix transposition circuit, a direct memory access circuit, or a data rearrangement circuit.

10. The integrated circuit chip device of claim 1, wherein:
the input data block includes a vector or a matrix, and
the weight data block includes a vector or a matrix.

11. An integrated circuit chip device, comprising:
a main processing circuit; and
a plurality of basic processing circuits,
wherein:
the main processing circuit comprises a data type conversion circuit configured to convert data between a floating point data type and a fixed point data type;
the main processing circuit is configured to:
obtain an input data block, a weight data block, and a multiplication instruction,
convert the input data block and the weight data block to an input data block of the fixed point type and a weight data block of the fixed point type, respectively, using the data type conversion circuit,
classify the input data block of the fixed point type into a distribution data block of the fixed point type according to the multiplication instruction,
classify the weight data block of the fixed point type into a broadcasting data block of the fixed point type according to the multiplication instruction,
partition the distribution data block of the fixed point type to obtain a plurality of basic data blocks of the fixed point type,
distribute the plurality of basic data blocks of the fixed point type to at least one basic processing circuit of the plurality of basic processing circuits, and
broadcast the broadcasting data block of the fixed point type to the plurality of basic processing circuits;
the at least one basic processing circuit is configured to:
perform computations on the broadcasting data block of the fixed point type and the received basic data blocks of the fixed point type to obtain computation results, and
transfer the computation results to the main processing circuit; and
the main processing circuit is configured to process the computation results to obtain an instruction result of the multiplication instruction.

12. The integrated circuit chip device of claim 11, wherein:
the at least one basic processing circuit is configured to:
perform multiplication on the broadcasting data block of the fixed point type and the received basic data blocks of the fixed point type to obtain products of the fixed point type, and
transfer the products of the fixed point type as the computation results to the main processing circuit, and the main processing circuit is configured to:
convert the products of the fixed point type to products of the floating point type using the data type conversion circuit,
accumulate the products of the floating point type to obtain accumulation results, and
sort the accumulation results to obtain the instruction result.

13. The integrated circuit chip device of claim 11, wherein:
the at least one basic processing circuit is configured to:
perform inner product computations on the broadcasting data block of the fixed point type and the received basic data blocks of the fixed point type to obtain inner products of the fixed point type, and
transfer the inner products of the fixed point type as the computation results to the main processing circuit, and
the main processing circuit is configured to:
convert the inner products of the fixed point type to inner products of the floating point type using the data type conversion circuit, and
sort the inner products of the floating point type to obtain the instruction result.

14. The integrated circuit chip device of claim 11, further comprising:
a branch processing circuit located between the main processing circuit and at least one basic processing circuit, wherein the branch processing circuit is configured to forward data between the main processing circuit and the at least one basic processing circuit.

15. The integrated circuit chip device of claim 11, wherein the main processing circuit is configured to:
broadcast the broadcasting data block of the fixed point type as a whole to the plurality of basic processing circuits.

16. The integrated circuit chip device of claim 11, wherein the main processing circuit is configured to:
partition the broadcasting data block of the fixed point type into a plurality of partial broadcasting data blocks, and
sequentially broadcast the plurality of partial broadcasting data blocks to the plurality of basic processing circuits.

17. The integrated circuit chip device of claim 16, wherein the at least one basic processing circuits is configured to:
perform inner product processing on the partial broadcasting data blocks and the basic data blocks of the fixed point type to obtain results of inner product processing, and
transfer the results of inner product processing to the main processing circuit.

18. The integrated circuit chip device of claim 16, wherein the at least one basic processing circuit is configured to:
reuse the partial broadcasting data blocks for n times,
perform n times of inner product computations on the partial broadcasting data blocks and n basic data blocks of the fixed point type to obtain n partial processing results, and
transfer the n partial processing results to the main processing circuit, wherein n is an integer greater than or equal to 2.

19. A method for performing computations using an integrated circuit, the method comprising:
obtaining, by a main processing circuit of the integrated circuit, an input data block, a weight data block, and a multiplication instruction;
converting, using a data type conversion circuit of the main processing circuit, the input data block and the weight data block to an input data block of the fixed point type and a weight data block of the fixed point type, respectively;
classifying, by the main processing circuit, the input data block of the fixed point type into a distribution data block of the fixed point type according to the multiplication instruction;
classifying, by the main processing circuit, the weight data block of the fixed point type into a broadcasting data block of the fixed point type according to the multiplication instruction;
partitioning, by the main processing circuit, the distribution data block of the fixed point type to obtain a plurality of basic data blocks of the fixed point type;

distributing, by the main processing circuit, the plurality of basic data blocks of the fixed point type to at least one of a plurality of basic processing circuits connected to the main processing circuit;

broadcasting, by the main processing circuit, the broadcasting data block of the fixed point type to the plurality of basic processing circuits connected to the main processing circuit;

performing, by the at least one of the plurality of basic processing circuits, computations of a neural network in parallel according to the broadcasting data block of the fixed point type and the basic data blocks of the fixed point type to obtain computation results;

transferring, by the at least one of the plurality of basic processing circuits, the computation results to the main processing circuit through the basic processing circuits connected to the main processing circuit; and processing, by the main processing circuit, the computation results to obtain an instruction result of the multiplication instruction.

20. The method of claim 19, comprising:

performing, by the at least one of the plurality of basic processing circuits, multiplication on the broadcasting data block of the fixed point type and the received basic data blocks of the fixed point type to obtain products of the fixed point type;

transferring, by the at least one of the plurality of basic processing circuits, the products of the fixed point type as the computation results to the main processing circuit through the basic processing circuits that are connected to the main processing circuit;

converting, by the main processing circuit, the products of the fixed point type to products of the floating point type using the data type conversion circuit;

accumulating, by the main processing circuit, the products of the floating point type to obtain accumulation results; and sorting, by the main processing circuit, the accumulation results to obtain the instruction result.

21. The method of claim 19, comprising:

performing, by the at least one of the plurality of basic processing circuits, inner product computations on the broadcasting data block of the fixed point type and the received basic data blocks of the fixed point type to obtain inner products of the fixed point type;

transferring, by the at least one of the plurality of basic processing circuits, the inner products of the fixed point type as the computation results to the main processing circuit;

converting, by the main processing circuit, the inner products of the fixed point type to inner products of the floating point type using the data type conversion circuit; and sorting, by the main processing circuit, the inner products of the floating point type to obtain the instruction result.

22. The method of claim 19, comprising:

forwarding, by a branch processing circuit located between the main processing circuit and at least one basic processing circuit, data between the main processing circuit and the at least one basic processing circuit.

23. The method of claim 19, comprising:

broadcasting, by the main processing circuit, the broadcasting data block of the fixed point type as a whole to the plurality of basic processing circuits.

24. The method of claim 19, comprising:

partitioning, by the main processing circuit, the broadcasting data block of the fixed point type into a plurality of partial broadcasting data blocks; and sequentially broadcasting, by the main processing circuit, the plurality of partial broadcasting data blocks to the plurality of basic processing circuits.

25. The method of claim 24, comprising:

performing, by the at least one of the plurality of basic processing circuits, inner product processing on the partial broadcasting data blocks and the basic data blocks of the fixed point type to obtain results of inner product processing; and transferring, by the at least one of the plurality of basic processing circuits, the results of inner product processing to the main processing circuit.

26. The method of claim 24, comprising:

reusing, by the at least one of the plurality of basic processing circuits, the partial broadcasting data blocks for n times;

performing, by the at least one of the plurality of basic processing circuits, n times of inner product computations on the partial broadcasting data blocks and n basic data blocks of the fixed point type to obtain n partial processing results; and transferring, by the at least one of the plurality of basic processing circuits, the n partial processing results to the main processing circuit, wherein n is an integer greater than or equal to 2.

* * * * *